(12) United States Patent
Yasaki et al.

(10) Patent No.: US 8,099,745 B2
(45) Date of Patent: Jan. 17, 2012

(54) HOLDING DEVICE AND DISK DEVICE FOR RECORDING AND READING INFORMATION

(75) Inventors: Akira Yasaki, Kawagoe (JP); Hideki Kinoshita, Kawagoe (JP); Shigeru Kojima, Kawagoe (JP); Jun Togashi, Kawagoe (JP); Akira Takahashi, Nagoya (JP); Yasuyuki Noboribayashi, Nagoya (JP)

(73) Assignee: Pioneer Corporation, Tokyo (JP)

( * ) Notice: Subject to any disclaimer, the term of this patent is extended or adjusted under 35 U.S.C. 154(b) by 1074 days.

(21) Appl. No.: 11/921,845

(22) PCT Filed: Jun. 8, 2006

(86) PCT No.: PCT/JP2006/311490
§ 371 (c)(1),
(2), (4) Date: Dec. 7, 2007

(87) PCT Pub. No.: WO2006/132303
PCT Pub. Date: Dec. 14, 2006

(65) Prior Publication Data
US 2009/0037944 A1 Feb. 5, 2009

(30) Foreign Application Priority Data
Jun. 9, 2005 (JP) .................................. 2005-170032

(51) Int. Cl.
*G11B 17/28* (2006.01)
(52) U.S. Cl. .................................... 720/706; 369/270.1
(58) Field of Classification Search .................. 720/703, 720/704, 706, 707, 709, 711, 712, 713, 714; 369/30.95, 75.21, 206, 207, 208, 209, 210, 369/211, 270.1, 271.1
See application file for complete search history.

(56) References Cited

U.S. PATENT DOCUMENTS

| | | | | |
|---|---|---|---|---|
| 2,508,845 A | * | 5/1950 | Thompson | 369/30.01 |
| 2,739,817 A | * | 3/1956 | Jones et al. | 369/211 |
| 3,871,663 A | * | 3/1975 | Stave | 369/270.1 |
| 4,260,161 A | * | 4/1981 | Frank | 369/53.41 |

FOREIGN PATENT DOCUMENTS

| | | |
|---|---|---|
| JP | 39-1338 | 1/1964 |
| JP | 39-1935 | 1/1964 |
| JP | 39-1936 | 1/1964 |
| JP | 39-1937 | 1/1964 |
| JP | 57-118581 | 7/1982 |
| JP | 57-118582 | 7/1982 |
| JP | 8-22661 | 1/1996 |
| JP | 2000-207879 | 7/2000 |

* cited by examiner

*Primary Examiner* — Mohammad Ghayour
*Assistant Examiner* — Tamara Ashford
(74) *Attorney, Agent, or Firm* — Kratz, Quintos & Hanson, LLP

(57) ABSTRACT

A support (611) that is substantially cylindrical so as to be received by a disk hole (1NA) and has a positioning portion (612) on a circumference adjacent to a first axial end is provided with a concave portion (613) of which both ends open to the circumference along a radial direction. A first engaging portion (614) protrudes from around the circumference at which a first axial end of the concave portion opens substantially opposes to the positioning portion with a gap equal to or more than a thickness of an optical disk (1N). A moving member (615) is disposed in the concave portion in a manner movable along a radial direction of the support. A second engaging portion (616) protrudes on an end of the moving member at a position corresponding to a second axial end of the concave portion.

17 Claims, 30 Drawing Sheets

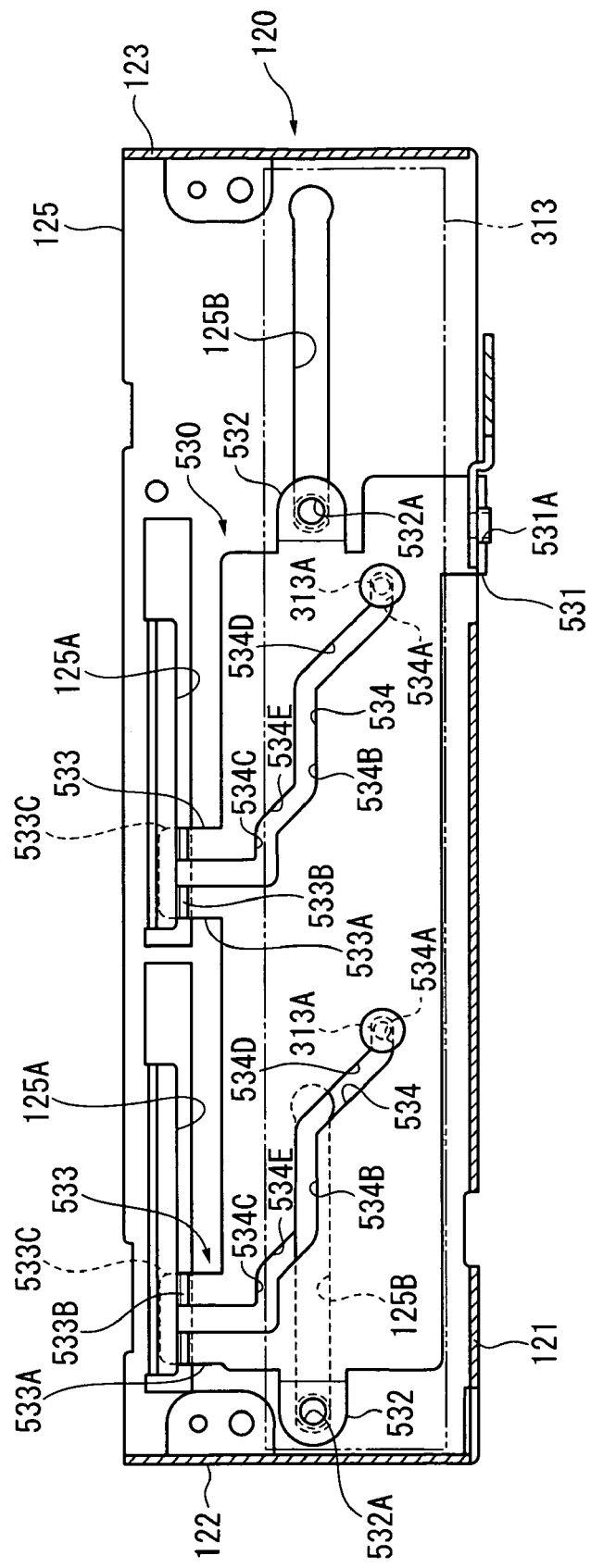

HOLDING DEVICE AND DISK DEVICE FOR RECORDING AND READING INFORMATION

TECHNICAL FIELD

The present invention relates to a holding device for detachably holding an object having a hole at a center thereof and a disk device.

BACKGROUND ART

Traditional drive devices that read and reproduce various information recorded on a disk recording medium such as a CD (Compact Disc) and a DVD (Digital Versatile Disc) and record various information on the disk recording medium employ an arrangement in which the disk recording medium is detachably attached to conduct reproducing and recording processing. Some of the drive devices detachably and rotatably support the disk recording medium with a turntable having so-called self-chucking function (for instance, see Patent Document 1).

The device disclosed in the Patent Document 1 has a body provided with components for reproducing a CD and a cover openable/closable relative to the body. A motor is installed in the body and a disk table is attached to a drive shaft of the motor protruding from an upper partition plate of the body. A ball chucking mechanism including a plurality of balls and a rubber ring for applying biasing pressure onto the balls is provided on a chuck portion protruding approximately at the center of the disk table. The ball chucking mechanism determines the position of the CDs attached to the chuck portion in a fixed manner. The cover is provided at a position opposing to the disk table, the cover also having a spare disk holder with a chuck portion including a ball chucking mechanism, on which a spare disk is to be attached.

[Patent Document 1] JP-A-2000-207879 (page 3 left column to page 4 right column)

DISCLOSURE OF THE INVENTION

Problems to be Solved by the Invention

However, such a disk table that detachable supports CDs by the ball-chucking mechanism that employs the biased balls to position the CDs as disclosed in the above-mentioned Patent Document 1, the chuck portion has to be sized to have a radial dimension corresponding to dimensional error of the CDs. Therefore, adjustment of ball advancement for securely positioning the CDs is required, which consequently results in troublesome work for properly arranging the plurality of balls, where improvement in productivity has been desired. Further, attachment/detachment force against the biasing pressure by the rubber ring is required in attaching and detaching the CDs on account of dimensional error in CDs, which requires troublesome attachment/detachment work and may cause abnormal sound during the attachment/detachment work.

In view of the above deficiencies, an object of the present invention is to provide a holding device that holds an object with a simple arrangement and a disk device in an easily detachable manner.

Means for Solving the Problems

A holding device according to an aspect of the present invention detachably holds a to-be-held object having a hole substantially at the center thereof, the device including: a support to be inserted into the hole; a positioning portion located on an outside of the hole in which the support is inserted, a portion around a periphery of the hole being adapted to be in contact with the positioning portion; and a first engaging portion and a second engaging portion provided on the support at a position opposed to the positioning portion, the first and the second engaging portions engaging the periphery of the hole in cooperation with the positioning portion, in which the support includes a moving member that moves the first engaging portion relative to the second engaging portion when the support is inserted into the hole, and the first engaging portion and the second engaging portion are brought into contact with the periphery of the hole by the movement of the first engaging portion to engage the hole in cooperation with the positioning portion.

A disk device according to another aspect of the present invention includes: a case having an opening through which the object can be planarly inserted; a transfer unit that planarly transfers the object into and out of the case through the opening; the holding device according to any one of Claims 1 to 15 that is disposed within the case and detachably holds the object transferred into the case by the transfer unit; and a processor that is disposed within the case and processes the object held by the holding device.

A disk device according to still another aspect of the present invention includes: a case having an opening through which the object can be planarly inserted; the holding device according to any one of Claims 1 to 9 that is disposed within the case; a transfer unit that planarly transfers the object into and out of the case through the opening and moves the holding device toward and away from the object at a position where the hole of the object to be transferred is aligned with the support of the holding device to detach/attach the object on the holding device; and a processor that is disposed within the case and processes the object held by the holding device.

BRIEF DESCRIPTION OF DRAWINGS

FIG. 7 is a cross-sectional view schematically showing an arrangement of the lower case in the vicinity of a left lateral plate thereof according to the above embodiment.

BEST MODE FOR CARRYING OUT THE INVENTION

An arrangement of a disk device according to an embodiment of the present invention will be described below with reference to the attached drawings. Although a disk device for recording and reading information in or from an optical disk (disk recording medium) will be exemplarily described in the present embodiment, such a disk unit may perform either one of reading and recording information. The optical disk serves as an object to be held in a detachable manner. The disk recording medium may be arranged in any manner as long as the recording medium is shaped in a disk having a hole approximately at the center thereof or is accommodated in a casing, which includes a case accommodating the disk recording medium (e.g. MD [Mini Disc]), steel plate and the like. The holding device of the present invention may not be integrally incorporated in a disk device, but the holding device may include a transfer device that transfers a processor that processes the object independent of the holding mechanism for holding the object transferred by the transfer device. Though the temporarily fixing for replacing the optical disk in a disk device having a disk-changer function for replacing the optical disk is exemplified, the device may alternatively used in a turntable and the like for supporting the optical disk in processing the optical disk. The disk recording medium is not limited to an optical disk but may be any other disk recording medium such as a magnetic disk or a magnet-optical disk. The disk device is not limited to a device that moves an optical pickup substantially in a radial direction along a recording surface of a rotating optical disk but may be, for example, a device that moves the optical pickup along the recording surface without rotating the optical disk to perform recording-processing or reading-processing.

[Arrangement of Disk Device]

Figure 1:
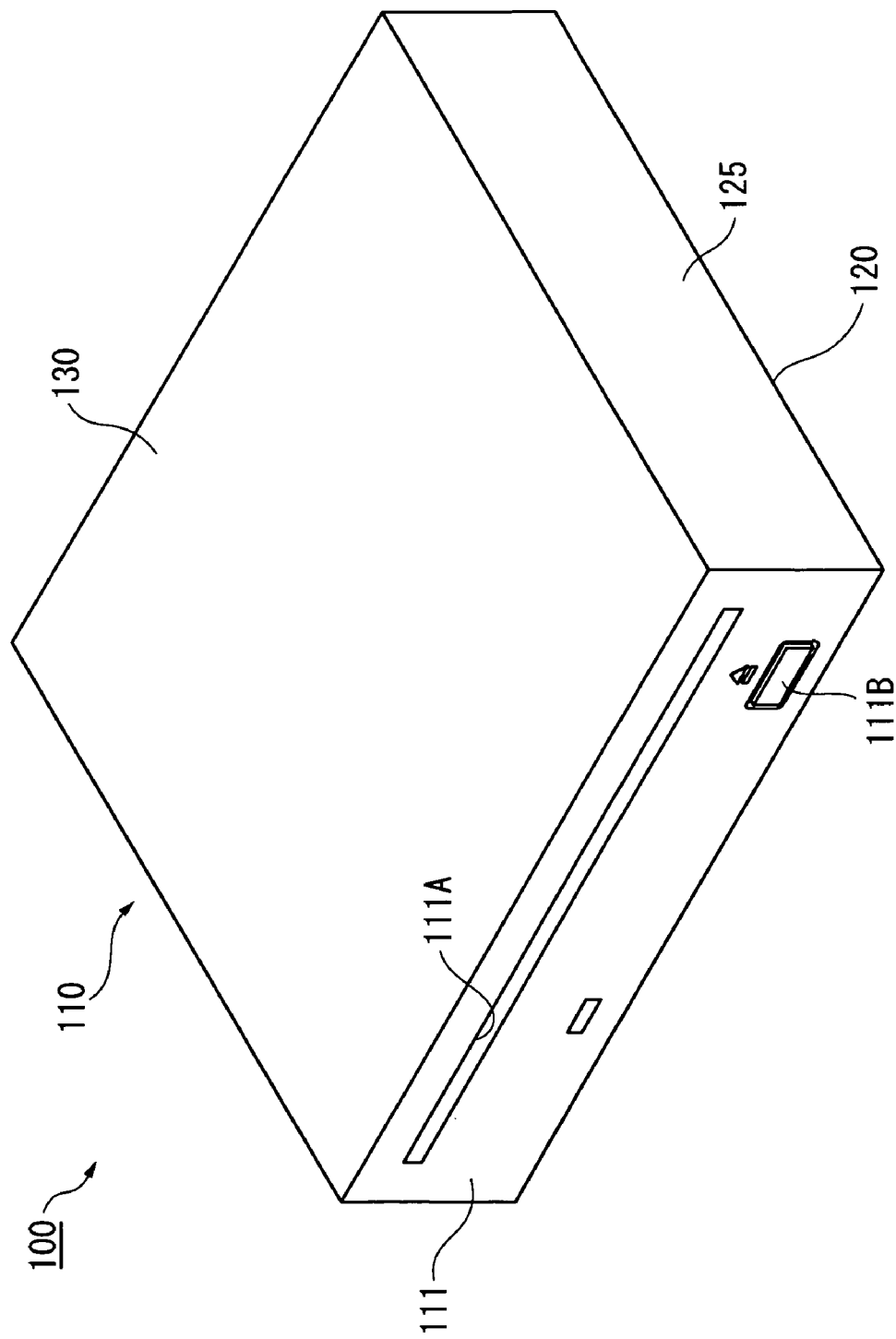
FIG. 1 is a perspective view schematically showing an arrangement of a disk device according to an embodiment of the present invention.
Figure 2:
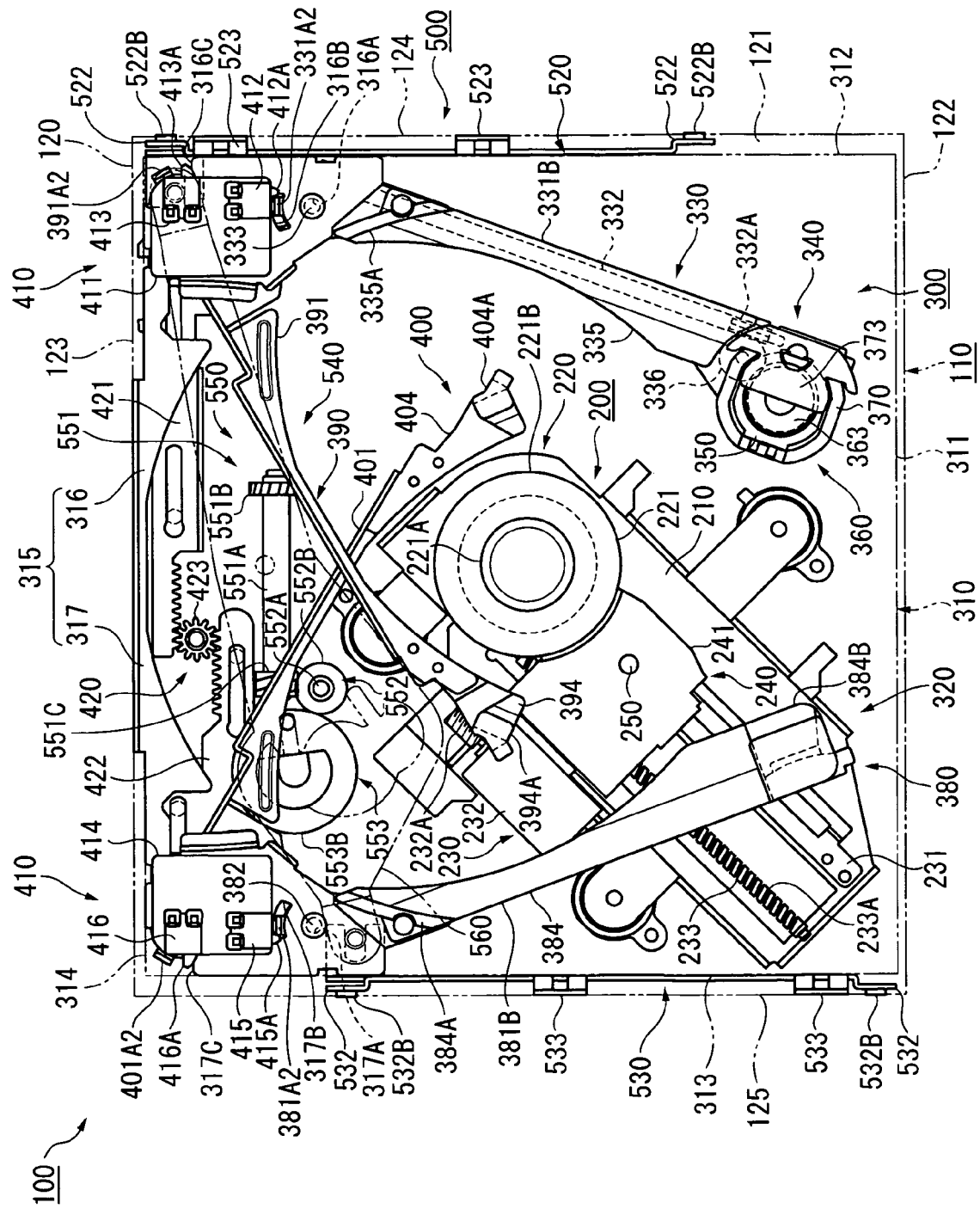
FIG. 2 is a plan view schematically showing an inner arrangement of the disk device according to the above embodiment.
Figure 3:
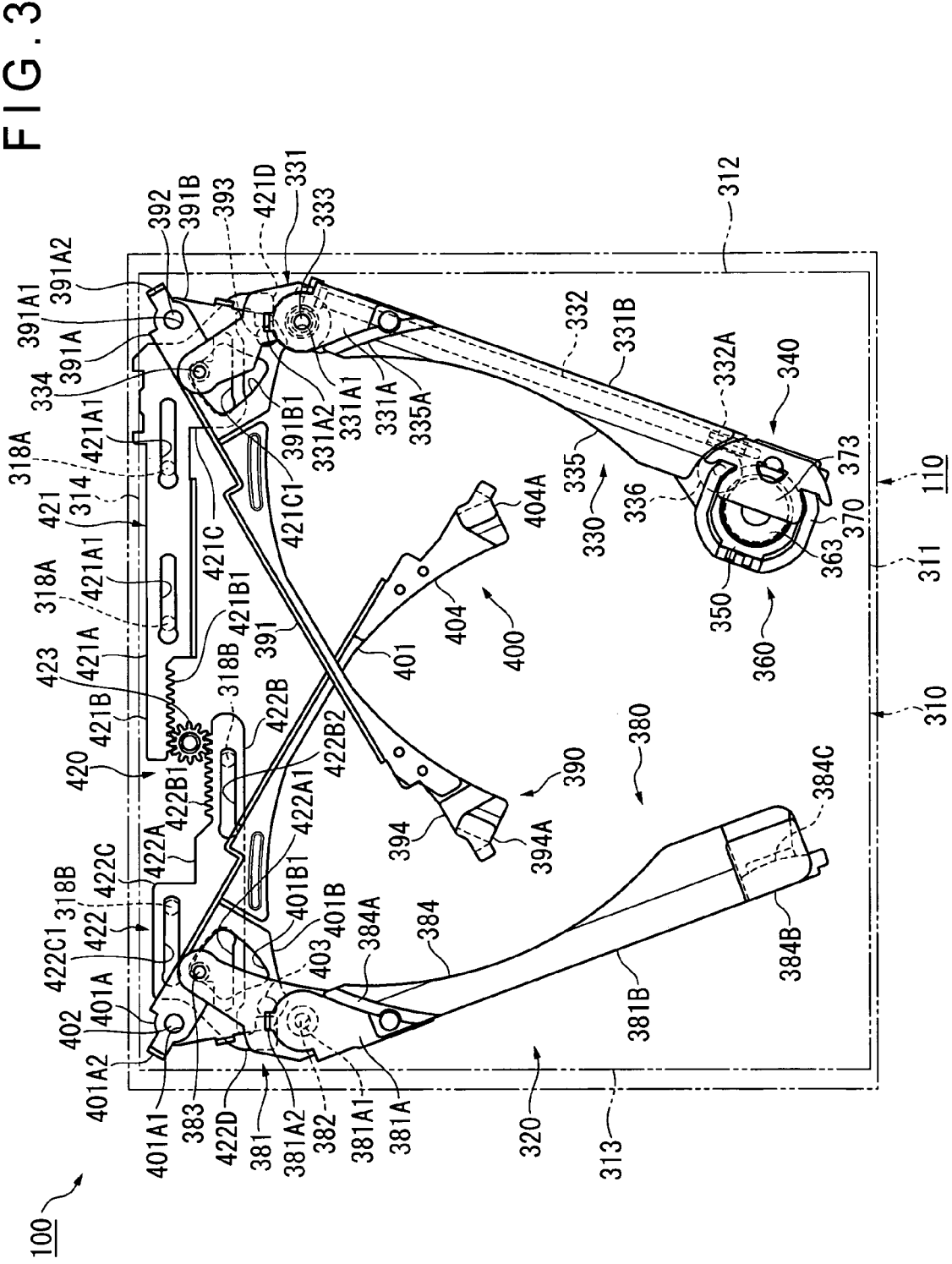
FIG. 3 is a plan view schematically showing the disk holding mechanism and an evacuation control mechanism according to the above embodiment.
Figure 4:
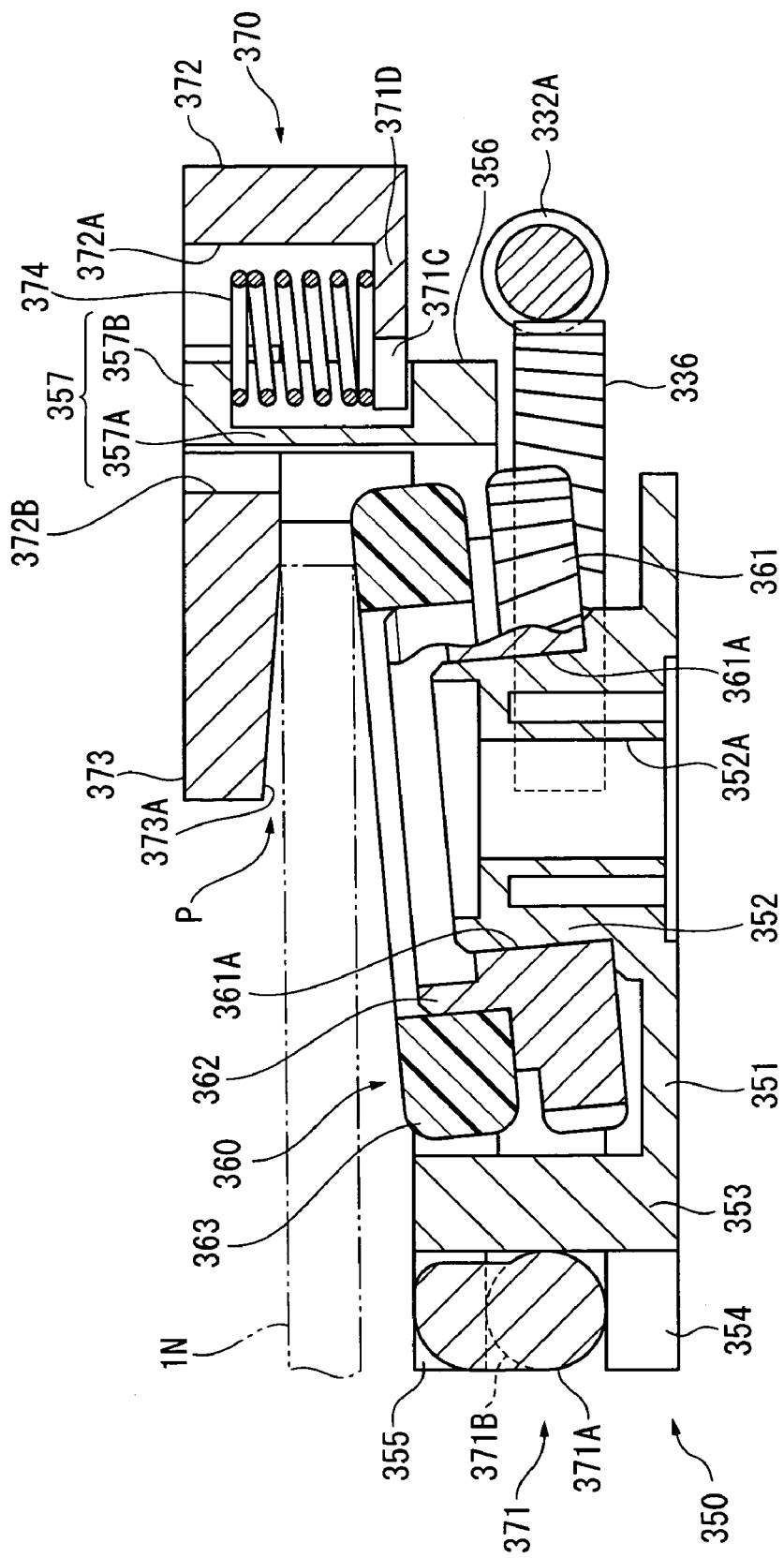
FIG. 4 is a partial cross-sectional view schematically showing an arrangement of a transfer unit according to the above embodiment.
Figure 5A:
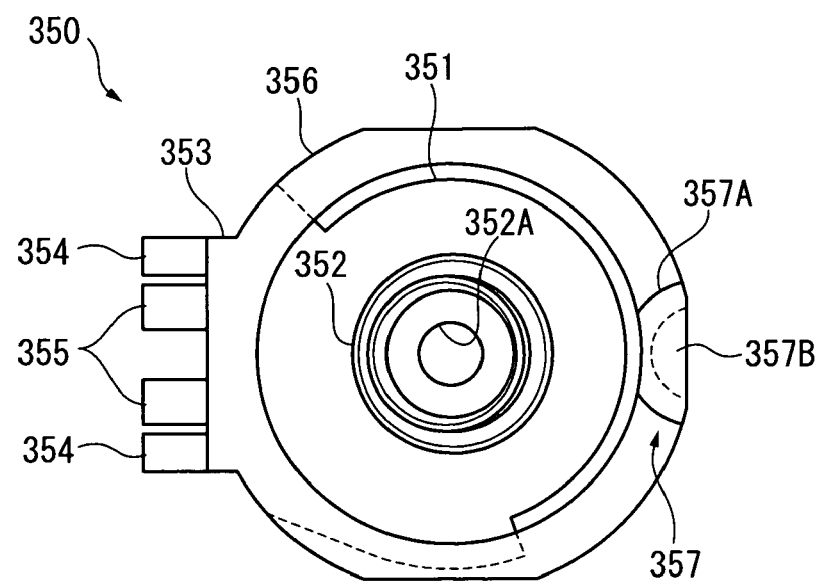
FIG. 5A is a plan view schematically showing an arrangement of a transfer base according to the above embodiment.
Figure 5B:
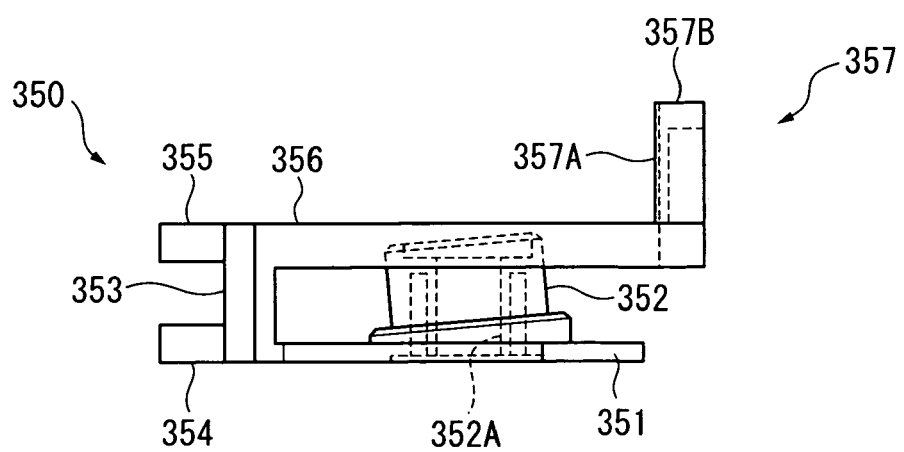
FIG. 5B is a side view schematically showing an arrangement of the transfer base according to the above embodiment.
Figure 6A:
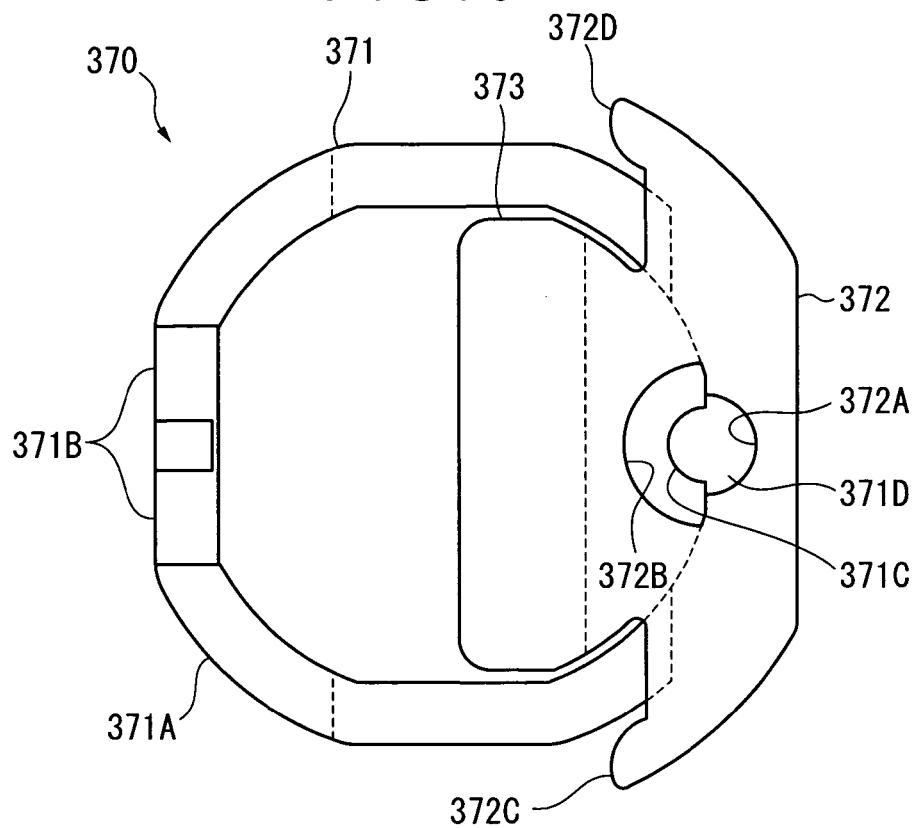
FIG. 6A is a plan view schematically showing an arrangement of a press member according to the above embodiment.
Figure 6B:
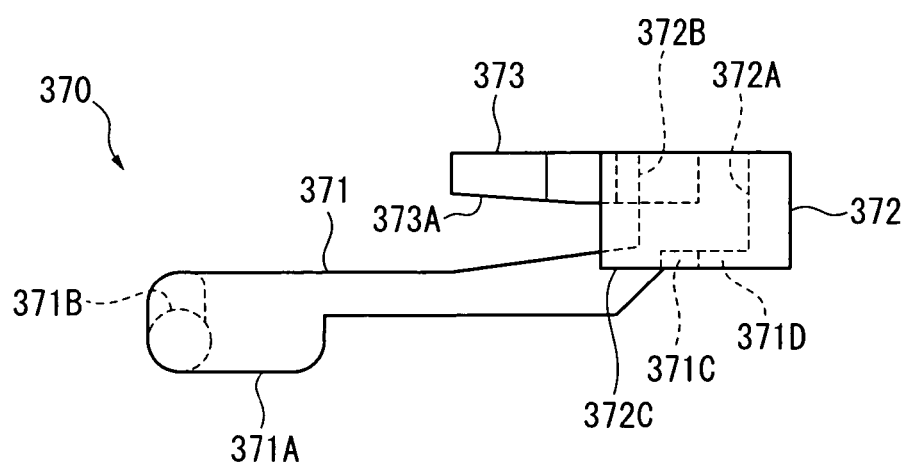
FIG. 6B is a side view schematically showing an arrangement of a press member according to the above embodiment.
Figure 8:
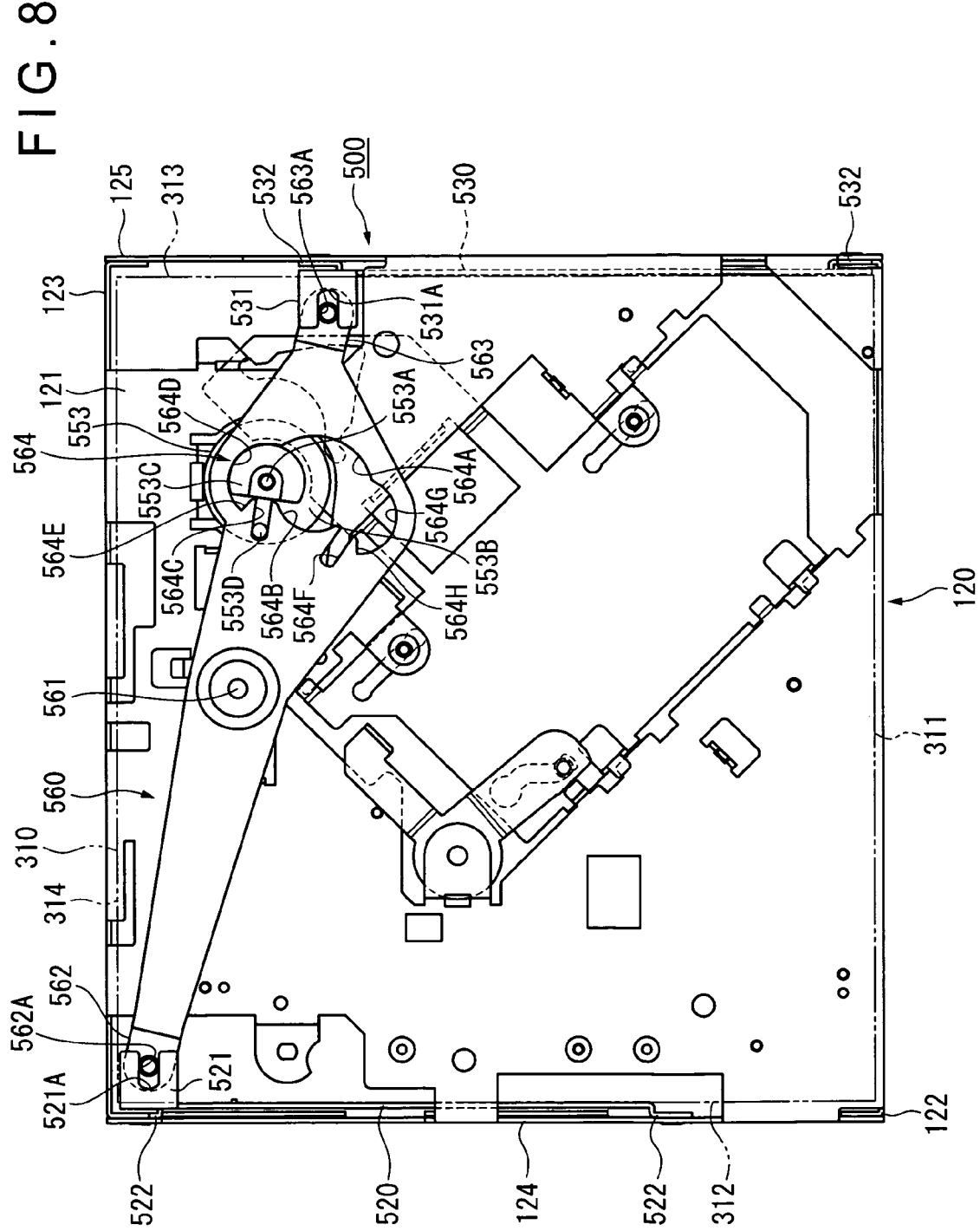
FIG. 8 is a bottom view of the lower case according to the above embodiment.
Figure 9:
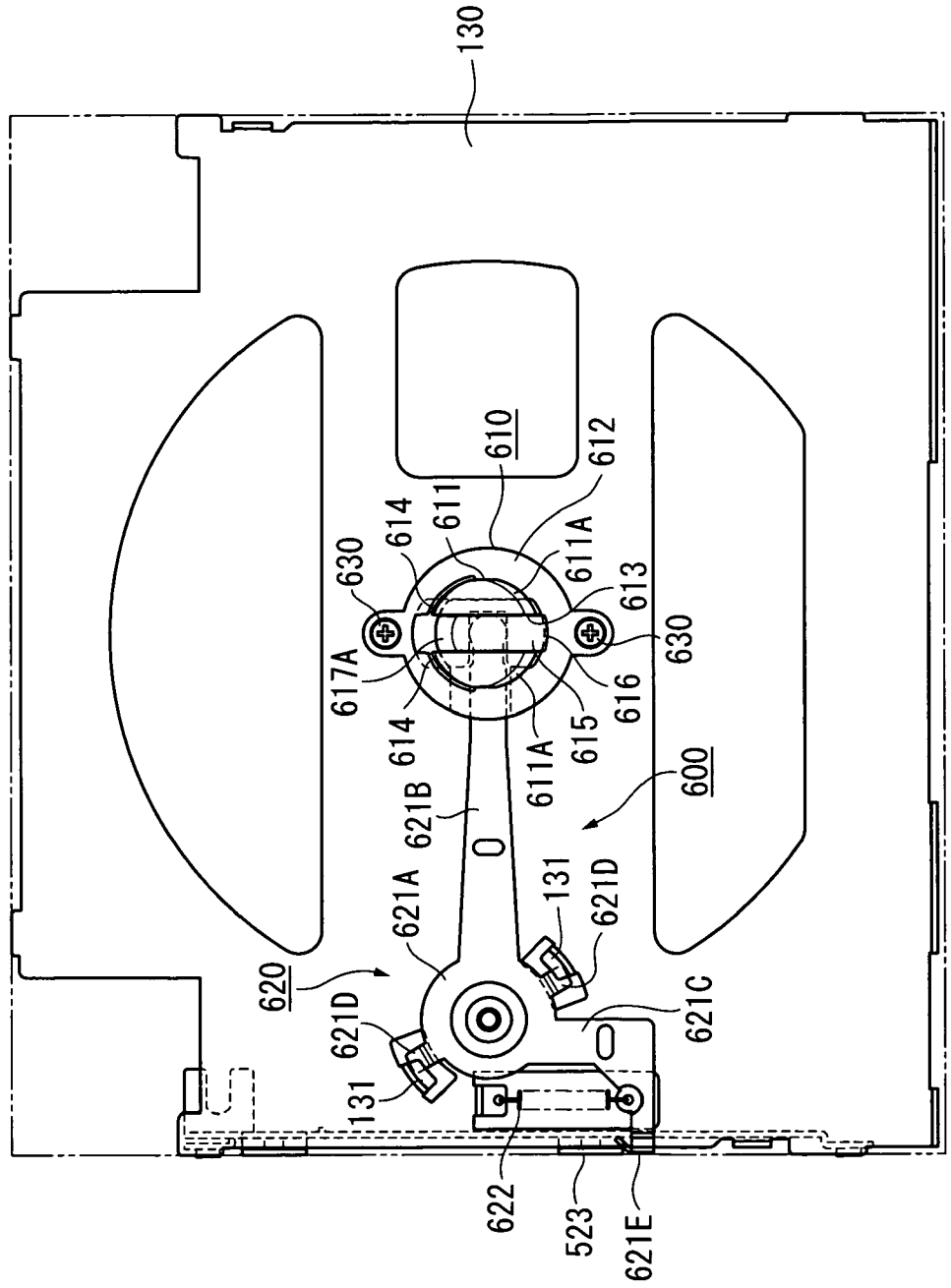
FIG. 9 is a bottom view showing an upper case on which a temporarily fixing portion is disposed according to the above embodiment.
Figure 10:
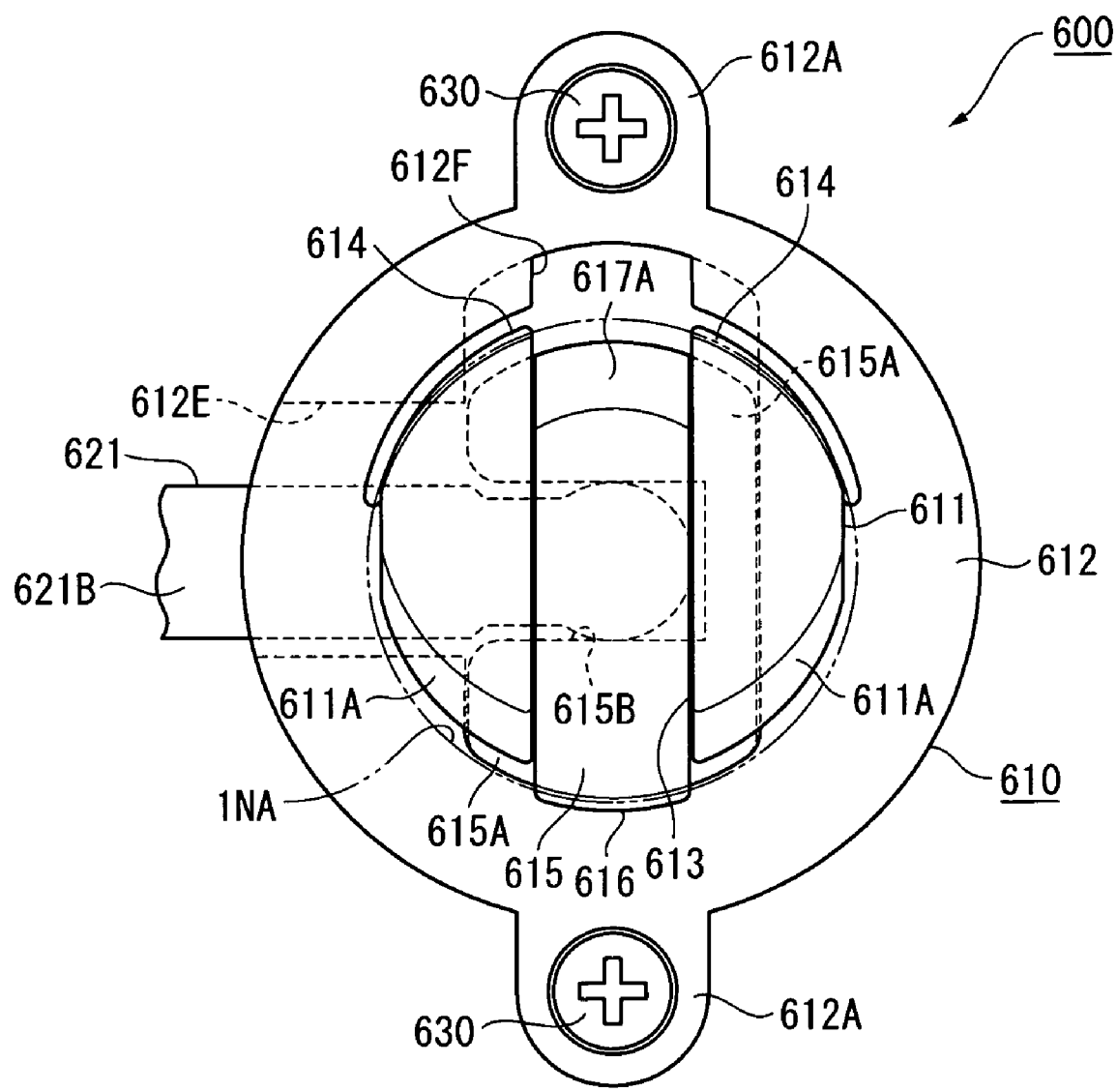
FIG. 10 is a partially cutaway plan view showing a support at a mounting position according to the above embodiment.
Figure 11:
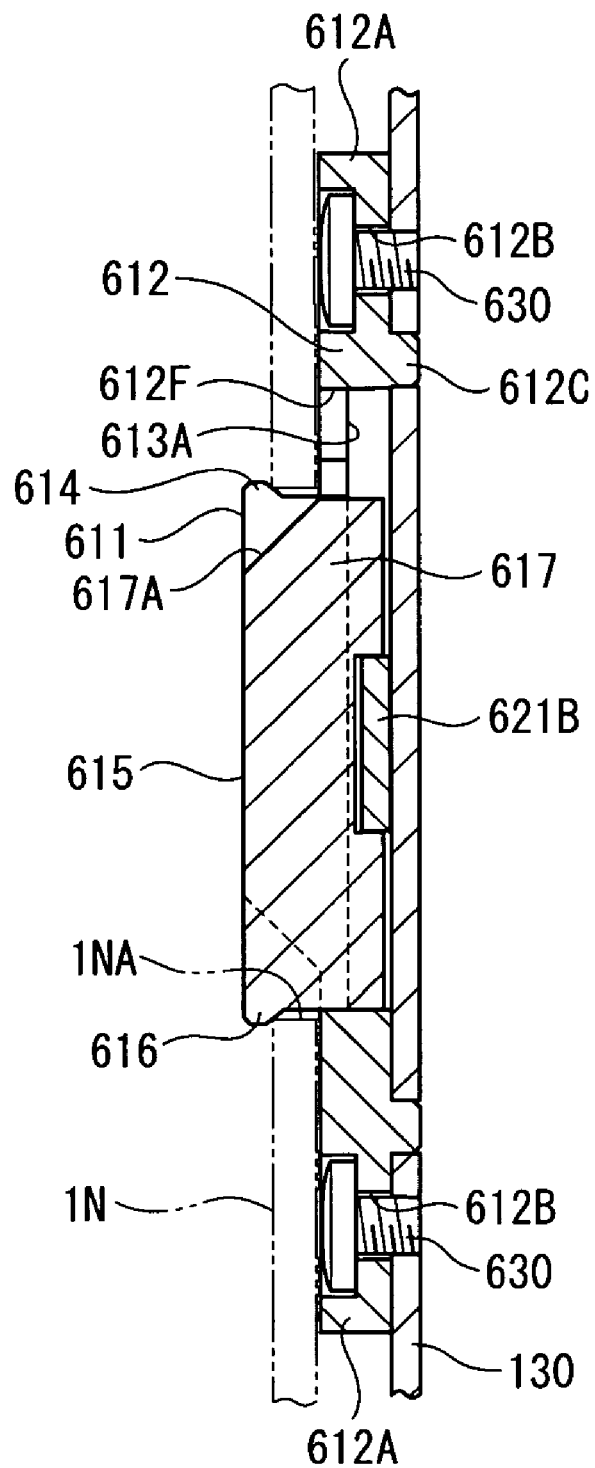
FIG. 11 is a cross-sectional view schematically showing the temporarily fixing portion at the mounting position according to the above embodiment.
Figure 12:
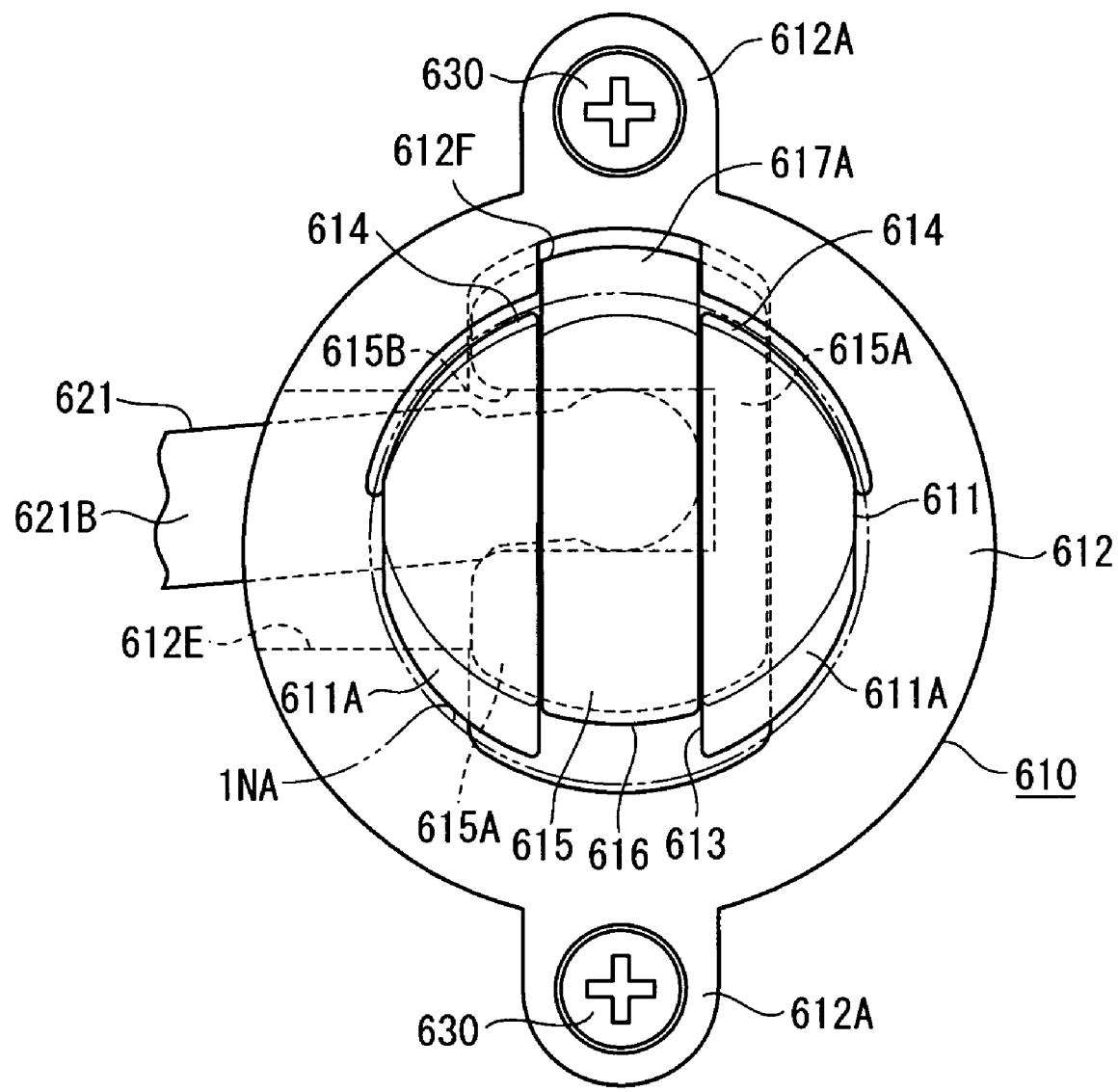
FIG. 12 is a partially cutaway plan view showing the support at the release position according to the above embodiment.
Figure 13:
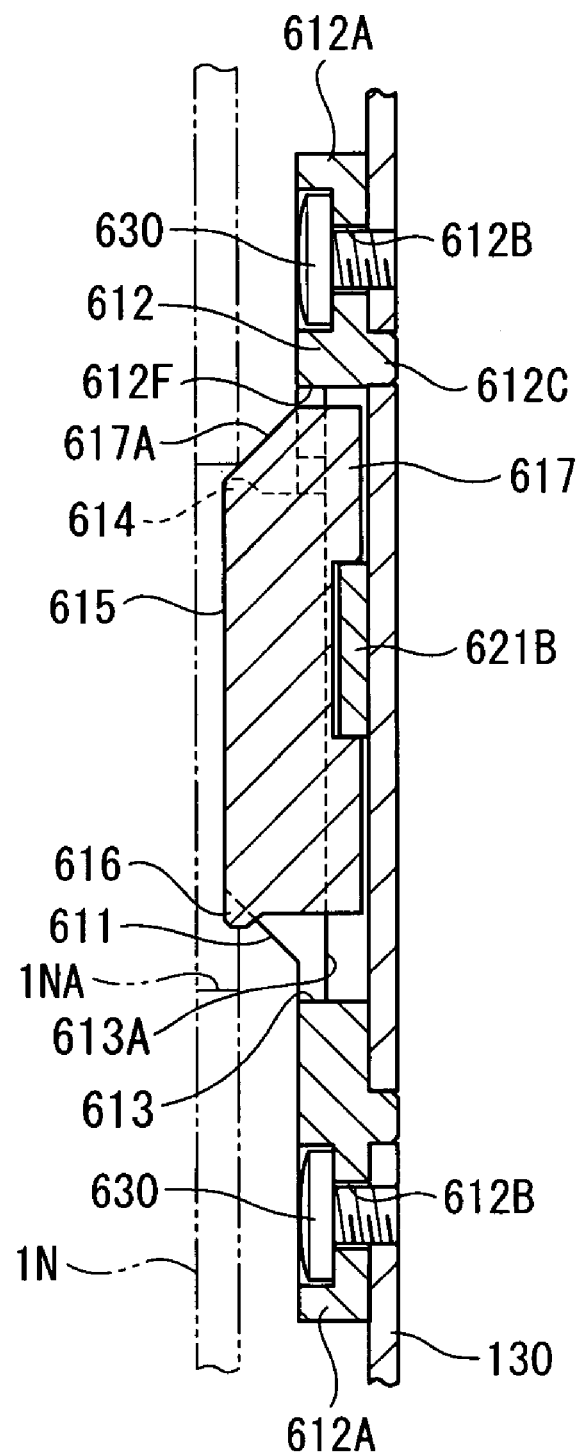
FIG. 13 is a partially cutaway plan view showing the temporarily fixing portion at the release position according to the above embodiment.

FIG. 1 is a perspective view schematically showing an arrangement of a disk device. FIG. 2 is a plan view schematically showing an inner arrangement of the disk device. FIG. 3 is a plan view schematically showing the disk holding mechanism and the evacuation control mechanism. FIG. 4 is a partial cross-sectional view schematically showing an arrangement of a transfer unit. FIG. 5A is a plan view schematically showing an arrangement of a transfer base. FIG. 5B is a lateral view schematically showing an arrangement of the transfer base. FIG. 6A is a plan view schematically showing an arrangement of a press member. FIG. 6B is a lateral view schematically showing an arrangement of the press member. FIG. 7 is a cross-sectional view schematically showing an arrangement of the lower case in the vicinity of a left lateral plate thereof. FIG. 8 is a bottom view of the lower case. FIG. 9 is a bottom view showing an upper case on which a temporarily fixing portion is disposed. FIG. 10 is a partially cutaway plan view showing a support at a mounting position. FIG. 11 is a partially cutaway plan view showing a temporarily fixing portion at the mounting position. FIG. 12 is a partially cutaway plan view showing a support at the mounting position. FIG. 13 is a partially cutaway plan view showing the temporarily fixing portion at the release position.

In FIG. 1, a disk device denoted by the numeral 100 is mounted on a movable body such as a vehicle. The disk device 100 reproduces information recorded in an optical disk 1N (N is 1 or 2: see, for instance, FIG. 5) detachably mounted thereon and records information in the optical disk 1N. The optical disk is substantially flat-plate shaped and circular-disk shaped. When an optical disk 12 (hereinafter may be called a replacing disk 12) as a second disk recording medium is inserted while an optical disk 11 (hereinafter may be called a reproducing disk 11), which serves as a first disk recording medium, is exemplarily reproduced, the disk device 100 automatically replaces the reproducing disk 11 with the replacing disk 12. The disk device 100 includes a case 110 that is substantially quadrangle-box shaped to define an inner space. The case 110 may be made from a metal.

As shown in FIG. 1 for instance, the case 110 includes: a metallic lower case 120 whose upper side (shown in FIG. 2) is open; a metallic upper case 130 for closing the upper surface of the lower case 120; and a thin longitudinal decorative plate 111 provided on a front side of the lower case 120 and the upper case 130 and formed from a synthetic resin. A disk-insertion opening 111A (an opening) shaped in a long and thin slit along a longitudinal direction is formed in the decorative plate 111, and the optical disk 1N can be inserted into the disk-insertion opening 111A. The decorative plate 111 of the case 110 may be provided as necessary with various operation buttons (not shown) for setting operations of the entire disk device 100, a display panel for displaying and reporting a processing state and the like. An example of the operation buttons is an eject button 111B that is operated for ejecting the reproducing disk 11 having been inserted into the case 110.

The lower case 120 has a rectangular flat bottom plate 121 as shown in FIG. 2. A front plate 122, which bends substantially vertically, is provided to a first transversal edge of the bottom plate 121. A slit-like insertion hole (not shown) corresponding to the disk insertion opening 111A is formed in the front plate 122, and the decorative plate 111 is attached to the front plate 122. A rear plate 123, which bends substantially vertically in the same direction as the front plate 122, is provided to a second transversal edge of the bottom plate 121 so as to be opposed to the front plate 122. In addition, a right lateral plate 124, which bends substantially vertically in the same direction as the front plate 122, is provided to a first longitudinal edge of the bottom plate 121. In addition, a left lateral plate 125, which bends substantially vertically in the same direction as the front plate 122, is provided to a second longitudinal edge of the bottom plate 121. The lower case 120 is bent-formed to be substantially box-shaped with upper side thereof being open.

In a portion of an upper end of the right lateral plate 124 adjacent to the rear plate 123 and substantially in the longitudinal center portion of the right lateral plate 124 respectively, a claw insertion slit (not shown) is opened so that the longitudinal direction is substantially aligned with the width direction. In addition, in portions of the right lateral plate 124 respectively adjacent to the front plate 122 and the rear plate 123, the portions being positioned substantially at the center of an up-and-down direction of the right lateral plate 124, a screw-insertion slit (not shown) is opened so that the longitudinal direction is substantially aligned with the width direction. In a portion of an upper end of the left lateral plate 125 adjacent to the front plate 122 and substantially in the center portion of the left lateral plate 125 in the longitudinal direction respectively, a claw insertion slit 125A (see FIG. 7) similar to that of the right lateral plate 124 is formed. In portions of the left lateral plate 125 respectively adjacent to the front plate 122 and the rear plate 123, the portions being positioned substantially at the center of an up-and-down direction of the left lateral plate 125, a slit-insertion slit 125B (see FIG. 7) similar to that of the right lateral plate 124 is opened.

A disk processor 200 as a processor is disposed on the bottom plate 121. The disk processor 200 includes a substantially rectangular mount 210 that is disposed on the bottom plate 121 via a flexible member. A disk rotation driver 220 is disposed adjacent to a first longitudinal end of the mount 210. The disk rotation driver 220 includes a rotation electric motor (not shown) as a spindle motor and a turntable 221 provided integrally with an output shaft (not shown) of the rotation electric motor. The turntable 221 includes: a support 221A that gradually reduces a diameter thereof toward a tip end thereof; a flange 221B formed around a circumference of the support 221A; and a plurality of (three, for instance) locking claws (not shown) adapted to be advanced and retracted from the circumference of the support 221A. The disk rotation driver 220 is disposed so that the turntable 221 is positioned substantially at the center of the bottom plate 121.

A processor moving unit 230 is disposed on the mount 210. The processor moving unit 230 includes a guide rail 231 disposed on the mount 210; and an electric moving motor 232 (an example of which is a stepping motor). A shaft (not shown) is substantially perpendicularly provided to a screw 232A provided on the electric moving motor 232. An engaging groove engageable with the screw 232A and an engaging groove engageable with an engaging groove of a lead screw 233 described below are provided on first and second ends of the shaft respectively. The lead screw 233, on an outer circumference of which a spiral engaging groove 233A is provided to be engageable with the engaging groove, is provided on the second end of the shaft to be substantially parallel to the guide rail 231.

An information processor 240 (a processor) supported by the processor moving unit 230 is disposed on the mount 210. The information processor 240 includes a moving holder 241 that is held so as to bridge the guide rail 231 and the lead screw 233. The moving holder 241 includes: an engaging portion (not shown) that is movably engageable with the guide rail 231; and a claw (not shown) engageable with the engaging groove 233A of the lead screw 233 connected to the output shaft of the electric moving motor 232. The moving holder 241 of the information processor 240 is provided with an optical pickup 250 controlled by a controlling circuit (not shown) to perform reading processing and recording processing. The reading processing is performed so as to read a variety of information recorded on a recording surface of the optical disk 1N and output the read information to an output circuit while the recording processing is performed so as to record the variety of information from the controlling circuit on a recording surface.

The mount 210 is provided with a disk attaching-and-detaching mechanism (not shown) for advancing and retracting the locking claw of the turntable 221 from the outer circumference of the support 221A in conjunction with the movement of the information processor 240. In other words, the disk attaching-and-detaching mechanism moves the locking claw such that the locking claw that is advanced from the outer circumference of the support 221A is gradually retracted from the outer circumference of the support 221A in conjunction with the movement of the information processor 240 toward the electric moving motor 232.

A disk elevator 300 (transfer unit) for planarly transferring the optical disk 1N through the disk insertion opening 111A into and out of the case 110 and vertically (i.e. in a thickness direction) elevating the optical disk 1N in the case 110 is provided in an inner space of the case 110. The disk elevator 300, which is formed to be substantially rectangular, has a stage 310 (disk holder providing member) as a quadrangle frame disposed to be elevatable in the up-and-down direction inside the inner space of the case 110.

As shown in FIGS. 2 and 3, the stage 310 is formed in a shape of a substantially rectangular frame defined by: a front portion 311 in a shape of a substantially rectangular flat plate; a right portion 312 substantially vertically provided to a first longitudinal lateral edge of the front portion 311; a left portion 313 provided to a second longitudinal lateral edge of the front portion 311 substantially vertically in the same direction as the right portion 312; and a rear portion 314 provided to be opposed to the front portion 311 and to connect lateral edges of the right portion 312 and the left portion 313. Lower ends of the right portion 312, the left portion 313 and the rear portion 314 are respective provided with a right lower portion, a left lower portion and a rear lower portion (all of which are not shown). The right lower portion, the left lower portion and the rear lower portion respectively protrude toward the left portion 313, the right portion 312 and the front portion 311, for example, in a shape of a substantially rectangular plate. The stage 310 is further provided with a rear upper member 315 for partially closing an upper side in the vicinity of the rear portion 314. The rear upper member 315 includes: a right upper corner 316 that protrudes substantially triangularly toward the front portion 311 from the vicinity of the right portion 312; and a left upper corner 317 integrally provided with the right upper corner 316 to protrude similarly to the right upper corner 316 toward the front portion 311 from the vicinity of the left portion 313.

Two right elevation-control pins (protruding member: not shown) that protrude from an exterior surface longitudinally are juxtaposed on the right portion 312. Two left elevation-control pins 313A (protruding member: see FIG. 7) that are provided similarly to the right elevation-control pins are juxtaposed on the left portion 313. A substantially circular guide axial hole 316A is formed in the right upper corner 316 adjacently to the front portion 311. An arc slit 316B that is substantially arced around the guide axial hole 316A is opened adjacently to the rear portion 314 relative to the guide axial hole 316A. A cutout 316C is formed in the vicinity of connectors that respectively connect the right upper corner 316 with the right portion 312 and the rear portion 314. A right upper stopper axial hole (not shown) is opened in the cutout 316C adjacently to the left portion 313. At positions in the left upper corner 317 substantially corresponding to the guide axial hole 316A, the arc slit 316B, the cutout 316C and the right upper stopper axial hole, a guide axial hole 317A, an arc slit 317B, a cutout 317C and a left upper stopper axial hole (not shown) are respectively provided. At positions in a right lower portion and a left lower portion substantially corresponding to the guide axial holes 316A, 317A and the right and left upper stopper axial holes, a right lower guide axial hole, a left lower guide axial hole, a right lower stopper axial hole and a left lower stopper axial hole (none of them is shown) are respectively provided. The stage 310 is provided with a disk holding mechanism 320, an insertion-and-ejection detector 410, an evacuation control mechanism 420 and the like.

The disk holding mechanism 320 holds the optical disk 1N. The disk holding mechanism 320 (moving unit also capable of functioning as a transferring unit) includes a right guide 330 (disk holder), a left guide 380 (disk holder), a right stopper 390 and a left stopper 400, all of which are adapted to contact a periphery of the optical disk 1N. It should be noted that the right guide 330 and the left guide 380 are arranged substantially in the same manner, so that substantially the same components will be referred to by the same name and the description thereof may be simplified. Also in the description of the right stopper 390 and the left stopper 400, substantially the same components will be referred to by the same name and the description thereof may be simplified.

As shown in FIGS. 2 and 3, the right guide 330, which is formed exemplarily from a metal to be substantially thinly rectangular in plan view, has an arm member 331 that is arranged such that a first longitudinal lateral is located adjacently to substantially the center of the stage 310. A lower rotary axial hole (not shown) is opened in the arm member 331 adjacently to a first longitudinal end thereof. A rotary center 331A that is substantially orthogonally bent toward the first longitudinal lateral after being substantially orthogonally bent upwardly is formed integrally with a second longitudinal lateral of the arm member 331 in the vicinity of the lower rotary axial hole. A first end of a shaft 332 is provided in a space defined by the rotary center 331A and the arm member 331, and the shaft 332 is controlled by a later-described device controller (not shown) to be suitably rotated. An upper rotary axial hole 331A1 that is substantially the same as the lower rotary axial hole is opened at a position substantially opposed to the lower rotary axial hole in an upper side of the rotary center 331A. The arm member 331 is rotatable around a right-guide rotary shaft 333 inserted into the lower rotation axial hole, the left lower guide axial hole, the guide axial hole 316A and an upper rotary axial hole 331A1. The arm member 331 is biased by a guide biasing member (not shown) such as a plate spring so as to be rotated in a direction toward the planar center of the stage 310. A switch operation claw 331A2 is provided on a first end of the upper surface of the rotary center 331A, and the switch operation claw 331A2 protrudes upwardly in a shape of a tongue to be inserted into the arc slit 316B. The first end of the arm member 331 relative to the rotary center 331A is provided with the right-guide engaging pin 334 that protrudes downwardly.

A shaft accommodation portion 331B that is substantially orthogonally bent toward the first longitudinal lateral after being substantially orthogonally bent upwardly is formed integrally with a second longitudinal lateral of the arm member 331 on a second side extending substantially from the longitudinal center toward a second end. The shaft 332 is disposed in a space defined by the shaft accommodation portion 331B and the arm member 331. The substantially thin-rectangular guide member 335, which is formed exemplarily from a resin with substantially the same longitudinal length as the shaft accommodation portion 331B, is laminated on the upper surface of the shaft accommodation portion 331B. The first end of the guide member 335 is provided with the guide portion 335A whose lateral bulges in the shape corresponding to the outer circumference of the optical disk 1N.

The second longitudinal end of the arm member 331 is provided with the roller driving gear 336 that is meshed with the screw 332A provided on the second end of the shaft 332. The second end of the arm member 331 is further provided with the transfer unit 340 that slidably abuts on the vicinity of the circumference of the optical disk 1N to transfer the optical disk 1N into and out of the stage 310. As shown in FIGS. 4, 5A, 5B, 6A and 6B, the transfer unit 340 includes a transfer base 350, a guide 360, a press member 370 and the like.

As shown in FIGS. 2, 4, 5A and 5B, the transfer base 350 has a transfer mount 351 formed exemplarily from a metal in a shape of a substantially circular plate. A substantially cylinder shaft 352 that protrudes with the center axis being inclined relative to a flat surface is integrally provided substantially at the planar center portion of the transfer mount 351. An insertion portion 352A into which a shaft protruding from the second end of the arm member 331 is inserted is formed substantially in the planar center portion of the shaft 352 with an axis of the insertion portion 352A being configured to substantially perpendicular to the plane of the transfer mount 351. The transfer mount 351 is provided to be rotatable around the shaft inserted into the insertion portion 352A relative to the arm member 331. A rise portion 353 that stands upwardly in a shape of a substantially rectangular plate is provided on an end of the transfer mount 351 located in an inclination direction of the shaft 352. A lower portion of the rise portion 353 is provided with lower claws 354 that protrude in an out-of-plane direction of the transfer mount 351, the lower claws 354 being spaced apart from each other by a predetermined distance. On the other hand, an upper portion of the rise portion 353 is provided with two upper claws 355 that has substantially the same shape as the lower claws 354 are provided at positions corresponding to the lower claws 354, the upper claws 355 being spaced apart from each other by a predetermined distance. The upper portion of the rise portion 353 is further provided with a substantially ring-shaped body ring 356 that protrudes in an in-plane direction of the transfer mount 351. An insertion member 357 that protrudes upwardly is provided on an upper surface of an end of the body ring 356 that is substantially opposed to the rise portion 353. The insertion member 357 includes a substantially arc-plate shaped arc plate 357A that protrudes from the upper surface of the body ring 356 with an outer circumference of the arc plate 357A being located in the in-plane direction of the transfer mount 351. An upper end of the arc plate 357A is provided with a substantially semicircular-plate shaped cover 357B for covering an upper side of the arc plate 357A.

As shown in FIG. 4, the guide 360 includes a gear 361 having a hole 361A substantially at the center thereof. The shaft 352 of the transfer mount 351 is inserted into the hole 361A of the gear 361. The gear 361 is rotatably supported by the shaft 352 with the roller driving gear 336 being meshed with the gear 361. One side of the gear 361 in an axis direction thereof is provided with a rubber-ring fitting portion 362 that protrudes in a substantially cylinder shape, the rubber-ring fitting portion 362 having an outer diameter smaller than that of the gear 361. A rubber ring 363 formed exemplarily form silicon rubber in a substantially annular shape is fitted to an outer circumference of the rubber-ring fitting portion 362. The rubber ring 363 has an outer diameter smaller than an inner diameter of the body ring 356 and a thickness dimension that allows an upper portion (one end surface in an axis direction of the rubber ring 363) of the rubber ring 363 to protrude from the upper surface of the body ring 356. Since the axis of the shaft 352 of the transfer mount 351 is inclined as described above, the rubber ring 363 is provided with the upper surface thereof being slanted from the upper surface of the body ring 356.

As shown in FIGS. 4, 6A and 6B, the press member 370 has a press ring 371 formed exemplarily from resin material in a shape of a substantially ring whose inner diameter is larger than the outer diameter of the body ring 356. An arc of a first end of the press ring 371 is provided with a bulging portion 371A that bulges downwardly. Two rotary shafts 371B are provided substantially at a middle of the arc direction of the bulging portion 371A to be spaced apart from each other by a predetermined distance. Each of the rotary shafts 371B is shaped in a substantially round rod whose diameter substantially equals to the space between the lower claw 354 and the upper claw 355 of the transfer mount 351. In the press ring 371, a substantially semicircular-plate shaped semicircular bulging portion 371C is provided at a position that is remote from the bulging portion 371A in a substantially diametric direction. The semicircular bulging portion 371C, which is arced to substantially have substantially the same arc of the arc plate 357A, bulges toward the in-plane direction. Further in the press ring 371, a trapezoidal column 372 that protrudes upward (i.e., one side of the press ring 371) in a shape of a substantially trapezoidal column is provided at a position that is remote from the bulging portion 371A in the substantially diametric direction. substantially in the center portion of the trapezoidal column 372, a semicircular groove 372A that is semicircular in plan view is provided with an arc of the semicircular groove 372A being located adjacently to a second end of the press ring 371. A portion of the press ring 371 corresponding to a bottom surface of the semicircular groove 372A serves as a spring mounting portion 371D on which a press spring 374 (see FIG. 4) is mounted. In addition, an arc-plate insertion hole 372B that is substantially arced to be larger than a cross-section of the arc plate 357A is opened at a position substantially opposed to the semicircular groove 372A. Portions of the trapezoidal column 372 corresponding to both base ends of the substantially trapezoidal shape are provided respectively with projections 372C, 372D that project toward the first end of the press ring 371. An upper portion of the trapezoidal column 372 is provided with a press piece 373 that projects in a shape of a substantially trapezoidal plate toward the planar center of the press ring 371. The press piece 373 is formed so as to decrease the thickness toward a forefront thereof. In other words, a lower surface of the press piece 373 (i.e. corresponding to a second surface of the press ring 371) is provided with a sloped surface 373A that is a flat surface sloped toward the bulging portion 371A.

As shown in FIG. 4, the rotation shaft 371B is disposed between the lower claw 354 and the upper claw 355 and the insertion member 357 is inserted into the arc-plate insertion hole 372B, such that the press ring 371 is rotatable around the rotation shaft 371B by a predetermined distance. At this time, a gap P is formed between the press piece 373 and the rubber ring 363. Reducing the width toward a base end of the press piece 737, the gap P is defined by the sloped surface 373A of the press piece 373 and the slanted upper surface of the rubber ring 363. Then, the optical disk 1N is guided with the periphery of the optical disk 1N being inserted into the gap P to be held therein. The press spring 374 is mounted between the cover 357B and the semicircular bulging portion 371C and the spring mounting portion 371D. The semicircular bulging portion 371C and the spring mounting portion 371D are downwardly biased by biasing force applied by the press spring 374, such that the press ring 371 is downwardly rotated. In accordance with the downward rotation of the press ring 371, the press member 370 presses the optical disk 1N having inserted into the gap P against the rubber ring 363 using the press piece 373.

As shown in FIGS. 2 and 3, the left guide 380 has an arm member 381 that has substantially the same shape as the arm member 331, and the arm member 381 is arranged such that a first longitudinal lateral is located adjacently to substantially the center of the stage. In the arm member 381, a lower rotary axial hole (not shown) and a rotary center 381A having an upper rotary axial hole 381A1. The arm member 381 is rotatable around a left-guide rotary shaft 382 inserted into the lower rotation axial hole, the left lower guide axial hole, the guide axial hole 317A and an upper rotary axial hole 381A1. The arm member 381 is biased by a guide biasing member (not shown) so as to be rotated in a direction toward the planar center of the stage 310. The rotary center 381A is provided with a switch operation claw 381A2 inserted into the arc slit 317B. The first end of the arm member 381 is provided with a left-guide engaging pin 383 that downwardly protrudes. The arm member 381 is provided with a bent portion 381B that is bent substantially in the same manner as the shaft accommodation portion 331B. A guide member 384 having a guide portion 384A on a first end is laminated on an upper surface of the bent portion 381B. A disk engaging portion 384B (holding unit) with which the vicinity of the periphery of the optical disk 1N is engaged is integrally formed with the distal end of the guide member 384. The disk engaging portion 384B is substantially C-shaped in cross-section with the side adjacent to the planar center of the stage 310 being open. The disk engaging portion 384B is substantially C-shaped in cross-section with a concave groove 384C similar to the gap P of the transfer unit 340 of the right guide 330 being open in a direction opposed to the right guide 330. The center portion of the concave groove 384C bulges in an arc shape.

The right stopper 390, which is formed exemplarily from a metal to be substantially thinly rectangular in plan view, has an arm member 391 that is arranged such that a first longitudinal lateral is located adjacently to substantially the center of the stage 310. The arm member 391 is arranged to be located at a position lower than the arm member 331 of the right guide 330. A lower rotation axial hole (not shown) is opened in the arm member 391 adjacently to a first longitudinal end thereof. A rotary center 391A that is bent in a manner similar to the rotary center 331A is provided on a second longitudinal lateral of the arm member 391 adjacently to the first end of the arm member 391. An upper rotary axial hole 391A1 is opened at a position substantially opposed to the lower rotation axial hole in an upper surface of the rotary center 391A. The arm member 391 is rotatable around a right-stopper rotary shaft 392 inserted into a right lower stopper axial hole, the lower rotary axial hole, the upper rotary axial hole 391A1 and a right upper stopper axial hole. The arm member 391 is biased by a stopper biasing member (not shown) so as to be rotated in a direction substantially toward the in-plane center of the stage 310. A switch operation claw 391A2 is provided on a first upper end of the rotary center 391A, and the switch operation claw 391A2 protrudes upwardly in a shape of a tongue to be inserted into the cutout 316C.

A lateral of the first end of the arm member 391 is provided with a triangular projection 391B that protrudes in a shape of a substantially triangular plate along the planar direction. A distal end of the triangular projection 391B is provided with a right-stopper engaging pin 393 that downwardly protrudes. A substantially quadrangle pin insertion hole 391B1 is opened substantially in the center of the triangular projection 391B, and the right-guide engaging pin 334 is movably inserted into the pin insertion hole 391B1. The pin insertion hole 391B1 has such a shape as to allow the right-guide engaging pin 334 to be moved integrally with the right guide 330 when the right guide 330 is biased by the inserted optical disk 1N to be rotated. A stopper member 394 formed exemplarily from a resin in a shape of a substantially thin rectangular plate is laminated on a second longitudinal end of the arm member 391. A disk engaging portion 394A with which the vicinity of the periphery of the optical disk 1N is engaged is integrally formed with a second end of the stopper member 394. The disk engaging portion 344A is substantially C-shaped in cross-section with the side adjacent to the planar center of the stage 310 being open.

As shown in FIGS. 2 and 3, the left stopper 400 has an arm member 401 that has substantially the same shape as the arm member 391, and the arm member 401 is arranged such that a first longitudinal lateral is located adjacently to substantially the center of the stage 310. The arm member 401, which is positioned lower than the arm member 381 of the left guide 380, includes a lower rotary axial hole (not shown) and a rotary center 401A having an upper rotary axial hole 401A1. The arm member 401 is rotatable around a left-stopper rotary shaft 402 inserted into a left lower stopper axial hole, the lower rotary axial hole, the upper rotary axial hole 401A1 and a left upper stopper axial hole. The arm member 401 is biased by a stopper biasing member (not shown) so as to be rotated in a direction substantially toward the in-plane center of the stage 310. The rotary center 401A is provided with a switch operation claw 401A2 inserted into the cutout 317C. The arm member 401 is further provided with a triangular projection 401B having a left-stopper engaging pin 403 and a pin insertion hole 401B1. The pin insert hole 401B1 has such a shape as to allow the left-guide engaging pin 383 to be moved integrally with the left guide 380 when the left guide 330 is rotated by the optical disk 1N. A stopper member 404 having a disk engaging portion 404A is laminated on the arm member 401.

The insertion-and-ejection detector 410 detects an insertion and an ejection of the optical disk 1N (hereinafter, the insertion and ejection will be collectively called insertion/ejection as necessary). As shown in FIG. 2, the insertion-and-ejection detector 410 includes circuits 411, 414 that are respectively disposed on the right upper corner 316 and the left upper corner 317. The circuit 411 is connected to the device controller. The circuit 411 is provided with: a right guide detector 412 for detecting the insertion/ejection of the optical disk 1N entailed by the rotation of the right guide 330; and a right stopper detector 413 for detecting the insertion/ejection of the optical disk 1N entailed by the rotation of the right stopper 390. First surfaces of the right guide detector 412 and the right stopper detector 413 are respectively provided with advancing-and-retracting portions 412A, 413A that are contacted by the switch operation claws 331A2, 391A2 to be advanced and retracted. The right guide detector 412 and the right stopper detector 413 detect the insertion/ejection of the optical disk 1N based on advancing and retracting of the advancing-and-retracting portions 412A, 413A, and output as necessary a signal having such information to the device controller via the circuit 411. The circuit 414 is provided with a left guide detector 415 and a left stopper detector 416 respectively for detecting the insertion/ejection of the optical disk 1N. The left guide detector 415 and the left stopper detector 416 detect the insertion/ejection of the optical disk 1N based on advancing and retracting of advancing-and-retracting portions 415A, 416A that are responsive to contacts with the switch operation claws 381A2, 401A2, and output as necessary a signal having such information to the device controller via the circuit 414.

The evacuation control mechanism 420 evacuates as necessary the right guide 330, the left guide 380, the right stopper 390 and the left stopper 400 in the out-of-plane direction of the stage 310. Specifically, the right guide 330, the left guide 380, the right stopper 390 and the left stopper 400 are moved to evacuate positions and standby positions. The evacuation positions are positions where the right guide 330, the left guide 380, the right stopper 390 and the left stopper 400 are not overlapped in plan view on the optical disk 1N supported by the turntable 221 of the disk processor 200 when the distal ends of the right guide 330, the left guide 380, the right stopper 390 and the left stopper 400 are rotated toward the inner circumference of the stage 310. The standby positions are positions where the distal ends of the right guide 330, the left guide 380, the right stopper 390 and the left stopper 400 have been moved toward the center of the stage 310. As shown in FIGS. 2 and 3, the evacuation control mechanism 420 includes a right evacuation-control plate 421, a left evacuation-control plate 422, an evacuation control gear 423 and the like. It should be noted that the right evacuation-control plate 421 and the left evacuation-control plate 422 are arranged substantially in the same manner, and that substantially the same components are referred to by the same name and the description thereof may be simplified.

As shown in FIG. 3, the right evacuation-control plate 421, which is formed exemplarily from a metal in a shape of a substantially rectangular plate, has a control plate center 421A arranged adjacently to the rear portion 314 such that a longitudinal direction thereof substantially coincides with the right-and-left direction of the stage 310. Pin engaging slits 421A1 are opened in the control plate center 421A adjacently to the right portion 312 and the left portion 313, and the pins 318A protruding from the rear lower portion are slidably engaged with the pin engaging slits 421A1. A lateral of the control plate center 421A adjacent to the left portion 313 is provided with a meshing portion 421B that protrudes in a shape of a substantially rectangular plate. A lateral of the meshing portion 421B adjacent to the front portion 311 is provided with a meshing groove 421B1 for meshing with the evacuation control gear 423.

A trapezoidal projection 421C that trapezoidally protrudes toward the front portion 311 is provided to the control plate center 421A adjacently to the right portion 321. A substantially triangular pin engaging hole 421C1 with which the right-guide engaging pin 334 is slidably engaged is opened substantially in the center of the trapezoidal projection 421C. The pin engaging hole 421C1 is shaped to slide the right-guide engaging pin 334 so that the right guide 330 is rotated in the direction toward the right portion 312 against the biasing force applied by the guide biasing member when the right evacuation-control plate 421 is moved toward the left portion 313. On the other hand, the pin engaging hole 421C1 is also shaped to slide the right-guide engaging pin 334 so that the right guide 330 is rotated in the direction toward the left portion 313 by the guide biasing member when the right evacuation-control plate 421 is moved toward the right portion 312. The pin engaging hole 421C1 is also shaped so as to allow the right-guide engaging pin 334 to be moved integrally with the right guide 330 when the right guide 330 is rotated by the optical disk 1N with the right evacuation-control plate 421 being the closest to the right portion 312.

A corner of the trapezoidal projection 421C adjacent to the right portion 321 is provided with a pin engaging portion 421D that is shaped to protrude toward the front portion 311 and subsequently toward the left portion 313 substantially orthogonally. The right-stopper engaging pin 393 is slidably engaged with the pin engaging portion 421D. The pin engaging portion 421D is shaped to slide the right-stopper engaging pin 393 so that the right stopper 390 is rotated in the direction toward the rear portion 314 against the biasing force applied by the stopper biasing member when the right evacuation-control plate 421 is moved toward the left portion 313. On the other hand, the pin engaging portion 421D is also shaped to slide the right-stopper engaging pin 393 so that the right stopper 390 is rotated in the direction toward the front portion 311 by the stopper biasing member when the right evacuation-control plate 421 is moved toward the right portion 312. The pin engaging portion 421D is also shaped so as to allow the right-stopper engaging pin 393 to be moved integrally with the right stopper 390 when the right stopper 390 is rotated by the optical disk 1N with the right evacuation-control plate 421 being the closest to the right portion 312. The right evacuation-control plate 421 is controlled by the device controller to be moved as necessary toward the right portion 312 or toward the left portion 313.

As shown in FIG. 3, the left evacuation-control plate 422, which is shaped in a substantially rectangular plate, has a control plate center 422A arranged adjacently to the front portion 311 while being spaced apart form the right evacuation-control plate 421 by a predetermined distance such that a longitudinal direction thereof substantially coincides with the right-and-left direction of the stage 310. A substantially triangular pin engaging hole 422A1 with which the left-guide engaging pin 383 is slidably engaged is opened on the control plate center 422A adjacently to the left portion 313. The pin engaging hole 422A1 is shaped to rotate the left guide 380 in the direction toward the left portion 313 against the biasing force applied by the guide biasing member when the left evacuation-control plate 422 is moved toward the right portion 312. On the other hand, the pin engaging hole 422A1 is also shaped to rotate the left guide 380 in the direction toward the right portion 312 by the biasing force applied by the guide biasing member when the left evacuation-control plate 422 is moved toward the left portion 313. The pin engaging hole 422A1 is also shaped so as to allow the left-guide engaging pin 383 to be moved integrally with the left guide 380 when the left guide 380 is rotated by the optical disk 1N with the left evacuation-control plate 422 being the closest to the left portion 313. A lateral of the control plate center 422A adjacent to the right portion 312 is provided with a meshing portion 422B that protrudes in a shape of a substantially rectangular plate. A lateral of the meshing portion 422B adjacent to the rear portion 341 is provided with a meshing groove 422B1 for meshing with an evacuation control gear 423. Pin engaging slits 422B2 are opened on the meshing portion 422B, and the pin 318B protruding from the rear lower portion is slidably engaged with the pin engaging slits 422B2.

A rectangular projection 422C that protrudes in a shape of a substantially rectangular plate from a lateral of the control plate center 422A adjacent to the rear portion 314 is provided to the control plate center 422A adjacently to the left portion 321. A pin engaging slit 422C1 is opened on the rectangular projection 422C, and the pin 318B is slidably engaged with the pin engaging slit 422C1. A portion of the control plate center 422A adjacent to the left portion 313 is provided with a pin engaging portion 422D that is shaped to protrude toward the front portion 311 from a lateral of the control plate center 422A adjacent to the front portion 311 and subsequently toward the right portion 312 substantially orthogonally. The left-stopper engaging pin 403 is slidably engaged with the pin engaging portion 422D. The pin engaging portion 422D is shaped to rotate the left stopper 400 in the direction toward the rear portion 314 against the biasing force applied by the stopper biasing member when the left evacuation-control plate 422 is moved toward the right portion 312. On the other hand, the pin engaging portion 422D is also shaped to rotate the left stopper 400 in the direction toward the front portion 311 by the biasing force applied by the stopper biasing member when the left evacuation-control plate 422 is moved toward the left portion 313. The pin engaging portion 422D is also shaped so as to allow the left-stopper engaging pin 403 to be moved integrally with the left stopper 400 when the left stopper 400 is rotated by the optical disk 1N with the left evacuation-control plate 422 being the closest to the left portion 313.

As described above, the evacuation control gear 423 is meshed with the meshing groove 421B1 of the right evacuation-control plate 421 and the meshing groove 422B1 of the left evacuation-control plate 422. The evacuation control gear 423 is rotated counterclockwise when the right evacuation-control plate 421 is moved toward, for instance, the left portion 313, and moves the left evacuation-control plate 422 toward the right portion 312. In other words, the right evacuation-control plate 421 and the left evacuation-control plate 422 are equally moved in a direction to relatively approach each other or a direction to be relatively apart from each other. Specifically, by the movement of the right evacuation-control plate 421 and the left evacuation-control plate 422 in the direction to relatively approach each other, the right guide 330, the left guide 380, the right stopper 390 and the left stopper 400 are moved to the evacuation positions. On the other hand, by the movement of the right evacuation-control plate 421 and the left evacuation-control plate 422 in the direction to relatively approach each other, the right guide 330, the left guide 380, the right stopper 390 and the left stopper 400 are moved to the standby positions.

As shown in FIGS. 2 to 5, the lower case 120 is provided with an elevation control mechanism 500 (exchange control unit) for controlling an elevation of the disk elevator 300. The elevation control mechanism 500 exemplarily includes: a right elevation-control plate 520, the right elevation-control plate 520 being a thin plate arranged to be movable in the front and rear direction of the case 110 between the right lateral plate 124 and the right portion 312; a left elevation-control plate 530, the left elevation-control plate 530 being a thin plate arranged to be movable in the front and rear direction of the case 110 between the left lateral plate 125 and the left portion 313; and a movement controller 540 for controlling the movement of the right elevation-control plate 520 and the left elevation-control plate 530. It should be noted that the right elevation-control plate 520 and the left elevation-control plate 530 are arranged substantially in the same manner, and that substantially the same components are referred to by the same name and the description thereof may be simplified.

As shown in FIGS. 7 and 8, a tongue-like left control-plate connector 531 substantially orthogonally bent toward the inside of the lower case 120 is integrally provided on a lower edge of the left control-plate connector 531 adjacently to the rear plate 123. A cutout 531A with which a later-described burring hole 563A is movably engaged is formed from a front end to substantially the center in the left control-plate connector 531. Laterals of the left elevation-control plate 530 respectively adjacent to the front plate 122 and the rear plate 123 are provided with movement restricting portions 532 that protrude toward the out-of-plane direction in a shape of a tongue. A screw hole 532A is formed substantially at the center of each movement restricting portion 532. As shown in FIG. 2, a screw 532B is inserted into the screw hole 532A of the movement restricting portion 532 via a screw insertion slit 125B.

As shown in FIGS. 2 and 7, a portion of an upper edge of the left elevation-control plate 530 adjacent to the front plate 122 and substantially the longitudinal center portion of the left elevation-control plate 530 are respectively provided with claws 533 that upwardly protrude in a shape of a tongue. Each claw 533 includes a claw base 533A that upwardly protrudes from the upper edge of the left elevation-control plate 530. A claw intermediate portion 533B substantially orthogonally bent toward the out-of-plane direction of the left elevation-control plate 530 is formed integrally with a distal end of the claw base 533A. A claw end 533C upwardly bent substantially orthogonally is formed integrally with a distal end of the claw intermediate portion 533B. The claw 533 is slidably inserted into the claw insertion slit 125A with the claw intermediate portion 533B being supported. A left cam groove 534 (slide support) into which the left elevation-control pin 313A is slidably inserted is opened from the claw intermediate portion 533B to the vicinity of the lower edge of the left elevation-control plate 530. The left cam groove 534 is configured substantially in a stepped shape so as to: position the stage 310 at a lower position in the lower case 120 when the left elevation-control plate 530 is located adjacently to the front plate 122; position the stage 310 at a position that is substantially in the middle of the up-and-down direction in the lower case 120 when the left elevation-control plate 530 is located at a position that is substantially in the middle of the front-and-rear direction; and position the stage 310 at an upper position in the lower case 120 when the left elevation-control plate 530 is located adjacently to the rear plate 123.

The lower position in the lower case 120 corresponds to a mounting position at which the optical disk 1N is mounted on the turntable 221. The position that is substantially in the middle of the up-and-down direction in the lower case 120 corresponds to an insertion/ejection position at which the optical disk 1N is inserted and ejected via the disk insertion opening 111A. The upper position in the lower case 120 corresponds to a temporarily fixing position at which the optical disk 1N is temporarily fixed to a later-described temporarily fixing portion 600. Specifically, the left cam groove 534 includes: a lower point 534A stretching in front/rear direction (longitudinal direction) at which the stage 310 is kept at the mounting position; a middle point 534B stretching in the front/rear direction at which the stage 310 is kept at the insertion/ejection position; an upper point 534C stretching in the front/rear direction at which the stage 310 is kept at the temporarily fixing position; a slanted insertion/ejection movement section 534D that intercommunicates an end of the lower point 534A and an end of the middle point 534B so as to allow vertical movement of the stage 310 between the mounting position and the insertion/ejection position; and a temporarily fixing movement section 534E that intercommunicates an end of the middle point 534B and an end of the upper point 534C so as to allow vertical movement of the stage 310 between the insertion/ejection position and the temporarily fixing position. The left cam groove is configured substantially in a stepped manner. The insertion/ejection position is also a reproduction position at which the reading and recording process of the optical disk 1N is conducted.

As shown in FIG. 8, a right control-plate connector 521 substantially orthogonally bent toward the inside of the lower case 120 is formed integrally with a lower edge of the right elevation-control plate 520 adjacently to the rear plate 123. The right control-plate connector 521 includes a cutout 521A. As shown in FIGS. 2 and 8, laterals of the right elevation-control plate 520 respectively adjacent to the front plate 122 and the rear plate 123 are provided with movement restricting portions 522 that have screw holes (not shown) into which screws 522B are inserted. Claws 523 are provided substantially on the longitudinal center portion of an upper edge of the right elevation-control plate 520 and a portion of the upper edge adjacent to the rear plate 123 respectively. A right cam groove (slide support: not shown) into which the right elevation-control pin is slidably inserted is opened from the claw intermediate portion 533B to the vicinity of the lower edge of the right elevation-control plate 520. Similar to the left cam groove 534, the right cam groove is configured substantially stepwise so as to: position the stage 310 at the lower position in the lower case 120 when the right elevation-control plate 520 is located adjacently to the rear plate 123; position the stage 310 at the position that is substantially in the middle of the up-and-down direction in the lower case 120 when the right elevation-control plate 520 is located at the position that is substantially in the middle of the front-and-rear direction; and position the stage 310 at the upper position in the lower case 120 when the right elevation-control plate 520 is located adjacently to the front plate 122. The right elevation-control pin, the left elevation-control pin 313A, the right cam groove and the left cam groove 534 form a cam.

As shown in FIG. 2, the movement controller 540 includes a rotary member control mechanism 550, a rotating member 560 and the like. The rotary member control mechanism 550 controls the rotation of the rotating member 560. The rotary member control mechanism 550 includes a first power transmitter 551, a second power transmitter 552, a third power transmitter 553 and the like.

The first power transmitter 551 includes a shaft 551A that is disposed rotatably about an axis with the axis direction thereof substantially coinciding with the right-and-left direction of the bottom plate 121. A gear 551B and a screw 551C are provided integrally on ends of the shaft 551A adjacent to the right lateral plate 124 and the left lateral plate 125 respectively. The shaft 551A is appropriately rotated under the control of the device controller.

The second power transmitter 552 includes a gear 552B that is disposed rotatably about a shaft 552A. The shaft 552A is meshed with the screw 551C and arranged so as to substantially coincide with the up-and-down direction.

As shown in FIGS. 2 and 8, the third power transmitter 553 includes a gear 553B that is disposed rotatably about a shaft 553A substantially aligned with vertical direction when meshed with the gear 552B. The gear 553B is held such that a bottom surface thereof faces the bottom plate 121. The lower surface of the gear 553B is provided with a rotation control member 553C shaped in a substantially U-shaped plate. The rotation control member 553C protrude from the bottom plate 121. The rotation control member 553C is substantially in a U-shape of which outer profile is substantially aligned with an arc of a first imaginary circle (not show) coaxial with the gear 553B. Further, a rotation control pin 553D that protrudes from the bottom plate 121 is provided adjacently to the outer periphery of the substantially U-shaped opening of the rotation control member 553C on the lower side of the gear 553B. The rotation control pin 553D is provided at a position on a second imaginary circle described around the gear 553B by the rotation of the gear 553B to be larger than the first imaginary circle.

The rotating member 560 is formed exemplarily from a metal in a shape of a substantially thin rectangular plate. The rotating member 560 is shaped to reduce its width from the longitudinal center toward its first end and to increase and subsequently reduce the width therefrom toward its second end. The rotation member 560 is disposed on the lower portion of the bottom plate 121 adjacently to the rear plate 123 to be rotatable around a rotary shaft 561 provided substantially at the longitudinal center of the rotation member 560. Rotating-and-connecting portions 562, 563 that protrudes in a tongue-shape in out-of-plane direction are provided on a first end and a second end of the rotating member 560 in longitudinal direction. Burring holes 562A, 563A whose circumferences protrude downwardly are respectively formed substantially at the center of the rotating-and-connecting portions 562, 563. The burring holes 562A, 563A each are engaged with the cutout 521A of the right control-plate connector 521 and the cutout 531A of the left control-plate connector 531.

Between substantially the longitudinal center of the rotating member 560 and the rotating-and-connecting portion 563, a rotation control hole 564 is opened, on and with which the rotation control member 553C abuts as necessary and the rotation control pin 553D is engaged as necessary. An arc portion 564A that is arced to have substantially the same arc as the second imaginary circle is provided on the rotation control hole 564 adjacently to the rotating-and-connecting portion 563. An insertion-and-ejection abutment portion 564B that is shaped to substantially coincide with the arc of the first imaginary circle is formed at a position substantially opposed to the arc portion 564A on which the rotation control member 553C abuts when the stage 310 is located at the insertion/ejection position. A mounting-and-engaging portion 564C that is shaped to extend toward the rotary shaft 561 is formed on an end of the insertion-and-ejection abutment portion adjacently to the rear plate 123 with which the rotation control pin 553D is engaged when the stage 310 is located at the mounting position. A mount-and-abutment portion 564D that is shaped to substantially coincide with an arc of an imaginary circle (not shown) identical to the first imaginary circle is formed on an end of the arc portion 564A adjacently to the rear portion 314. The rotation control member 553C abuts on the mount-and-abutment portion 564D when the stage 310 is located at the mounting position. An end of the mount-and-abutment portion 564D is connected to a base end of the mounting-and-engaging portion 564C via a connector 564E that substantially linearly extends toward the arc portion 564A. The arc portion 564A and an end of the insertion-and-ejection abutment portion 564B adjacent to the front portion 311 are provided with a temporarily fixing-and-engaging portion 564F and a temporarily fixing-and-abutting portion 564G and a connector 564H. The fixing-and-engaging portion 564F, the temporarily fixing-and-abutting portion 564G and the connector 564H are arranged substantially line-symmetrically with respect to an imaginary line that connects substantially the centers of the arc portion 564A and the insertion-and-ejection abutment portion 564B.

The elevation control mechanism 500 is further connected with a locking mechanism (not shown) for fixing and releasing the disk processor 200 (i.e., restricting and unrestricting the mount 210) in conjunction with the elevation of the stage 310. In other words, the locking mechanism is operated such that the mount 210 is shifted from an unrestricted state where the mount 210 is supported by the flexible member on the bottom plate 121 to a state where the mount 210 is fixed such that the movement thereof is restricted in conjunction with the movement of the stage 310 from the insertion/ejection position corresponding to the disk-insertion opening 111A to the mounting position located below the insertion/ejection position.

On the other hand, a temporarily fixing portion 600 (holding device) for tentatively fixing (i.e., temporarily fixing) the optical disk 1N in a detachable manner is provided on the upper case 130 of the case 110 as shown in FIG. 9. The temporarily fixing portion 600 includes a support 610 and a disk engagement-disengagement mechanism 620 (moving unit).

As shown in FIGS. 9 to 13, the support 610 includes an support portion 611 configured as an approximate cylinder with a diameter capable of being inserted into the disk hole 1NA of the optical disk 1N, i.e. equal to or smaller than the diameter of the disk hole 1NA, more specifically, slightly smaller than the disk hole 1NA. On the outer circumference of an axial end of the support portion 611, a positioning portion 612 protruding outward in a flanged manner on which a first side of the optical disk 1N is abutted adjacent to the periphery of the disk hole 1NA, i.e. the positioning portion 612 protrudes to have a larger diameter than the disk hole 1NA. Incidentally, the positioning portion 612 may not protrude in a flanged manner but may be configured in any manner (e.g. protrusion provided by a plurality of radial extensions) as long as the first side of the optical disk 1N can be abutted to be positioned. A pair of attachment tongue pieces 612A projecting outward in a tongue-shape are radially provided on the outer periphery of the positioning portion 612. Screw through-holes 612B attached with screws 631 to the upper case 130 are provided on the attachment tongue piece 612A. The support portion 611 is attached thereby so that the opposing direction of the attachment tongue pieces 612A extends along a transfer direction in which the optical disk 1N is transferred via the disk insertion hole 111A at a position where the support portion 611 substantially opposes to the turntable 221 approximately at the center of the upper case 130.

Further, the positioning portion 612 is provided with an attachment column 612C at a back side opposite to the side in which the support portion 611 protrudes, the attachment column protruding substantially cylindrically in a direction opposite to the support portion 611 to be inserted into a hole provided on the upper case 130 to be positioned. An operation groove 612E of which inner circumference radially extends toward an outer circumference is provided on the back side of the positioning portion 612. A concave notched escape portion 612F is provided on a front side on which the support portion 611 of the positioning portion 612 protrudes. The concave notched escape portion 612F extends from the inner circumference of the positioning portion 612 in a direction in which one of the attachment tongue pieces 612A protrudes.

An engagement/disengagement concave portion 613 is provided on a distal end (axial second end) of the support portion 611 projecting relative to the positioning portion 612. The engagement/disengagement concave portion 613 is shaped in a concave groove extending in the opposing direction of the pair of the attachment tongue pieces 612A, i.e. along the transfer direction of the optical disk 1N, and having both ends opened on the circumference of the support portion 611. The engagement/disengagement concave portion 613 axially divides the support portion 611 to be in communication with the inner circumferential side of the positioning portion 612 to which the attachment column 612C faces. One of the axial laterals of the engagement/disengagement concave portion 613 is in communication with the operation groove 612E and first axial end is in communication with the notched escape portion 612F. Guide groove 613A (guide section) is provided on both sides of the support portion 611 opposing widthwise along an axial direction of the engagement/disengagement concave portion 613 located on the inner circumference of the positioning portion 612 to be covered by the upper case 130. The guide groove 613A is configured as a concave groove in a stepped manner along the engagement/disengagement concave portion 613 to be faced to the engagement/disengagement concave portion 613.

A first engaging portion 614 that protrudes in a flanged manner from the peripheral end (the other end in the axial direction) is provided on the circumference of the support portion 611 in a range approximately semi-circle around the position at which the axial one end to be in communication with the notched escape portion 612F of the engagement/disengagement concave portion 613 is opened. The first engaging portion 614 opposes to the positioning portion 612 with a gap equal to or more of the thickness of the optical disk 1N. The first engaging portion 614 is shaped so that the circumferential protrusion thereof is gradually reduced from the position at which the first axial end of the engagement/disengagement concave portion 613 is opened. A guide surface 611A slanted so that the diameter of the support portion 611 is reduced toward the tip end thereof is provided on the periphery of the tip end (the second axial end) of the support portion 611 on a side opposite to the first engaging portion 614, i.e. approximately over a range of a semi-circle around a position at which the second axial end of the engagement/disengagement concave portion 613 is opened. The guide surface 611A is the widest at the opening position of the second end of the engagement/disengagement concave portion 613 and gradually reduces the width thereof in the circumferential direction.

A moving member 615 is disposed on the engagement/disengagement concave portion 613 in a manner movable along the axial direction of the engagement/disengagement concave portion 613 (radial direction of the support portion 611). The moving member 615 is a rectangular member of approximately the same shape as the engagement/disengagement concave portion 613. An end in the longitudinal direction (moving direction) of the moving member 615 corresponding to the first end of the engagement/disengagement concave portion 613 is curved in a manner approximately corresponding to the curvature of the circumference of the support portion 611 A second engaging portion 616 longitudinally protruding in a flanged manner from a periphery corresponding to the tip end of the support portion 611 is provided on an axial end of the moving member 615. The second engaging portion 616 protrudes in a rib shape along the curved end of the moving member 615.

A release portion 617 is provided on the second axial end of the moving member 615. The release portion 617 is configured so that a periphery adjacent to the upper case 130 (corresponding to the bottom side of the engagement/disengagement concave portion 613) is shaped approximately in a wedge-shape projecting toward the second axial end relative to the periphery corresponding to the tip end of the support portion 611 and is provided with a guide surface 617A that is slanted toward the tip end of the support portion 611. The guide surface 617A of the release portion 617 is curved in a manner approximately corresponding to the curvature of the circumference of the support portion 611.

The moving member 615 is also provided with engaging ribs 615A. The engaging ribs 615A protrude widthwise as a longitudinal wall on the side of the upper case 130 corresponding to the bottom side of the engagement/disengagement concave portion 613 on both axial sides to be slidably engaged with the guide grooves 613A respectively. An operative engaging concave portion 615B is provided on the moving member 615 on a side opposing to the bottom side of the engagement/disengagement concave portion 613 and having the engaging rib 615A. The operative engaging concave portion 615B is configured as a dented groove from the approximate center to the first side to be in communication with the operation groove 612E. Incidentally, any arrangement where, for instance, the concave/convex relationship of the guide groove 613A and the engaging rib 615A is reversed, may be employed as long as the moving member 615 is movable along the longitudinal direction and is in slidable engagement.

On the other hand, the disk engagement/disengagement mechanism 620 includes an engagement/disengagement operative plate 621 as shown in FIGS. 9 to 13. The engagement/disengagement operative plate 621 includes: a substantially disk-shaped rotary plate 621A rotatably supported approximately around the center thereof on the upper case 130; an operative arm 621B integrally protruding in the radial direction from the periphery of the rotary plate 621A; a force-applying arm 621C that integrally protrudes in another radial direction from the periphery of the rotary plate 621A orthogonal to the projecting direction of the operative arm 621B, and is configured approximately in L-shape in plan view. A pair of guide claws 621D that protrude outward in a tongue-shape to be slidably engaged with a stepped portion 131 cut and raised on the upper case 130 to prevent detachment of the rotary plate 621A and guide the rotation thereof are radially positioned on the periphery of the rotary plate 621A of the engagement/disengagement operative plate 621.

A tip end of the operative arm 621B of the engagement/disengagement operative plate 621 is substantially configured as a disk to be engaged with the operative engaging concave portion 615B of the moving member 615 via the operation groove 612E of the support 610 attached to the upper case 130. A tongue-shaped engagement/disengagement rotating claw 621E is formed and bent at the tip end of the force-applying arm 621C of the engagement/disengagement operative plate 621 in a manner adapted to be in contact with an end of the claw 523 of the right elevation-control plate 520 of the elevation control mechanism 500. A biasing means 622 such as a helical spring that is bridged against the upper case 130 to apply biasing force is provided on the tip end of the force-applying arm 621C. When the right elevation control pin of the stage 310 engaged with the right cam groove of the right elevation control plate 520 of the elevation control mechanism 500 is relatively moved from the temporarily fixing movement section 534E of the right cam groove to the upper point 534C to move the stage 310 to the temporarily fixing position and further to move the right elevation control plate 520 in the upper point 534C, the claw 523 abuts to push the engagement/disengagement rotating claw 621E, so that the engagement/disengagement operative plate 621 is rotated against the biasing force of the biasing unit 622. The rotation is accompanied by the rotation of the integrated operative arm 621B, which results in longitudinal movement of the moving member 615 within the engagement/disengagement concave portion 613.

Incidentally, until a time point immediately before the claw 523 is in contact with the engagement/disengagement rotating claw 621E, the second engaging portion 616 and the first longitudinal end of the moving member 615 protrude from the circumference of the support portion 611 to be located at a mounting position (i.e. regular position at which the optical disk 1N is held) as shown in FIGS. 10 and 11. When the engagement/disengagement operative plate 621 is rotated by the claw 523, the second engaging portion 616 and the first longitudinal end is retracted relative to the circumference of the support portion 611 and the release portion 617 in the longitudinal direction is protruded from the circumference of the support portion 611 to be located at a release position. The length from the rotation center of the operative arm 621B to the tip end thereof and the length of the rotation center of the force-applying arm 621C to the engagement/disengagement rotating claw 621E are set so that the moving member 615 moves between the mounting position and the release position in accordance with the moving distance of the right elevation control plate 520. At the mounting position shown in FIGS. 10 and 11, the periphery of the disk hole 1NA of the optical disk 1N is circumferentially fixed at three points of: the protruded end of the moving member 615 or the second engaging portion 616; and circumferences of the axial support 611 located on both sides relative to the opening of the engagement/disengagement concave portion 613 or the first engaging portion 614. Further, the optical disk 1N is positioned to be sandwiched by the positioning portion 612 and the first and the second engaging portions 614, 616 in thickness direction. Thus, the optical disk 1N is temporarily fixed on the temporarily fixing portion 600. On the other hand, at the release position shown in FIGS. 12 and 13, the periphery of the disk hole 1NA of the optical disk 1N is pushed by the guide surface 617A of the release portion 617 of the moving member 615 to be moved toward the support portion 611 to release the temporal fixing of the optical disk 1N.

The device controller (not shown) for controlling operations of the entire disk device 100 is disposed in, for example, a lower portion of the lower case 120 in the case 110. The device controller also functions as a movement controller included in a replacement controller according to the present invention. The operations controlled by the device controller includes a reproducing and recording operation of the optical disk 1N, an insertion/ejection operation of the optical disk 1N, a mounting operation and a temporarily fixing operation of the optical disk 1N, an evacuation operation of the right guide 330, an elevation operation of the stage 310 and the like, but are not limited thereto.

The right guide 330, the left guide 380, the elevation control mechanism 500, the temporary fixing portion 600 and the device controller provides a disk exchanging device of the present invention.

[Operations of Disk Device]

Next, operations of the disk device 100 will be described with reference to the attached drawings.

(Operations of Elevation Control Mechanism)

Figure 14:
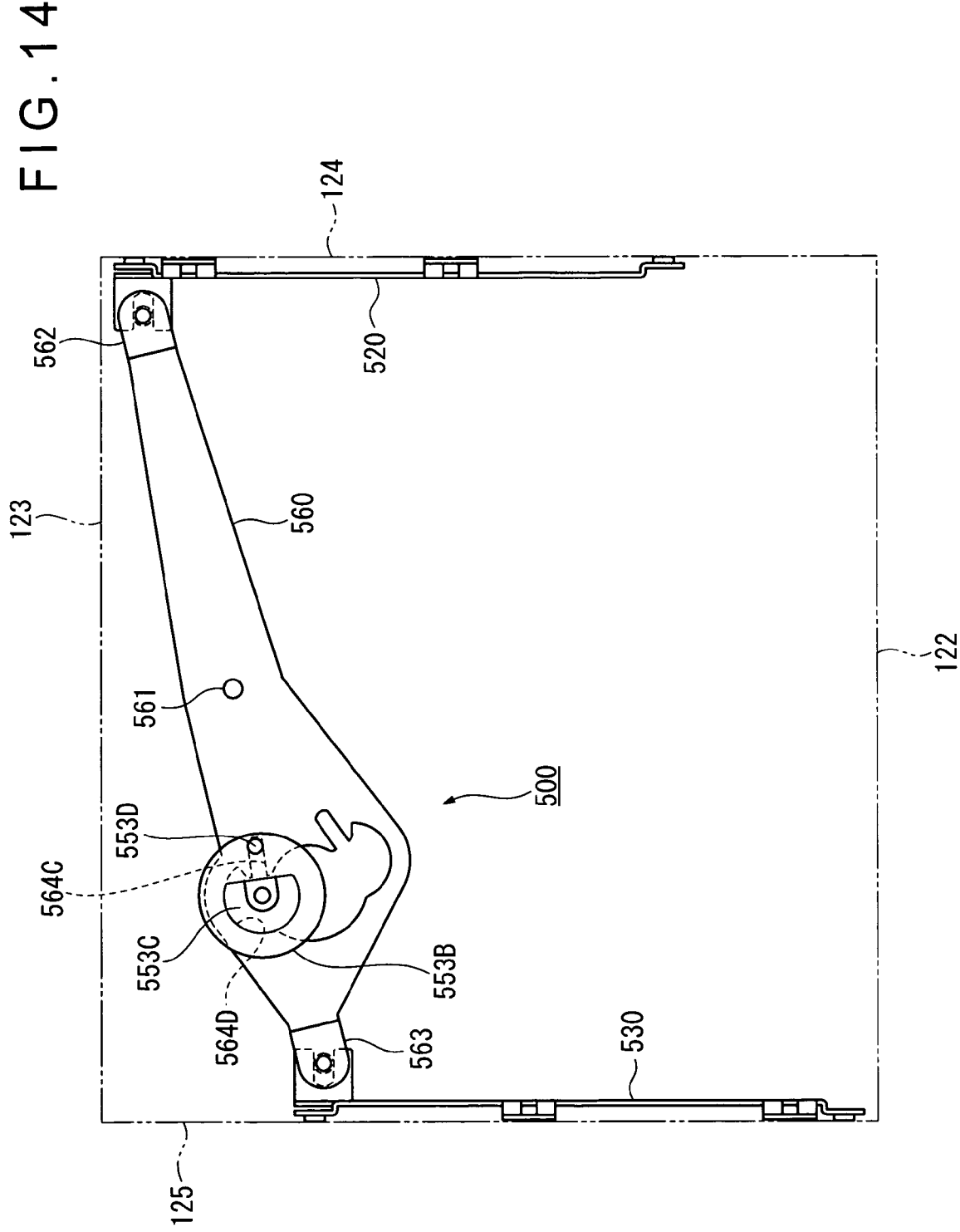
FIG. 14 is a plan view showing an elevation control mechanism when the disk holding mechanism reaches to a mounting position according to the above embodiment.
Figure 15:
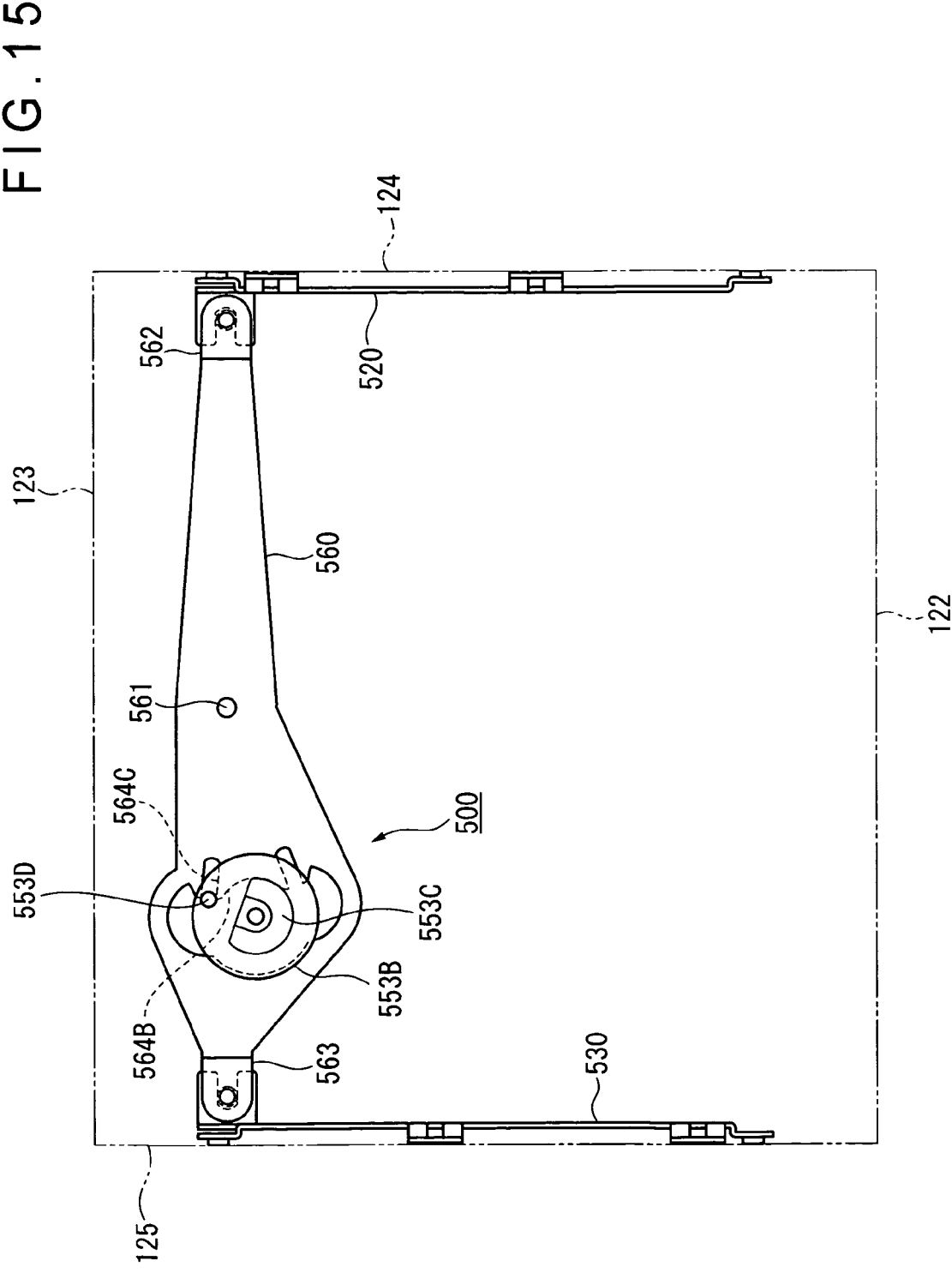
FIG. 15 is a plan view showing an elevation control mechanism when the disk holding mechanism reaches to an insertion/ejection position according to the above embodiment.
Figure 16:
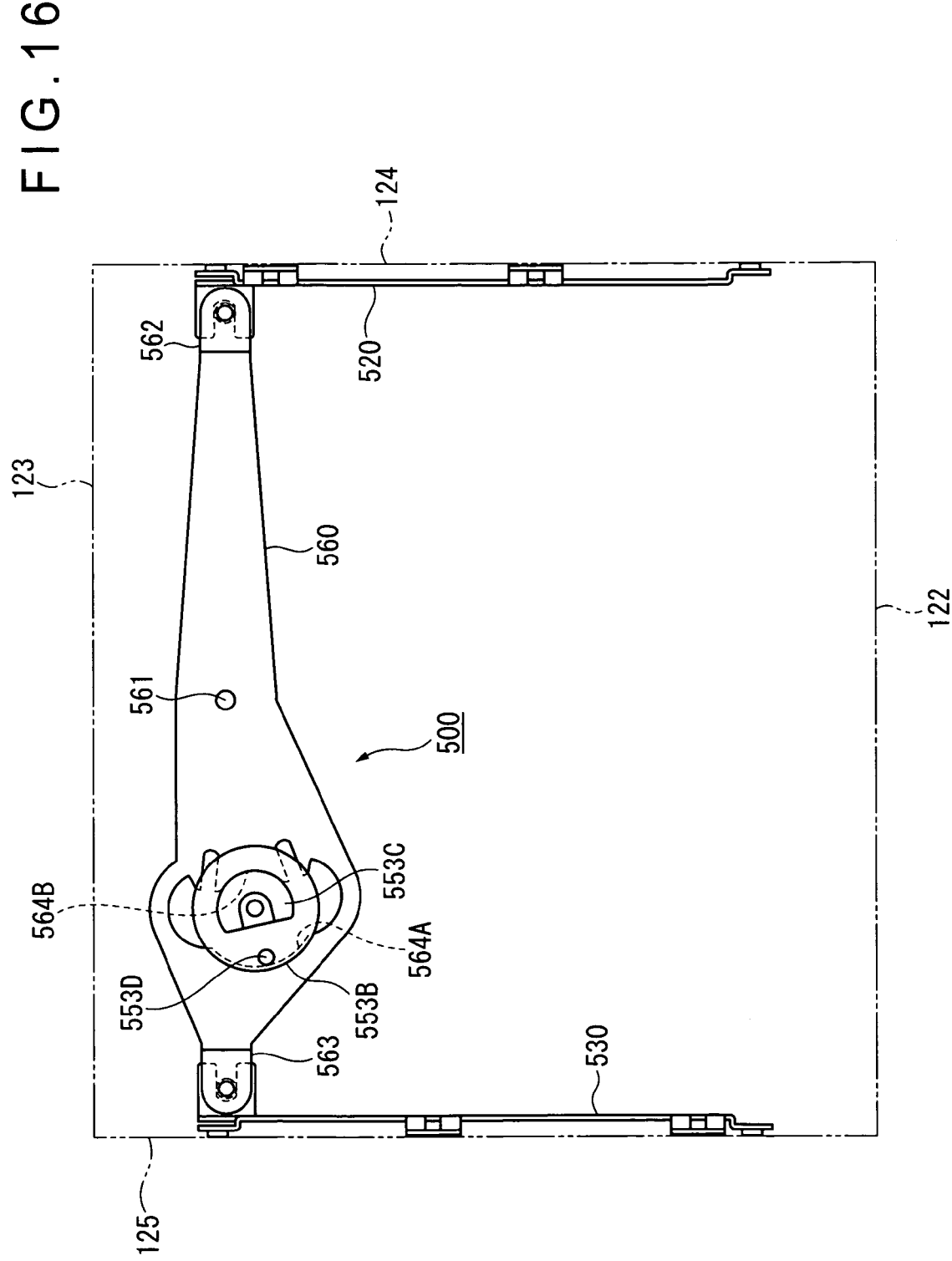
FIG. 16 is a plan view showing an elevation control mechanism when the disk holding mechanism reaches to an insertion/ejection position according to the above embodiment.
Figure 17:
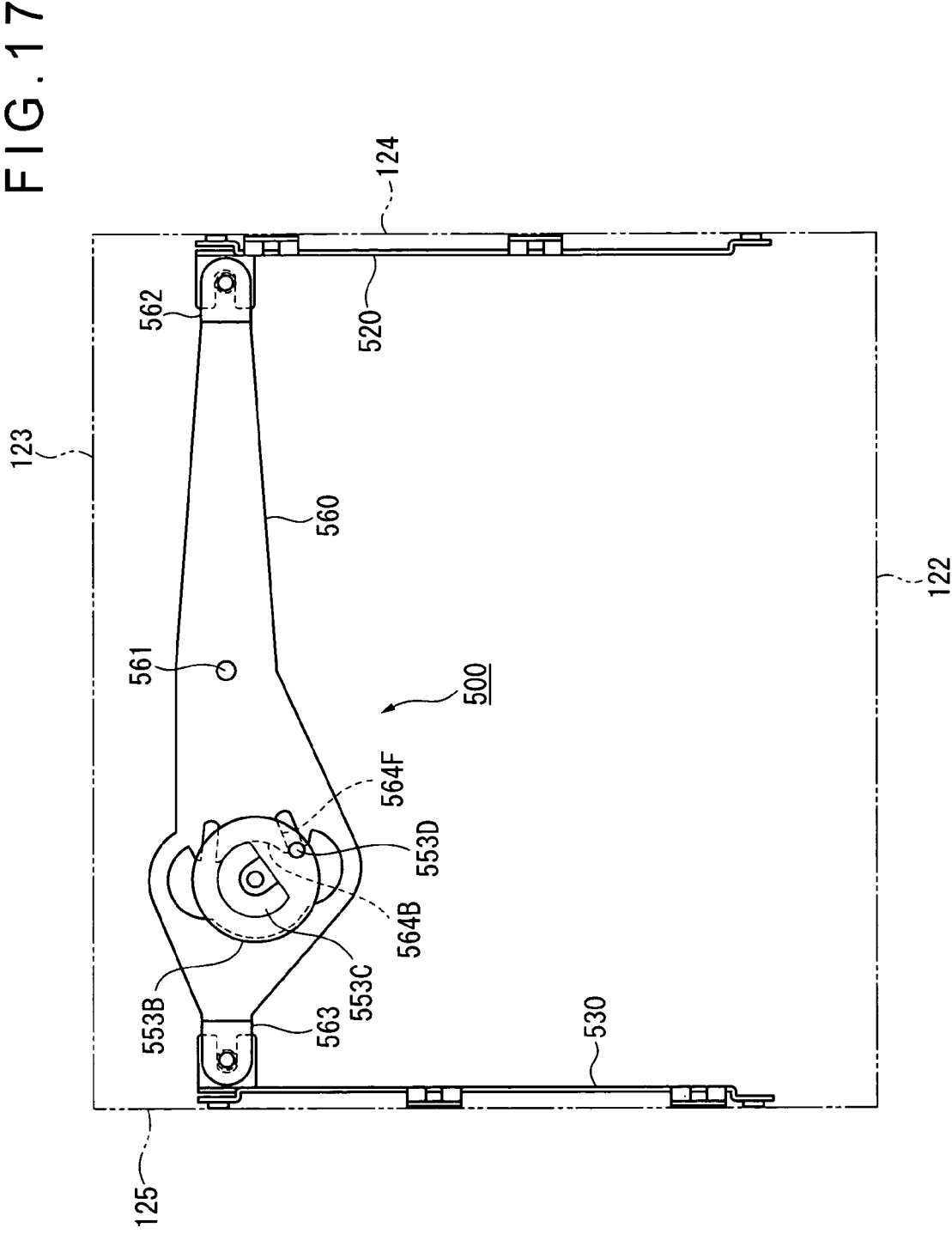
FIG. 17 is a plan view showing an elevation control mechanism when the disk holding mechanism reaches to an insertion/ejection position according to the above embodiment.
Figure 18:
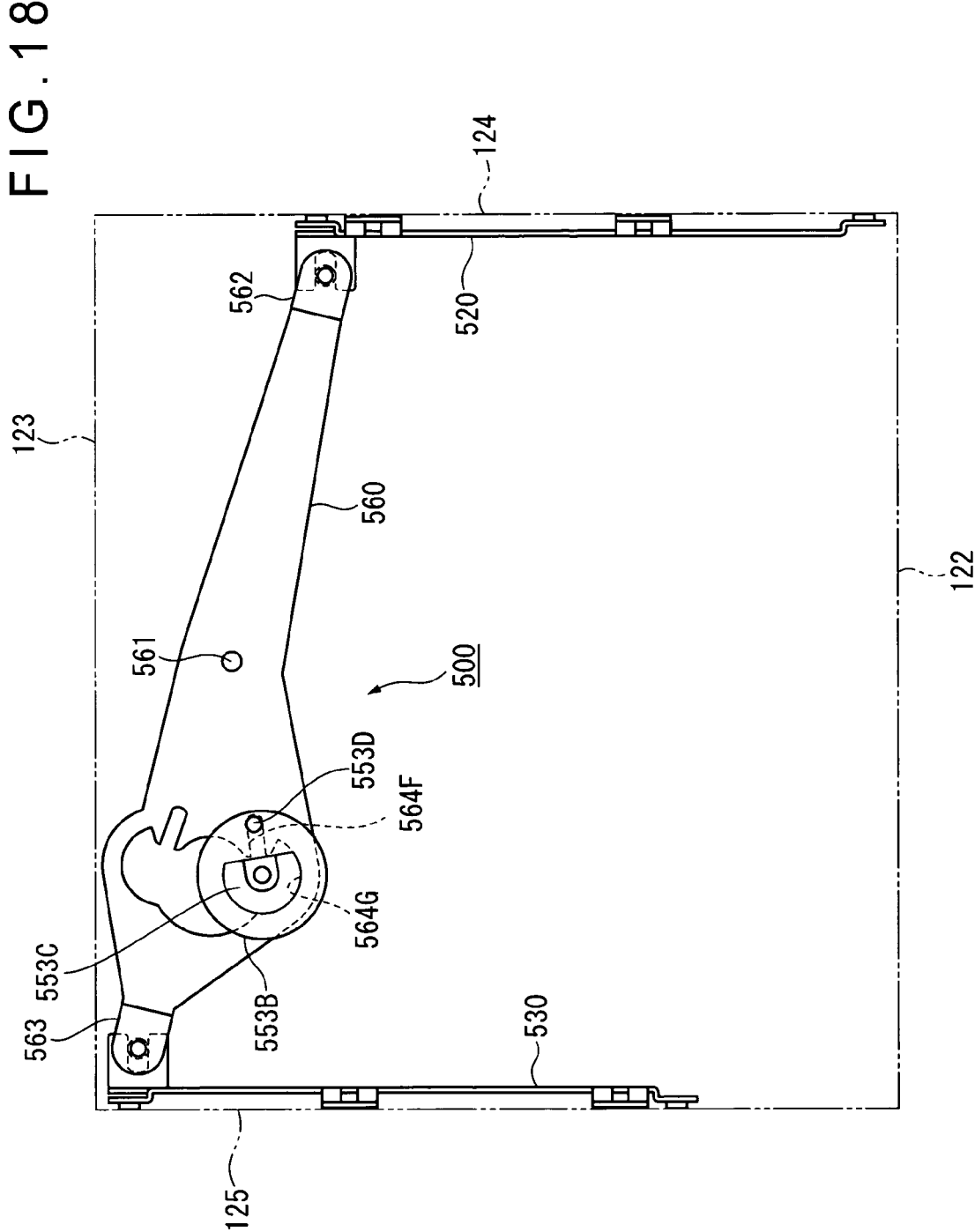
FIG. 18 is a plan view showing an elevation control mechanism when the disk holding mechanism reaches to a temporarily fixing position according to the above embodiment.

Initially, the operation of the elevation control mechanism 500 will be described below with reference to FIGS. 14 to 18 as a part of the operation of the disk device 100. FIG. 14 is a plan view showing an elevation control mechanism 500 when the disk holding mechanism 320 is positioned at the mounting position. FIGS. 15 to 17 are plan views showing the elevation control mechanism 500 when the disk holding mechanism 320 is positioned at the insertion/ejection position. FIG. 18 is a plan view showing the elevation control mechanism 500 when the disk holding mechanism 320 is positioned at the temporarily fixing position.

The disk elevator 300 reaches the mounting position when the elevation control mechanism 500 becomes a state as shown in, for instance, FIG. 14. Specifically, when the rotation control pin 553D of the elevation control mechanism 500 is engaged with the mounting-and-abutting portion 564C and the rotation control member 553C is in contact with the mounting-and-abutting portion 564D, the rotating-and-connecting portion 563 of the rotating member 450 is located at a position the closest to the rear plate 123 and the rotating-and-connecting portion 563 is located at a position the most away from the rear plate 123. In addition, the right elevation-control plate 520 is located at a position the closest to the rear plate 123 while the left elevation-control plate 530 is located at a position the most away from the rear plate 123. Further, the right elevation-control pin of the stage 310 is positioned at the lower point of the right cam groove (not shown) of the right elevation-control plate 520 while the left elevation-control pin is positioned at the lower point of the left cam groove 534 of the left elevation-control plate 530. Then, the disk holding mechanism 320 disposed on the stage 310 reaches the mounting position that is in the lower side of the lower case 120. In other words, the disk holding mechanism 320 reaches such a position as to allow the gap P of the right guide 330 and the concave groove 384C of the left guide 380 to be open toward the periphery of the optical disk 1N supported on the turntable 221 of the disk rotation driver 220 and to be engageable therewith.

When the disk holding mechanism 320 is located at the attaching position, the disk processor 200 is fixed by the locking mechanism connected with the elevation control mechanism 500 (movement restricting condition).

Initially, when the gear 553B is rotated counterclockwise under the control of the device controller from the condition shown in FIG. 14, the rotation control pin 553D is moved counterclockwise. Then, the rotating member 560 is biased to be moved clockwise in accordance with the movement of the rotation control pin 553D and the rotation control pin 553D is relatively moved toward the base end of the mounting-and-engaging portion 564C. Further, as shown in FIG. 15, when the rotation control pin 553D reaches to a position adjacent to the base end of the mounting-and-engaging portion 564C, the rotation control member 553C comes into contact with the insertion-and-ejection abutment portion 564B. In addition, when the rotating member 560 is moved clockwise, the right elevation-control plate 520 is moved to be away from the rear plate 123 while the left elevation-control plate 530 is moved to be close to the rear plate 123. The right elevation control pin of the stage 310 is relatively moved from the lower point of the right cam groove to the middle point via the insertion/ejection movement section. The left elevation control pin is relatively moved from the lower point 534A of the left cam groove 534 to the middle point 534B via the insertion/ejection movement section 534D. Then, the disk holding mechanism 320 reaches from the mounting position to the insertion/ejection position that is substantially the center of the up-and-down direction of the lower case 120. In other words, the disk holding mechanism 320 reaches such a position as to allow the gap P of the right guide 330 and the concave groove 384C of the left guide 380 to face the disk-insertion opening 111A and to be engageable with the periphery of the optical disk 1N inserted through the disk-insertion opening 111A.

When the disk holding mechanism 320 is located at the mounting position, the mount 210 of the disk processor 200 is supported via the flexible member on the bottom plate 121 by the locking mechanism connected to the elevation control mechanism 500 (the unrestricted state).

Further, when the gear 553B is rotated counterclockwise from the state shown in FIG. 15, the rotation control member 553C is rotated counterclockwise while being in contact with the insertion/ejection abutment portion 564B. Simultaneously, the rotation control pin 553D is moved counterclockwise without touching the rotating member 560 to be in a state, for instance, shown in FIG. 16. At this time, since the rotating member 560 is not rotated, the disk holding mechanism 320 is kept at the insertion/ejection position.

When the gear 553B is rotated counterclockwise from the state shown in FIG. 17 where the rotation control pin 553D has reached to a position adjacent to the base end of the temporarily fixing-and-engaging portion 564F, the rotating member 560 is biased in accordance with the movement of the rotation control pin 553D to be rotated clockwise and the rotation control pin 553D is relatively moved to the tip end of the temporarily fixing-and-engaging portion 564F. Further, as shown in FIG. 18, when the rotation control pin 553D reaches to the tip end of the temporarily fixing-and-engaging portion 564F, the rotation control member 553C comes into contact with the temporarily fixing-and-abutting portion 564G. In addition, when the rotating member 560 is moved clockwise, the right elevation-control plate 520 is moved to be away from the rear plate 123 while the left elevation-control plate 530 is moved to be close to the rear plate 123. The right elevation control pin of the stage 310 is relatively moved from the middle point of the right cam groove to the upper point via the temporarily fixing movement section. The left elevation control pin is relatively moved from the middle point 534B of the left cam groove 534 to the upper point 534C via the temporarily fixing movement section 534E. Then, the disk holding mechanism 320 reaches from the insertion/ejection position to the temporarily fixing position that is above the lower case 120. In other words, the disk holding mechanism 320 reaches such a position as to be allowed to temporarily fix the optical disk 1N held by the disk holding mechanism 320 to the temporarily fixing portion 600 in a detachable manner and to receive the temporarily fixed optical disk 1N from the temporarily fixing portion 600.

When the disk holding mechanism 320 is moved to the temporarily fixing position, the optical disk 1N is temporarily fixed to the support 610 of the temporarily fixing portion or released from the temporarily fixed state by the disk attaching-and-detaching mechanism (not shown) connected to the elevation control mechanism 500 to be transferred from the temporarily fixing portion 600 to the disk holding mechanism 320.

(Exchange Operation and Transfer Operation of Optical Disk)

Figure 19A:
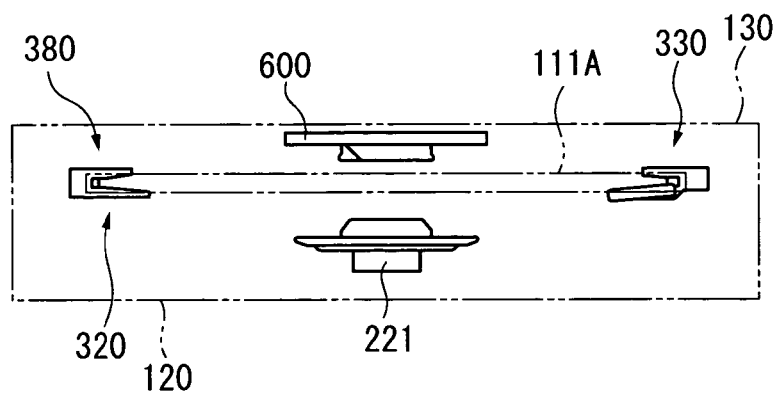
FIG. 19A is a schematic illustration of replacing process of an optical disk showing insertion standby state of a reproducing disk according to the above embodiment.
Figure 19B:
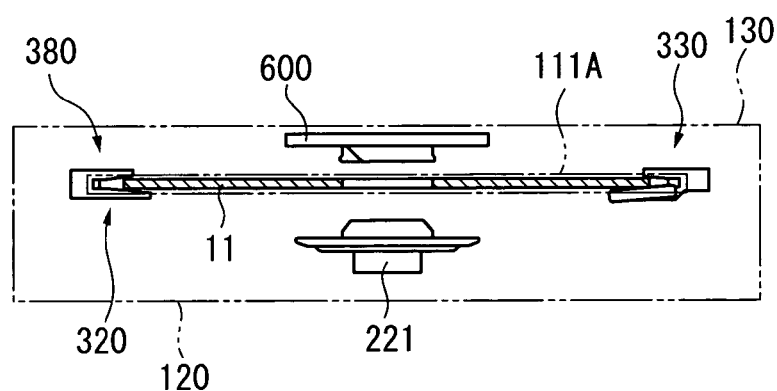
FIG. 19B is a schematic illustration of replacing process of the optical disk showing a state in which the reproducing disk is held according to the above embodiment.
Figure 19C:
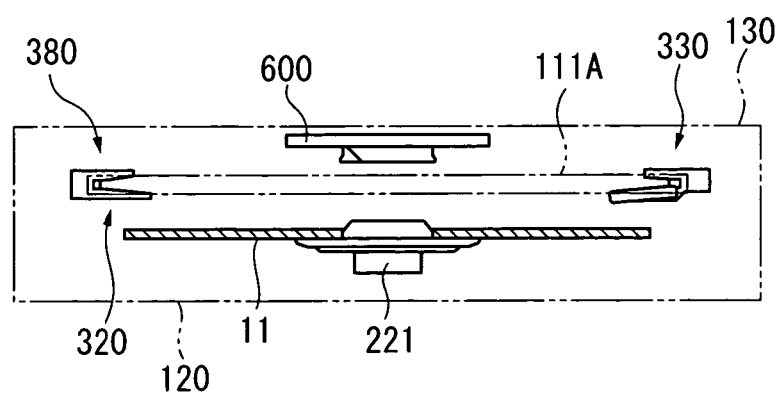
FIG. 19C is a schematic illustration of replacing process of the optical disk showing insertion standby state of a replacing disk according to the above embodiment.
Figure 19D:
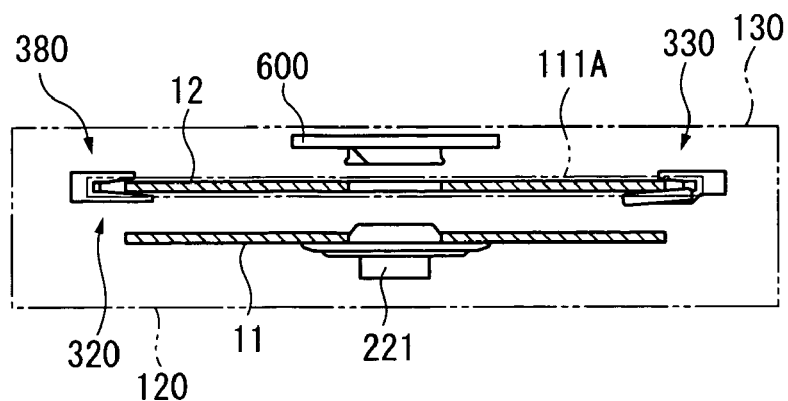
FIG. 19D is a schematic illustration of replacing process of the optical disk showing a state in which the replacing disk is held according to the above embodiment.
Figure 19E:
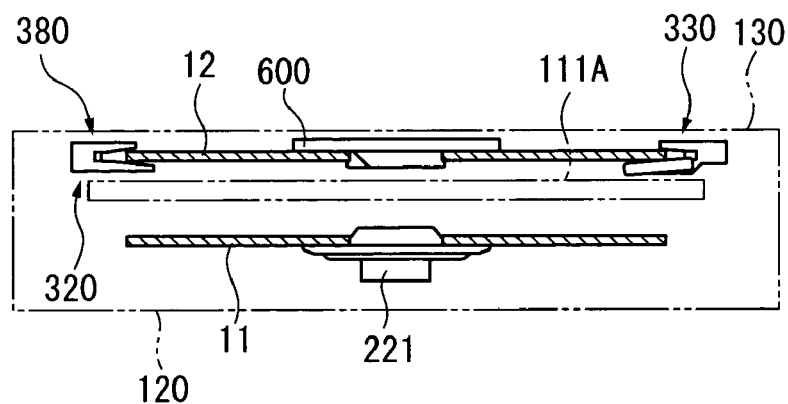
FIG. 19E is a schematic illustration of replacing process of the optical disk showing a state in which the replacing disk is moved to the temporarily fixing position according to the above embodiment.
Figure 19F:
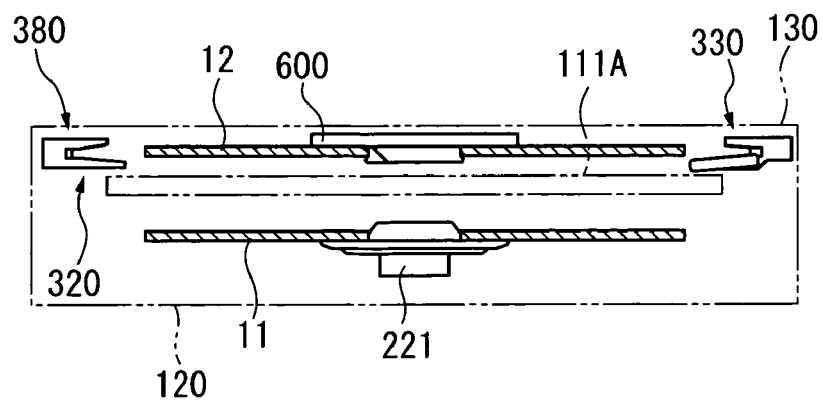
FIG. 19F is a schematic illustration of replacing process of the optical disk showing a state in which the replacing disk is temporarily fixed according to the above embodiment.
Figure 20A:
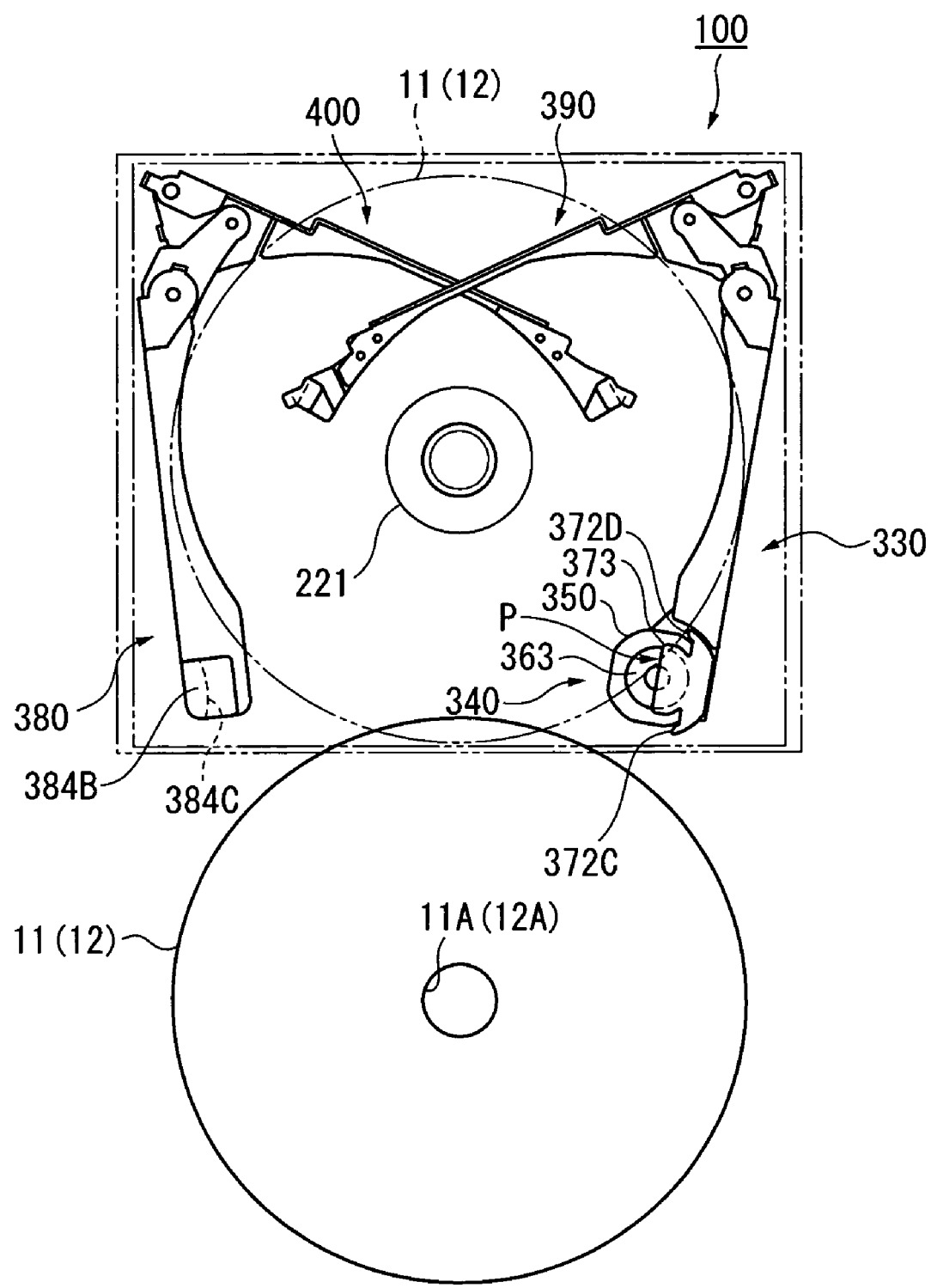
FIG. 20A is a schematic illustration of transfer process of the optical disk showing insertion standby state of the optical disk according to the above embodiment.
Figure 20B:
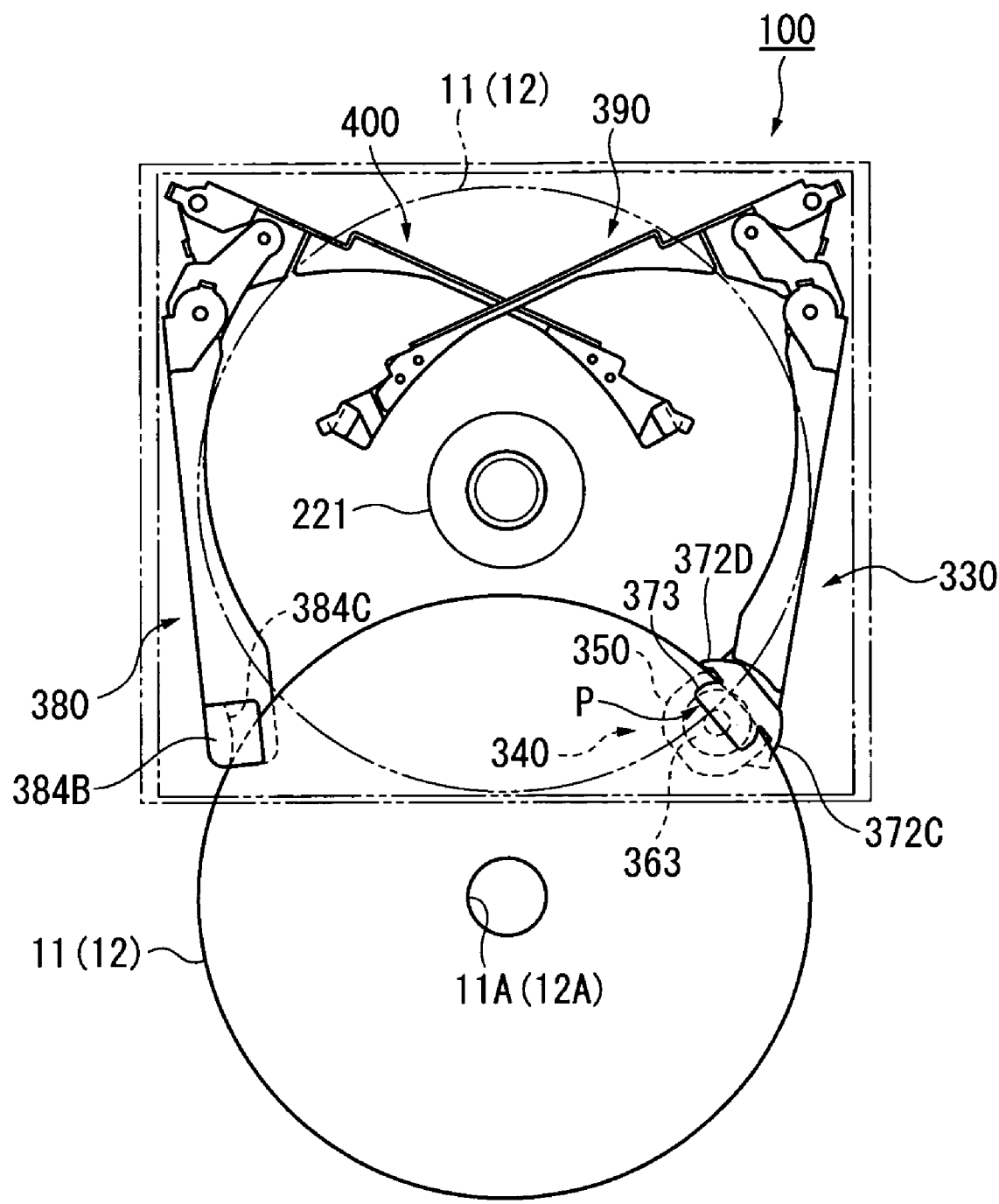
FIG. 20B is a schematic illustration of transfer process of the optical disk showing a state in which insertion of the optical disk is initiated according to the above embodiment.
Figure 21A:
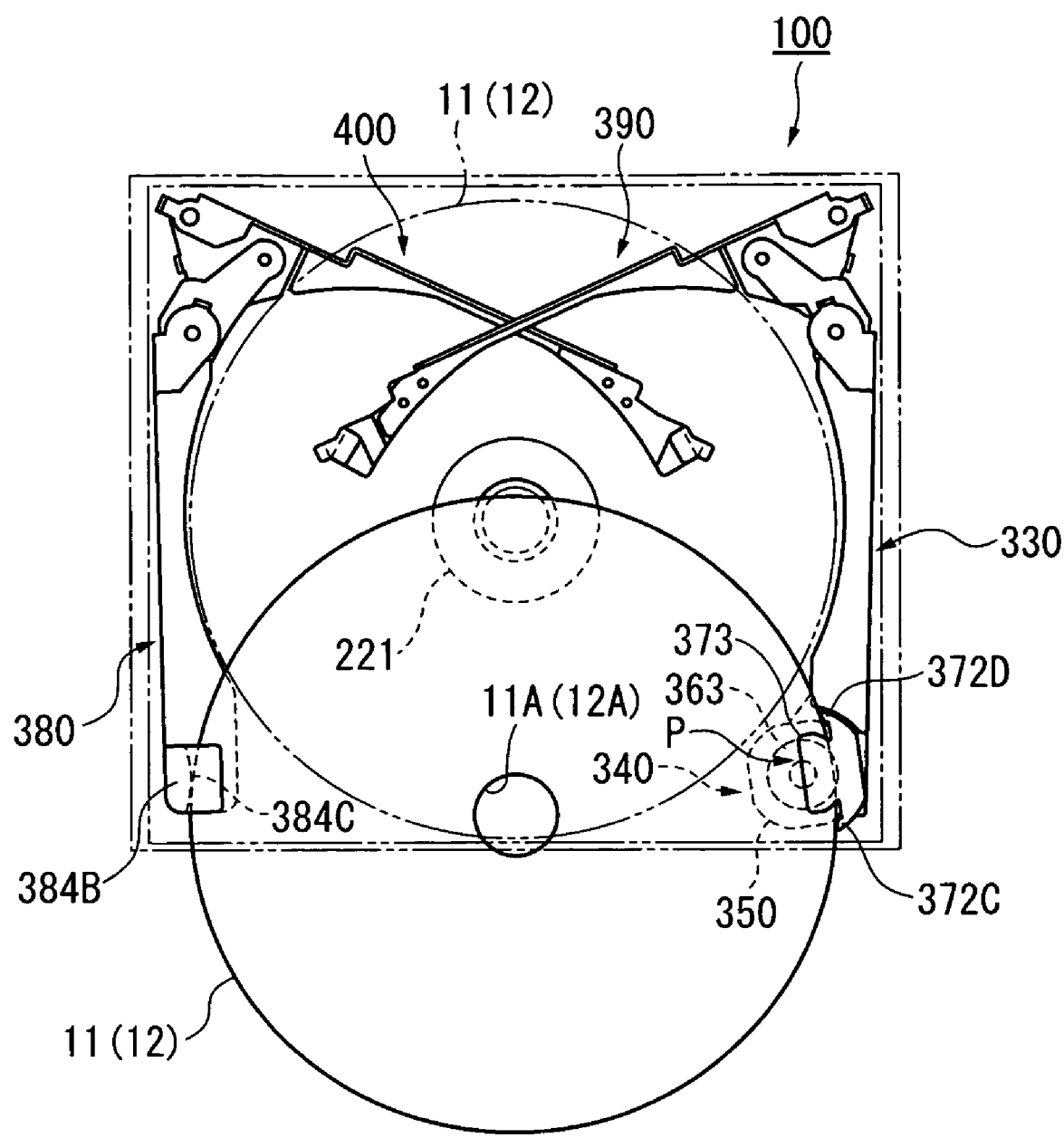
FIG. 21A is a schematic illustration of transfer process of the optical disk showing a state in which a right guide and a left guide are rotated by the optical disk according to the above embodiment.
Figure 21B:
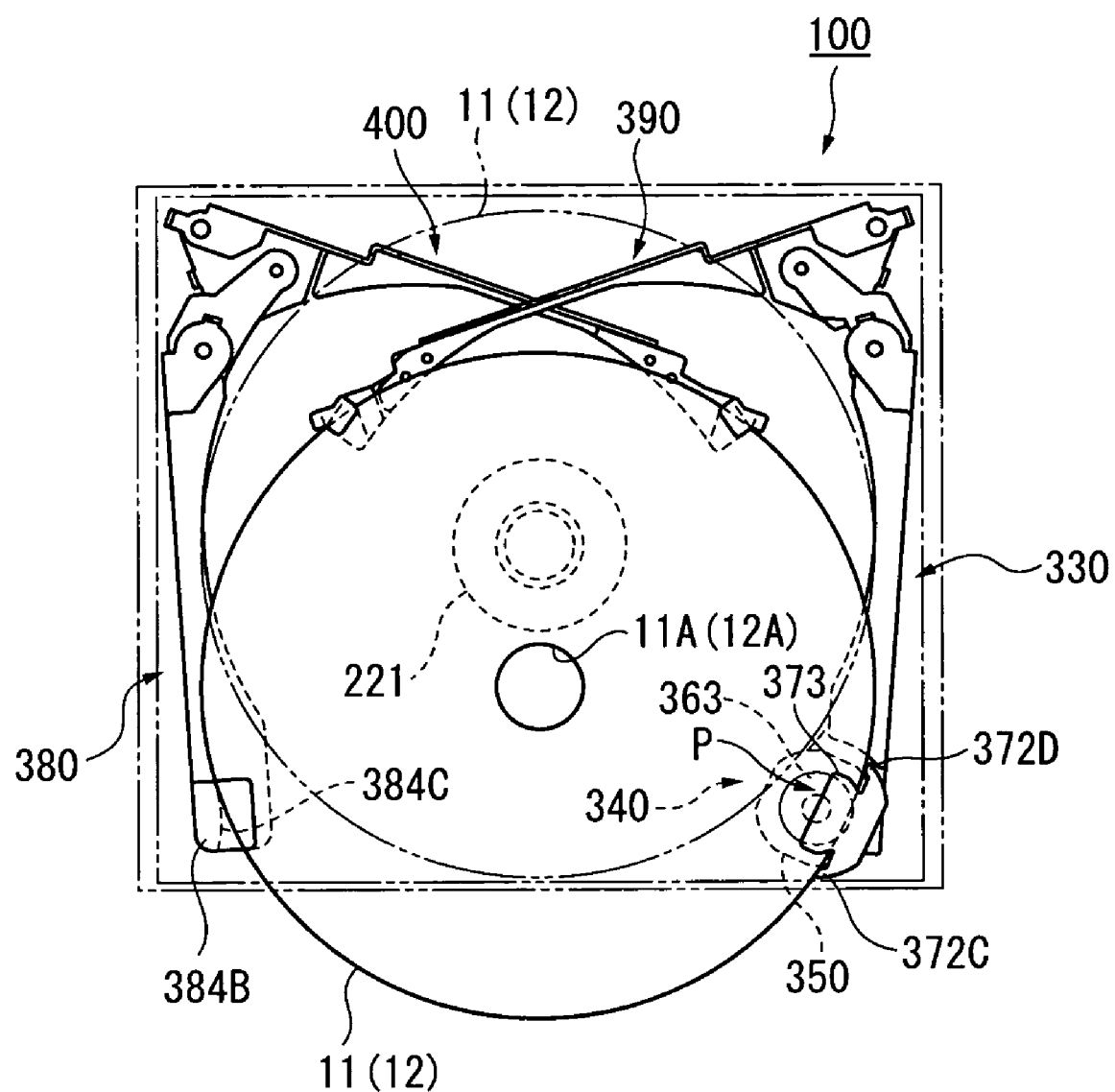
FIG. 21B is a schematic illustration of transfer process of the optical disk showing a state in which a right stopper and a left stopper are rotated by the optical disk according to the above embodiment.
Figure 22A:
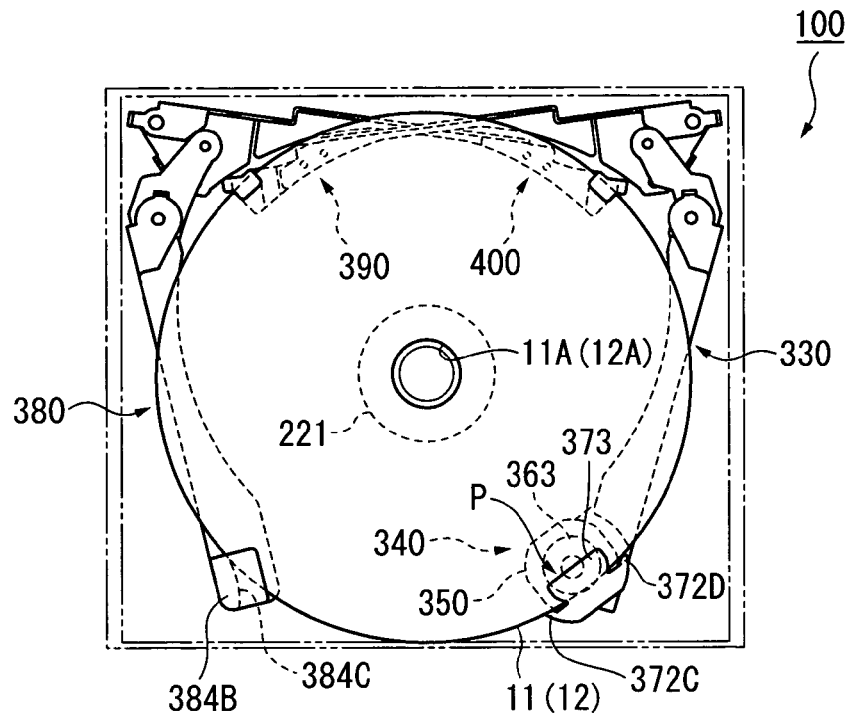
FIG. 22A is a schematic illustration of transfer process of the optical disk showing transfer completion state of the optical disk according to the above embodiment.
Figure 22B:
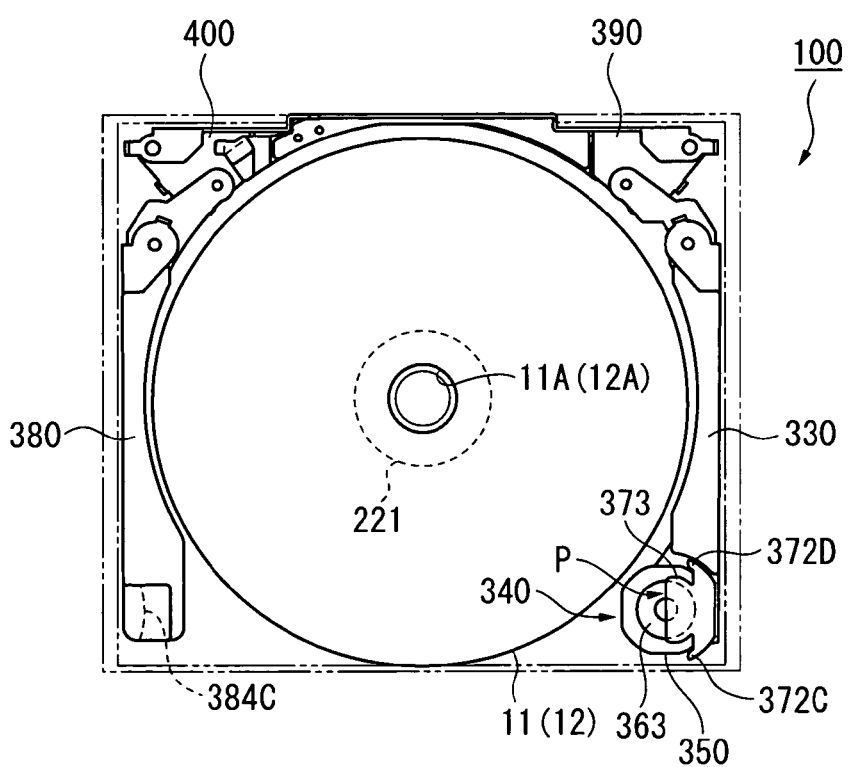
FIG. 22B is a schematic illustration of transfer process of the optical disk showing a state in which the right guide, the left guide, the right stopper and the left stopper are evacuated according to the above embodiment.
Figure 23A:
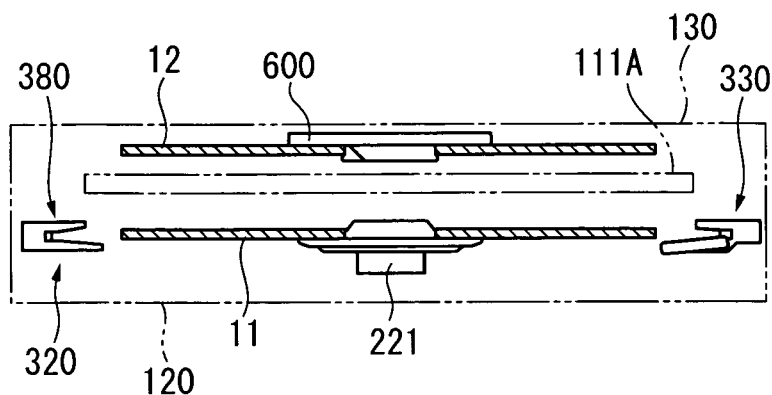
FIG. 23A is a schematic illustration of replacing process of the optical disk showing a state in which a disk holding mechanism is moved to the mounting position according to the above embodiment.
Figure 23B:
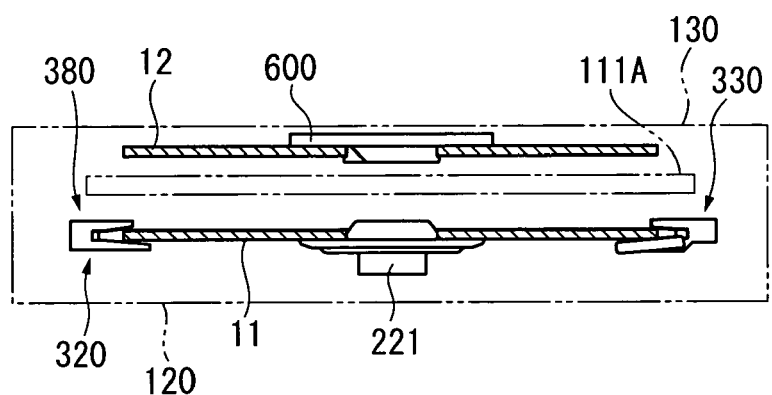
FIG. 23B is a schematic illustration of replacing process of the optical disk showing a state in which the reproducing disk is held according to the above embodiment.
Figure 23C:
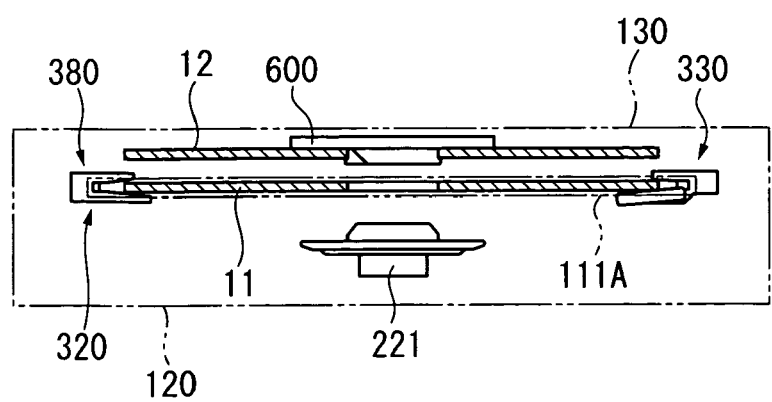
FIG. 23C is a schematic illustration of replacing process of the optical disk showing a state in which the reproducing disk is moved to the insertion/ejection position according to the above embodiment.
Figure 23D:
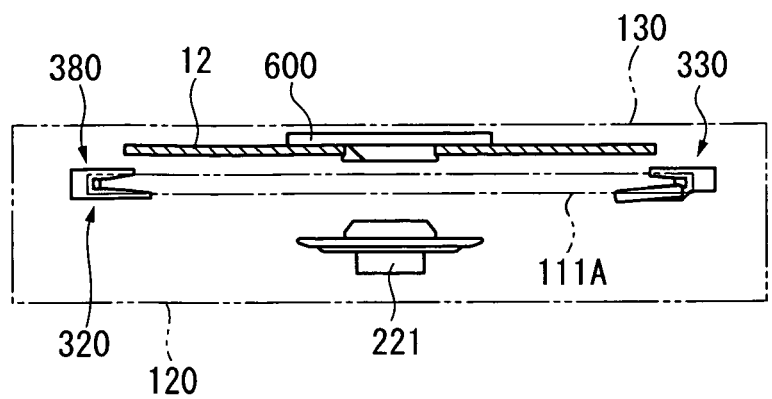
FIG. 23D is a schematic illustration of replacing process of the optical disk showing a state in which the reproducing disk is ejected according to the above embodiment.
Figure 23E:
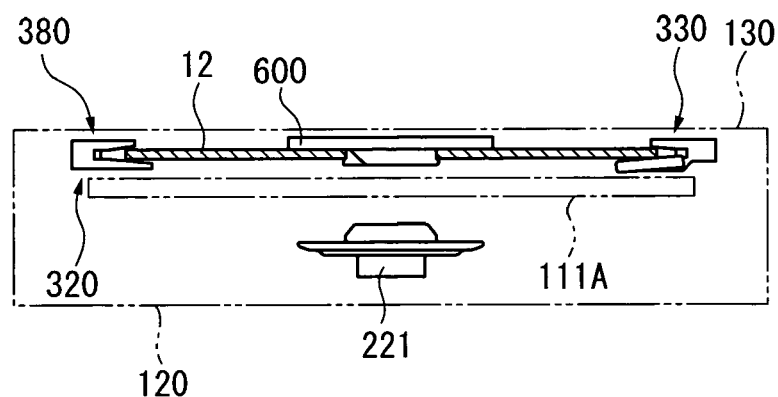
FIG. 23E is a schematic illustration of replacing process of the optical disk showing a state in which the replacing disk is held according to the above embodiment.
Figure 23F:
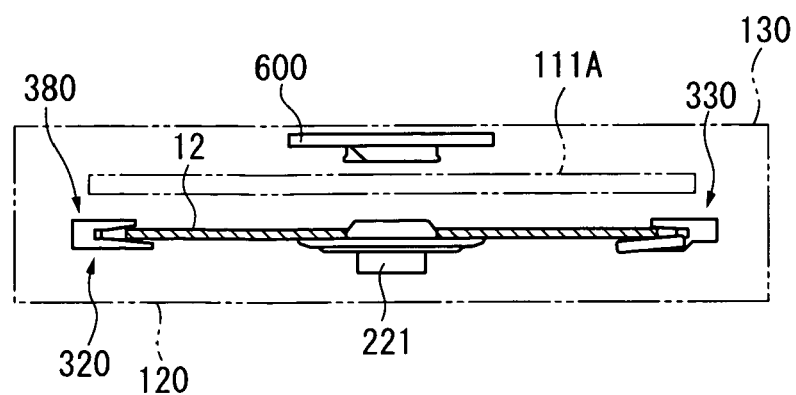
FIG. 23F is a schematic illustration of replacing process of the optical disk showing a state in which the replacing disk is mounted according to the above embodiment.

Subsequently, the exchange operation and transfer operation of the optical disk 1N as the operations of the disk device 100 will be described below with reference to the drawings. FIG. 19A is a schematic illustration showing an exchanging process of the optical disk 1N, in which the reproducing disk 11 is at insertion standby. FIG. 19B is a schematic illustration of the exchanging process of the optical disk 1N, in which the reproducing disk 11 is held. FIG. 19C is a schematic illustration showing an exchanging process of the optical disk 1N, in which the reproducing disk 11 is at insertion standby. FIG. 19D is a schematic illustration of the exchanging process of the optical disk 1N, in which the replacing disk 12 is held. FIG. 19E is a schematic illustration showing an exchanging process of the optical disk 1N, in which the replacing disk 12 is moved to the temporarily fixing position. FIG. 19F is a schematic illustration showing an exchanging process of the optical disk 1N, in which the replacing disk 12 is temporarily fixed. FIG. 20A is a schematic illustration showing a transferring process of the optical disk 1N, in which the optical disk 1N is at insertion standby. FIG. 20B is a schematic illustration showing a transferring process of the optical disk 1N, in which the insertion of the optical disk 1N is started. FIG. 21A is a schematic illustration showing the transferring process of the optical disk 1N, in which the right guide 330 and the left guide 380 are rotated by the optical disk 1N. FIG. 21B is a schematic illustration showing the transferring process of the optical disk 1N, in which the right stopper 390 and the left stopper 400 are rotated by the optical disk 1N. FIG. 22A is a schematic illustration showing a transferring process of the optical disk 1N, in which the optical disk 1N has been transferred. FIG. 22B is a schematic illustration showing a transferring process of the optical disk 1N, in which the right guide 330, the left guide 380, the right stopper 390 and the left stopper 400 are evacuated. FIG. 23A is a schematic illustration showing an exchanging process of the optical disk 1N, in which the disc holding mechanism 320 is moved to the mounting position. FIG. 23B is a schematic illustration of the exchanging process of the optical disk 1N, in which the reproducing disk 11 is held. FIG. 23C is a schematic illustration showing an exchanging process of the optical disk 1N, in which the reproducing disk 11 is moved to the insertion/ejection position. FIG. 23D is a schematic illustration of the exchanging process of the optical disk 1N, in which the reproducing disk 11 is unloaded. FIG. 23E is a schematic illustration showing an exchanging process of the optical disk 1N, in which the replacing disk 12 is held. FIG. 23F is a schematic illustration showing an exchanging process of the optical disk 1N, in which the replacing disk 12 is mounted.

Initially, while the reproducing disk 11 is not mounted on the disk device 100, the right guide 330 and the left guide 380 of the disk holding mechanism 320 is located at the insertion/ejection position corresponding to the disk insertion hole 111A as shown in FIG. 19A. At this time, though not illustrated, the right evacuation-control plate 421 is located on the side of the right portion 312. The left evacuation-control plate 422 is located on the side of the left portion 313. In other words, as shown in FIG. 20A, the right guide 330, the left guide 380, the right stopper 390 and the left stopper 400 are located at the standby position.

Subsequently, when the reproducing disk 11 is inserted through the disk insertion hole 111A by a user as shown in FIG. 20A, the reproducing disk 11 comes into contact with the projection 372C of the right guide 330 and the disk engaging portion 384B of the left guide 380. When the reproducing disk 11 is further inserted, the transfer base 350 of the transfer unit 340 is rotated counterclockwise, i.e. so that the gap P is opened to the disk insertion hole 111A. Then, the reproducing disk 11 comes into contact with the projections 372C and 372D and is held between the rubber ring 363 of the right guide 330 and the press piece 373 to be engaged with the gap P. The reproducing disk 11 is also engaged with the concave groove 384C of the disk engaging portion 384B of the left guide 380. Subsequently, when the reproducing disk 11 is further advanced, the right guide 330 and the left guide 380 are pushed by the optical disk 1N to be rotated in a direction opposite to the opposing direction thereof. The rotation causes displacement of the switch operation claws 331A2 and 381A2, which is detected by the right guide detector 412 and the left guide detector 415 of the insertion-and-ejection detector 410 as an initiation of the insertion of the reproducing disk 11. When the initiation of the insertion of the reproducing disk 11 is detected, the device controller drives the shaft 332 and the like to rotate the rubber ring 363 counterclockwise. As shown in FIG. 21A, the reproducing disk 11 is loaded into the disk device 100 while being rotated counterclockwise in accordance with the rotation of the rubber ring 363 even without being forced by a user.

When the reproducing disk 11 is further transferred into the disk device 100, the outward biasing of the right guide 330 and the left guide 380 by the pushing of the reproducing disk 11 is ceased and, in turn, is rotated inward (mutually opposing direction) by the biasing of the guide biasing member. Then, when the reproducing disk 11 is further deeply transferred, the right stopper 390 and the left stopper 400 are biased to be rotated outward by the transferred reproducing disk 11 as shown in FIG. 21B. Subsequently, as shown in FIG. 22A, when the entirety of the reproducing disk 11 is loaded into the inside of the disk device 100 and the reproducing disk 11 is located at a position supported by the turntable 221, the right stopper detector 413 and the left stopper detector 416 of the insertion/ejection detector 410 detect the location of the right stopper 390 and the left stopper 400 to sense the insertion of the entirety of the reproducing disk 11. When the insertion of the entire reproducing disk 11 is detected, the device controller stops the rotation of the rubber ring 363 to terminate the transferring process. At this time, the optical disk 1N is held by the right guide 330, the left guide 380, the right stopper 390 and the left stopper 400 of the disk holding mechanism 320 as shown in FIG. 19B.

Subsequently, the device controller turns the rotating member 560 from the state shown in FIG. 16 to the state shown in FIG. 14 and further to the state shown in FIG. 14 by driving the rotating member control mechanism 550 to move the disk holding mechanism 320 to the mounting position. In accordance with the downward movement, the engaging claw of the turntable 221 is displaced to be away from the outer circumference of the support 221A. Simultaneously, the support 221A of the turntable 221 is gradually inserted into the disk hole 1NA opened approximately at the center of the reproducing disk 11. When the disk holding mechanism 320 has reached to the mounting position, the device controller drives the evacuation control mechanism 420 to evacuate the right guide 330, the left guide 380, the right stopper 390 and the left stopper 400 as shown in FIG. 22B. Accordingly, the reproducing disk 11 becomes free from the holding of the right guide 330, the left guide 380, the right stopper 390 and the left stopper 400 to be mounted on the turntable 221. Subsequently, the device controller turns the rotating member 560 from the state shown in FIG. 14 to the state shown in FIG. 15 and further to the state shown in FIG. 16 to move the disk holding mechanism 320 to the insertion/ejection position as shown in FIG. 19C. Simultaneously, the device controller again turns the right guide 330, the left guide 380, the right stopper 390 and the left stopper 400 to be moved to the standby position.

When the device controller recognizes that the disk holding mechanism 320 is located at the insertion/ejection position, the device controller actuates the disk processor 200 to read the information recorded on the reproducing disk 11 and record information on the reproducing disk 11.

Further, when the replacing disk 12 is inserted by a user, the device controller transfers the replacing disk 12 into the device as shown in FIG. 19D in the same manner as illustrated in the above-described FIGS. 20A, 20B, 21A, 21B and 22A. While transferring the replacing disk 12, since the right guide 330 and the left guide 380 are rotated as described above, the device controller recognizes that the optical disk 1N is newly inserted. When the device controller recognizes the new insertion and the reproducing disk 11 is under reading processing or recording processing, the device controller controls the disk processor 200 to stop the processing. Subsequently, the rotating member 560 is rotated from the state shown in FIG. 16 to the state shown in FIG. 17 and further to the state shown in FIG. 18 to move the disk holding mechanism 320 to the temporarily fixing position as shown in FIG. 19E. Then, as shown in FIG. 19F, a transfer controller temporarily fixes the replacing disk 12, evacuates the right guide 330, the left guide 380, the right stopper 390 and the left stopper 400 to a retracted position as shown in FIG. 22B, and moves the disk holding mechanism 320 to the mounting position as shown in FIG. 23A. Further, as shown in FIG. 23B, the device controller releases the evacuation of the right guide 330, the left guide 380, the right stopper 390 and the left stopper 400 under the control of the evacuation control mechanism 420 and turns the components toward the standby position to hold the reproducing disk 11. Then, as shown in FIG. 23C, the device controller moves the disk holding mechanism 320 that holds the reproducing disk 11 to the insertion/ejection position. Subsequently, by a processing reverse to the above-described processing, the reproducing disk 11 is moved from the state shown in FIG. 23B to the state shown in FIG. 20C. Specifically, the device controller rotates the rubber ring 363 clockwise by driving the shaft 332 to eject (unload) the reproducing disk from the disk insertion hole 111A.

When the device controller detects that the reproducing disk 11 is drawn out by a user as shown in FIG. 23D, the device controller evacuates the right guide 330, the left guide 380, the right stopper 390 and the left stopper 400 to the evacuate positions. Subsequently, the device controller temporarily moves the disk holding mechanism 320 to the mounting position and moves again the right guide 330, the left guide 380, the right stopper 390 and the left stopper 400 toward the inside (standby position). In this case, since the reproducing disk 11 has already been ejected, the components are rotated to the standby positions without holding the reproducing disk 11, so that the device controller can recognize that the reproducing disk 11 is not mounted without employing special detector. Subsequently, the device controller again moves the right guide 330, the left guide 380, the right stopper 390 and the left stopper 400 to the evacuate positions and moves the disk holding mechanism 320 to the temporarily fixing position. Then, the evacuation of the right guide 330, the left guide 380, the right stopper 390 and the left stopper 400 is released as shown in FIG. 23E, where the replacing disk 12 temporarily fixed by the temporarily fixing portion 600 is held. Subsequently, as shown in FIG. 23F, the device controller moves the disk holding mechanism 320 to the mounting position and attach to the turntable 221, and moves the disk holding mechanism 320 to the insertion/ejection position to terminate the exchanging process, i.e. to be at the standby state shown in FIG. 19C. The condition is recognized by the device controller, where the device processor 200 actuates the disk processor 200, read information recorded on the reproducing disk 11 (originally the replacing disk 12) and record information on the reproducing disk 11. Incidentally, when transitioning from the state shown in FIG. 23D to the state shown in FIG. 23E, it is not necessary to be moved to the temporarily fixing position after once moving to the mounting position but the components may be moved directly from the insertion/ejection position to the temporarily fixing position when recognizing that the reproducing disk 11 is not provided on the turntable 221.

When the eject button 111B is operated under the standby state shown in FIG. 19C, the device controller drives the evacuation control mechanism 420 to evacuate the right guide 330, the left guide 380, the right stopper 390 and the left stopper 400 as shown in FIG. 22B. Subsequently, the device controller moves the disk holding mechanism 320 to the mounting position and again moves the right guide 330, the left guide 380, the right stopper 390 and the left stopper 400 to the standby positions. Accordingly, the reproducing disk 11 is held by the disk holding mechanism 320 as shown in FIG. 22A. Then, the device controller moves the disk holding mechanism 320 to the insertion/ejection position while holding the reproducing disk 11. The device controller rotates the rubber ring 363 clockwise by driving the shaft 332 to eject (unload) the reproducing disk from the disk insertion hole 111A.

[Effects and Advantages of Disk Device]

As described above, in order to detachably hold (i.e. temporarily fix) the optical disk 1N in the above embodiment, the support portion 611 is configured substantially cylindrically to have the same or less dimension as the diameter of the disk hole 1NA of the optical 1N so as to be fitted into the disk hole 1NA. The support portion 611 is provided with the positioning portion 612 that protrudes outward from the outer circumference adjacent to the first axial side at a position adjacent to the periphery of the disk hole 1NA of the optical disk 1N. The engagement/disengagement concave portion 613 of which both ends open to the circumference of the support portion 611 along the radial direction is provided on the support portion 611. Further, the first engaging portion 614 is provided around the circumference of the support portion 611 from which the axial end of the engagement/disengagement concave portion 613 is opened. The first engaging portion 614 is projected outward and is provided to oppose the positioning portion 612 by a gap of the thickness dimension of the optical disk 1N or more. The moving member 615 is provided on the engagement/disengagement concave portion 613 in a manner movable in diameter direction of the support portion 611. The second engaging portion 616 protrudes from the end of the moving member 615 corresponding to the axial second end of the engagement/disengagement concave portion 613 so that the tip end of the second engaging portion 616 can be protruded and retracted relative to the circumference of the support portion 611 from which the axial second end of the engagement/disengagement concave portion 613 is opened. Accordingly, when the second engaging portion 616 is projected from the circumference radially opposite to the first engaging portion 614 of the support portion 611 by moving the moving member 615, the optical disk 1N is held by the first engaging portion 614 and the second engaging portion 616. Thus, the optical disk 1N can be detachably held with a simple arrangement where the single moving member 615 provided with the second engaging portion 616 is movably provided in the engagement/disengagement concave portion 613 that radially penetrates the substantially cylindrical support portion 611, the second engaging portion 616 engaging the optical disk 1N together with the first engaging portion 614 of the support portion 611. Accordingly, the number of components can be reduced as compared with an arrangement such as traditional ball chucking mechanism where a plurality of components are used, so that productivity can be easily improved and the size can be easily reduced.

Further, the disk engagement/disengagement mechanism 620 that retracts the second engaging portion 616 from the circumference of the support portion 611 when the support portion 611 is inserted into and detached from the disk hole 1NA of the optical disk 1N and moves the moving member 615 so that the second engaging portion 616 protrudes from the circumference of the support portion 611 when the optical disk 1N is held is provided as the temporarily fixing portion 600. Accordingly, since the moving member 615 is moved by the disk engagement/disengagement mechanism 620 to protrude and retract the second engaging portion 616 that holds the optical disk 1N together with the first engaging portion 614 when the optical disk 1N is temporarily fixed and detached, generation of clicking noise can be prevented by the presence of the disk engagement/disengagement mechanism 620 when the first engaging portion 614 or the second engaging portion 616 overrides the periphery of the disk hole 1NA in attaching and detaching the optical disk 1N. Further, since it is not necessary to apply great force in overriding the periphery, smooth attachment and detachment are possible and the load on account of the great attachment/detachment force is applied on the temporarily fixing portion 600 and the optical disk 1N, thereby preventing damages thereon and the like.

The first engaging portion 614 protrudes in a flanged manner approximately over a semi-circle around the position at which the first axial end of the engagement/disengagement concave portion 613 is opened. Accordingly, the optical disk 1N can be securely held with a simple structure. The first engaging portion 614 protrudes so that the projecting dimension gradually reduces along the circumference from the position at which the axial first end of the engagement/disengagement concave portion 613 is opened. Accordingly, the first engaging portion 614 is less likely to be hooked when the support portion 611 is inserted into and detached from disk hole 1NA of the optical disk 1N, thus allowing smooth attachment/detachment and secure holding of the optical disk 1N by the first engaging portion 614 and the second engaging portion 616. Since the first engaging portion 614 is not necessary on the side held by the second engaging portion 616, the structure can be further simplified and productivity can be improved. Further, the diameter of the support portion 611 can be made further close to the diameter of the disk hole 1NA, thus preventing shaky movement while the optical disk 1N is held and simplifying the structure by reducing the moving distance of the moving member 615.

The guide surface 611A is provided around the tip end in axial direction of the support portion 611 at the position opposite to the first engaging portion 614 and corresponding to the position at which the second end of the engagement/disengagement concave portion 613 is opened in the axial direction in which the second engaging portion 616 of the moving member 615 protrudes and retracts, in which the guide surface 611A is slanted so that the diameter of the support portion 611 is reduced toward the tip end of the support portion 611. Accordingly, even if the position of the optical disk 1N held by the disk holding mechanism 320 after being loaded through the disk insertion hole 111A is shifted when the support portion 611 is inserted into and detached from the disk hole 1NA of the optical disk 1N, the opening periphery of the disk hole 1NA slidably moves on the guide surface 611A so that the support portion 611 can be fitted into the disk hole 1NA. Accordingly, even when the diameter of the support portion 611 is set close to the diameter of the disk hole 1NA, the support portion 611 can be easily fitted into the disk hole 1NA, thereby suitably holding the optical disk 1N. The guide surface 611A is the widest at the position at which the second end of the engagement/disengagement concave portion 613 extending along the transferring direction is opened and becomes gradually narrow in the circumferential direction. Accordingly, since the guide surface 611A is the widest at the position corresponding to the position corresponding to the direction in which the holding position of the disk holding mechanism 320 is likely to be shifted in transferring the optical disk 1N, even when the diameter of the support portion 611 is set close to the diameter of the disk hole 1NA, the optical disk 1N can be securely and smoothly held.

The engagement/disengagement concave portion 613 is shaped in a concave groove opened at the tip end of the support portion 611. Accordingly, the height of the support portion 611 can be made smaller. Specifically, it is only necessary that the height of the support portion 611 is set so as to allow holding of the optical disk 1N between the first and second engaging portions 614 and 616 and the positioning portion 612, thereby easily reducing the size. The guide groove 613A is provided on both widthwise-opposing sides of the engagement/disengagement concave portion 613 configured as a concave groove and the engaging rib 615A protruding widthwise and extending longitudinally in a shape of a wall to be slidably engaged with the guide groove 613A is provided on the moving member 615. Even when the temporarily fixing portion 600 is attached to the upper case 130 in a manner that the engagement/disengagement concave portion 613 is opened downward, the temporarily fixing portion 600 is not detached and can be disposed in a manner movable by the support portion 611 without providing a mechanism, for instance, for connecting the moving member 615 to the disk engagement/disengagement mechanism 620. Accordingly, the moving member 615 can be disposed within the engagement/disengagement concave portion 613 with a simple structure and the height of the support portion 611 in the axial direction can be reduced as compared with an arrangement, for instance, in which the moving member 615 is connected with the disk engagement/disengagement mechanism 620, thereby further reducing the size. Incidentally, the guide groove 613A and the engaging rib 615A may not be provided but the disk engagement/disengagement mechanism 620 may be connected by a screw and the like. According to the above arrangement, the shape of the engagement/disengagement concave portion 613 and the moving member 615 can be simplified and the configuration of the dies can be simplified, thereby reducing the production cost and improving productivity of the support portion 611 and the moving member 615. Further, the engagement/disengagement concave portion 613 is configured so that the support portion 611 is bisected to be in communication with the inner circumference of the positioning portion 612 and the positioning portion 612 is covered with the upper case 130, i.e. the upper case 130 forms the bottom side of the engagement/disengagement concave portion 613. Accordingly, an arrangement in which the moving member 615 is movably disposed onto the engagement/disengagement concave portion 613 without being detached or the moving member 615 is engaged with the disk engagement/disengagement mechanism 620 for moving the moving member 615 can be easily obtained, thereby facilitating the assembling work and improving the productivity.

Further, the longitudinal end of the moving member 615 from which the second engaging portion 616 protrudes is curved to have approximately the same curvature as the curvature of the circumference of the support portion 611, and the moving member 615 is disposed in a manner advanceable and retractable relative to the circumference of the support portion 611. Accordingly, even when the optical disk 1N cannot be held between the second engaging portion 616 and the positioning portion 612, e.g. when the thickness of the optical disk 1N is small, the curved side of the moving member 615 is in contact with the periphery of the disk hole 1NA to prop against the circumference of the support portion 611 to securely hold the optical disk 1N. Further, the curved profile prevents damage on the periphery of the disk hole 1NA when the side of the moving member 615 is in contact with the periphery of the disk hole 1NA.

A release portion 617 is provided on the second longitudinal end of the moving member 615. The release portion 617 is configured so that a periphery adjacent to the upper case 130 (corresponding to the bottom side of the engagement/disengagement concave portion 613) is shaped approximately in a wedge-shape projecting toward the second axial end relative to the periphery corresponding to the tip end of the axial support portion 611 and is provided with a guide surface 617A that is slanted toward the tip end of the support portion 611. Accordingly, by moving the moving member 615 by the disk engagement/disengagement mechanism 620 so that the release portion 617 protrudes from the circumference of the support portion 611 when the optical disk 1N is detached from the support portion 611, the periphery of the disk hole 1NA slides on the circumference of the release portion 617 to be guided to the tip end of the support portion 611 to detach the optical disk 1N from the temporarily fixing portion 600. Accordingly, when the moving member 615 is moved to release the engagement by the second engaging portion 616, the optical disk 1N is moved in a to-be-detached direction, so that the optical disk 1N can be smoothly detached without generating load and noise applied when the optical disk is detached in a traditional arrangement such as the ball-chucking mechanism. The guide surface 617A of the release portion 617 is curved in a manner approximately corresponding to the curvature of the circumference of the axial support portion 611. Since the release portion 617 is not in contact with the periphery of the disk hole 1NA at the edge thereof, the optical disk 1N can be more smoothly guided in a direction to be detached from the support portion 611, thereby allowing more efficient detachment of the optical disk 1N.

The moving member 615 is configured in approximately the same rectangle as the engagement/disengagement concave portion 613, where an end of the second engaging portion 616 and the longitudinal first end is retracted from the circumference of the support portion 611 and the release portion 617 in longitudinal direction protrudes from the circumference of the support portion 611. Accordingly, the movement distance between the mounting position for advancing the second engaging portion 616 and the first end in the longitudinal direction to hold the optical disk 1N and the release position for advancing the release portion 617 to detach the optical disk 1N can be reduced, thus obtaining further size reduction.

The disk engagement/disengagement mechanism 620 includes the plate-shaped engagement/disengagement operative plate 621 having the operative arm 621B that is rotated to be engaged with the moving member 615 and the force-applying arm for rotating the operative arm 621B, the engagement/disengagement operative plate 621 being rotatably supported by the rotary plate 621A. Accordingly, the moving member 615 can be moved to attach/detach the optical disk 1N with a simple structure, thereby easily improving productivity and attaining size reduction.

The biasing unit 622 allows the moving member 615 to be located at the mounting position of the optical disk 1N in a normal state and to be moved to the release position when the optical disk 1N is attached and detached. Accordingly, it is not necessary to connect the right elevation control plate 520 with the force-applying arm 621C of the disk engagement/disengagement mechanism 620 but the moving member 615 can be properly moved only by being contacted with and rotated by the biasing unit 622, thereby further simplifying the structure, improving productivity and enhancing size reduction. Since the moving member 615 is arranged so that the end of the moving member 615 on the side from which the second engaging portion 616 protrudes is advanceable from the circumference of the support portion 611, even when the optical disk 1N cannot be held by the second engaging portion 616 and the positioning portion 612, e.g. when the thickness of the optical disk 1N is small, the biasing force of the biasing unit 622 protrudes the curved side of the moving member 615 from the circumference of the support portion 611 by the biasing force of the biasing unit 622 and the curved side is brought into contact with the periphery of the disk hole 1NA, so that the optical disk 1N can be held by the propping of the curved side of the moving member 615 and the circumference of the support portion 611, thereby properly holding the optical disk 1N.

The temporarily fixing portion 600 is configured so that the disk elevator 300 that transfers the optical disk 1N into and out of the case 110 and vertically moves the optical disk 1N within the case 110 temporarily fixes the optical disk 1N. Accordingly, even when being opposed to the turntable 221 for processing the optical disk 1N, since the optical disk 1N is detachably held (i.e. temporarily fixed) with a simple structure, the vertical dimension of the disk device 100 is restrained from becoming large. Further, the moving member 615 can be moved using the elevation control mechanism 500 for elevating the disk elevator 300, so that the size reduction by component sharing can be attained. Further, since the optical disk 1N can be attached/detached with a simple structure and can be securely held, the arrangement can be suitably employed in the disk device 100 installed in a vehicle where the optical disk 1N has to be stably held against strong impact from the outside. Further, since the optical disk can be securely held, the present arrangement can be suitably employed in a structure for holding the optical disk 1N that is susceptible to the influence of external impact.

[Modifications of Embodiment]

It should be noted that the scope of the present invention is not limited to the above-described embodiments but may include various modifications as long as an object of the present invention can be achieved.

Specifically, the present invention may not be applied only to the disk device 100, but also applied to a holder device that detachably holds any objects that is disk-shaped with a hole approximately at the center thereof or accommodates a disk-shaped object, which includes heating or cooling processing apparatus and steel-plate processing apparatus. The present structure may not be integrated with the disk device 100 but may be independently provided. The disk device may be arranged in any manner, where the replacing mechanism for the optical disk 1N may not be provided, a roller mechanism that employs no arm member 331 for so-called slot-in mechanism may be used, or a tray-mechanism may be used. The disk device 100 may be arranged to have a transfer unit that moves the disk processor 200 (traverse mechanism) to advance the support portion 611 to the transfer path when the optical disk 1N that is transferred in planar direction as in the tray mechanism or the slot-in mechanism is held and to retreat the support portion 611 from the transfer path when the optical disk 1N is transferred. For instance, the elevation control mechanism 500 may move the disk processor 200. Since size reduction is possible with such an arrangement, the moving distance of the disk processor 200 can be reduced and the size reduction of the disk device 100 can be easily attained. The present invention may be applied not only to the disk device 100 mounted on a vehicle, but also be attached to a personal computer and electronics including audio equipment and picture recorder.

Figure 24:
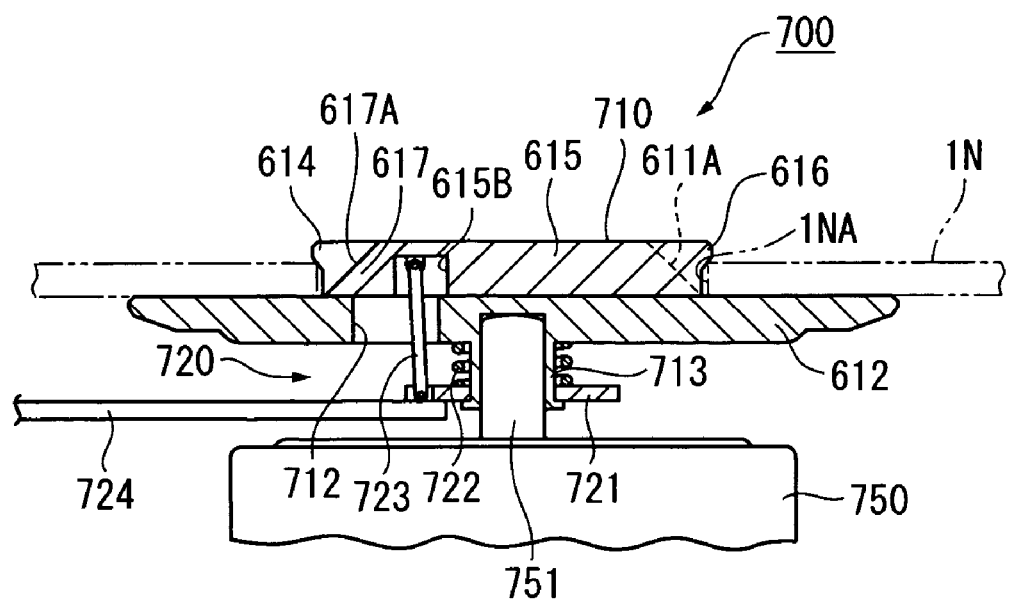
FIG. 24 is a cross section showing a schematic arrangement of a turntable of a disk device at the mounting position according to the other embodiment of the present invention.
Figure 25:
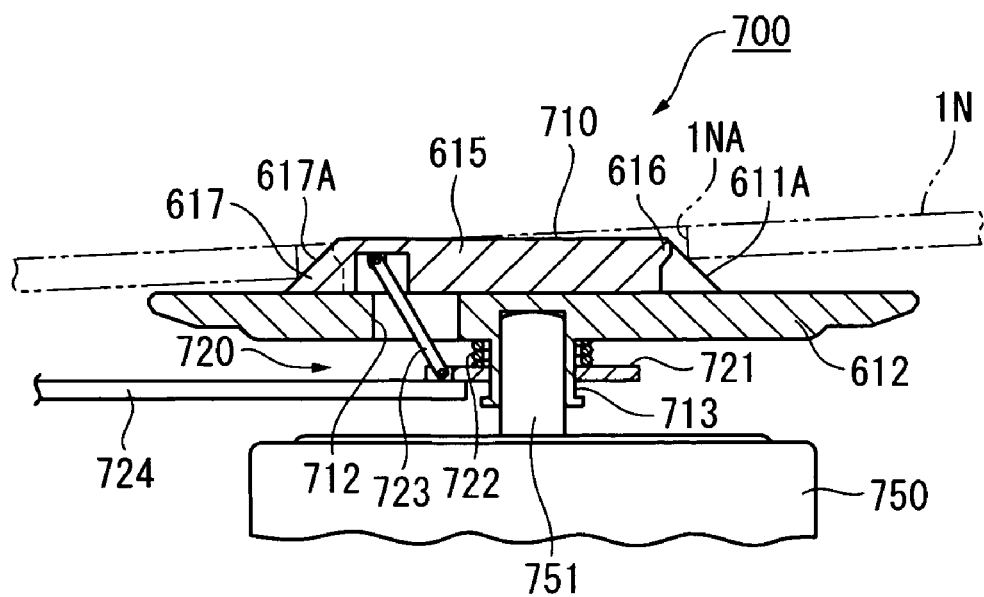
FIG. 25 is a cross section showing a schematic arrangement of the turntable at a release position according to the other embodiment.
Figure 26:
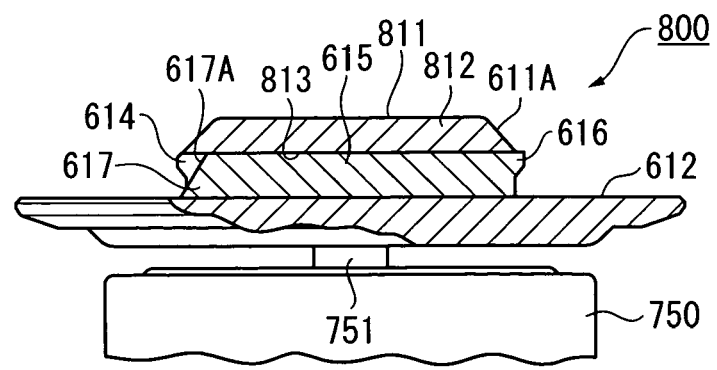
FIG. 26 is a partially cutaway front view showing a support of a temporarily fixing portion of a disk device according to still another embodiment of the present invention.
Figure 27:
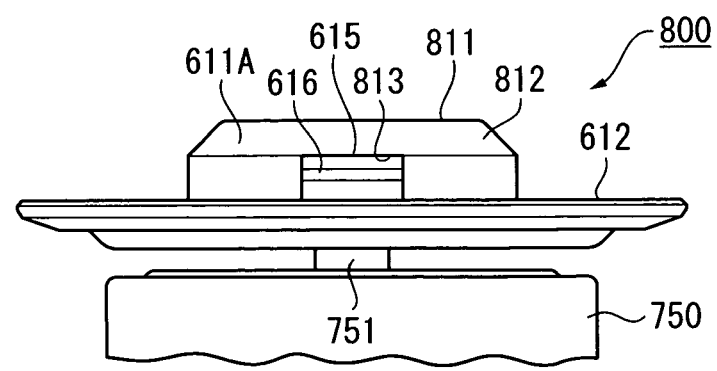
FIG. 27 is a side view showing the support of the still another embodiment.
Figure 28:
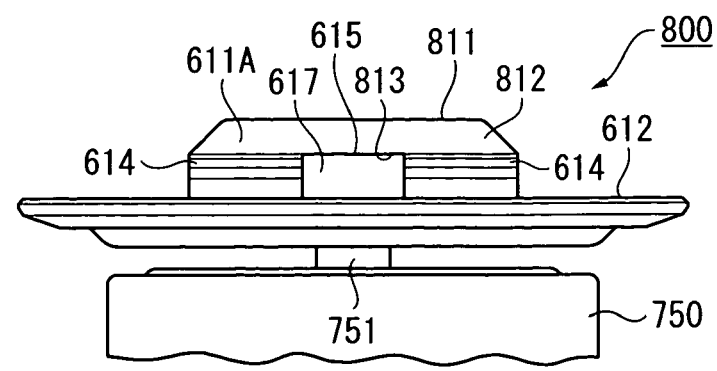
FIG. 28 is another side view showing the support of the still another embodiment.
Figure 29:
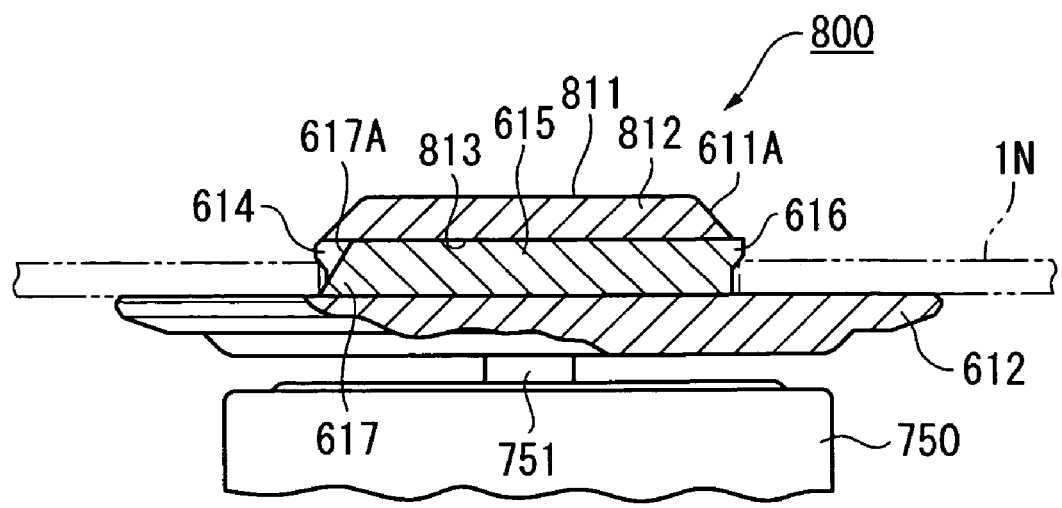
FIG. 29 is a cross section showing the support of the still another embodiment at the mounting position.
Figure 30:
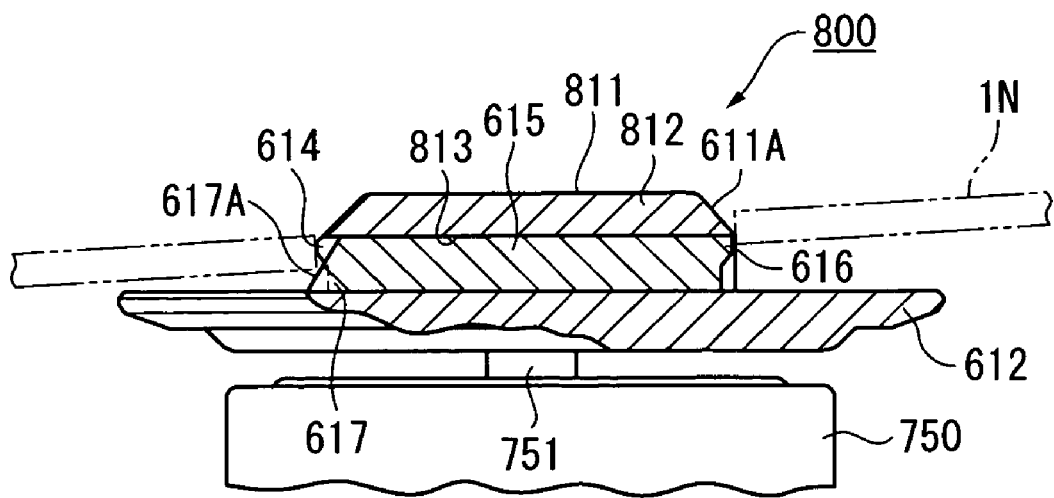
FIG. 30 is a cross section showing the support of the still another embodiment at the release position.

Though the present invention is applied to the temporarily fixing portion 600, it may also be applied to the turntable 221 having a plurality of advanceable engaging claws. Specifically, the present invention may be applied to a turntable 700 as shown in FIGS. 24 and 25. Incidentally, the same reference numeral will be applied to the same components to omit the description thereof. The turntable 700 as shown in FIGS. 24 and 25 includes a support 710 and a disk engagement/disengagement mechanism 720 in a manner similar to the temporarily fixing portion 600.

The support unit 710 includes: a support portion 611 having a disk-shaped positioning portion 612, an engagement/disengagement concave portion 613 at a tip end thereof, a first engaging portion 614 and a guide surface 611A; and a moving member 615 provided on the engagement/disengagement concave portion 613, the moving member having a second engaging portion 616 and a release portion 617. Incidentally, the moving member 615 is provided with an engaging rib to be engaged with a guide groove (not shown) provided on the engagement/disengagement concave portion 613 in the same manner as the above-described embodiment, so that the moving member 615 does not fall off from the engagement/disengagement concave portion 613. An operative engaging concave portion 615B opened toward the positioning portion 612 is provided on the bottom side of the moving member 615 opposing to the positioning portion 612. Approximately slit-shaped operation hole 712 in communication with the engagement/disengagement concave portion 613 is provided on the positioning portion 612 at a position corresponding to the operative engaging concave portion 615B. Further, a rotary cylinder 713 that is substantially coaxially positioned to have cylindrical shape and fittably receive on an inner circumference thereof an output shaft 751 of a rotating electric motor 750 such as a spindle motor provided on the mount 210 is provided approximately at the center of the backside of the positioning portion 612.

The disk engagement/disengagement mechanism 720 is provided with a ring-shaped operation plate 721 that receives the rotary cylinder 713 on the inner circumference thereof, the operation plate 721 being opposed to the positioning portion 612 in a manner to be movable toward and away therefrom. The operation plate 721 is rotatable integrally with the rotary cylinder 713 and receives the rotary cylinder 713 in a manner movable in the axial direction of the rotary cylinder 713. Specifically, a groove or rib may be provided axially along the outer circumference of the rotary cylinder 713 and a convex portion or concave groove to be slidably engaged with the groove or the rib may be provided on the inner circumference of the operative plate 721 for obtaining the above structure. A biasing unit 722 such as a helical spring is provided between the operation plate 721 and the positioning portion 612 to apply biasing force in a direction relatively away from each other. Incidentally, an operative arm 723 having a rotatably supported longitudinal end is provided on the operation plate 721. The other longitudinal end of the operation arm 723 is inserted through the operation hole 712 to be rotatably disposed within the operative engaging concave portion 615B. A force-applying arm 724 that is in slidable contact with the operation plate 721 and moves by an external drive force the operation plate 721 toward the positioning portion 612 against the biasing force of the biasing unit 722 is provided on the lower side of the operation plate 721. The force-applying arm 724 may be in slidable contact with the operation plate 721 by providing both of the force-applying arm 724 and the operation plate 721 with material of small friction coefficient or by providing a rotating body such as a wheel on the force-applying arm 724 at a position to be in slidable contact with the operation arm 721. The force-applying arm 724 may be moved along the axial direction of the output shaft 751 together with the movement of the stage 310 toward the mounting position with the drive force applied by the movement of the right elevation control plate 520 of the elevation control mechanism 500. Alternatively, the force-applying arm 724 may be moved by the drive force of a motor, solenoid and the like.

When the force-applying arm 724 moves the operation plate 721 toward the positioning portion 612 against the biasing force, the moving member 615 is pushed by the operative arm 723 to be moved within the engagement/disengagement concave portion 613. Then, as shown in FIG. 25, the second engaging portion 616 and the first end in the longitudinal direction are retracted from the circumference of the support portion 611 and the release portion 617 in the longitudinal direction is located at a release position at which the release portion 617 protrudes from the circumference of the support portion 611. Further, when the drive of the force-applying arm 724 is released and the operation plate 721 is moved away from the positioning portion 612 by the biasing force of the biasing unit 722, the moving member 615 is propped by the operation arm 723 to move within the engagement/disengagement concave portion 613. Then, as shown in FIG. 24, the second engaging portion 616 and the first end in the longitudinal direction protrudes from the circumference of the support portion 611 to be located at the mounting position (regular position) at which the optical disk 1N is held. The output shaft 751 of the rotating electric motor 750 is rotated at the mounting position to rotate the rotary cylinder 713 together with the operation plate 721, so that the support 710 is rotated while holding the optical disk 1N. The arrangement shown in FIGS. 24 and 25 exhibits the same effects and advantages as the above-described embodiment, i.e. the optical disk 1N can be easily and detachably held with a simple structure.

Though the engagement/disengagement concave portion 613 is a concave groove opened onto the tip end side of the support portion 611 in the above embodiment, the engagement/disengagement concave portion 613 may radially penetrate the support portion 611 as shown in FIGS. 26 to 30. Specifically, the tip end of the support portion 611 in the axial direction of the above embodiment may be configured approximately in a circular truncated cone of which diameter gradually reduces toward the axial tip end. Incidentally, the same reference numeral will be applied to the same components to omit the description thereof in FIGS. 26 to 30. Specifically, as shown in FIGS. 26 to 30, a support portion 811 of a turntable 800 protrudes substantially in a circular truncated cone and has a guide portion 812 having a guide surface 611A slanted toward the circumference. An engagement/disengagement concave portion 813 that penetrates the cylindrical circumference of the support portion 811 is provided while the engagement/disengagement concave portion 613 is covered with the guide portion 812. According to the above arrangement, even when the position of the optical disk 1N transferred in planar direction is misaligned in any of the planar directions, the support portion 811 can be securely inserted into the disk hole 1NA of the optical disk 1N by the presence of the guide portion 812, thereby securely holding the optical disk.

The moving member 615 may not be provided with the release portion 617. Further, for instance, the moving member 615 may be divided into a member provided with the second engaging portion 616 and another member provided with the release portion 617, which are moved in holding or attaching/detaching the optical disk 1N. Though the side on which the second engaging portion 616 is provided is curved in the above embodiment, the side may be made flat. Similarly, the release portion 617 may be flatly formed without curving the guide surface 617A. The second engaging portion 616 may not be provided as a rib but may be protruded in, for instance, a pin-protrusion that allows engagement with the portion around the periphery of the disk hole 1NA. Further, though the end provided with the second engaging portion 616 protrudes in the above embodiment, only the second engaging portion 616 may be protruded or retracted.

Though the disk engagement/disengagement mechanism 620 that moves the moving member 615 in conjunction with the movement of the elevation control mechanism 500 is used in order to move the moving member 615 in the above embodiment, the moving member 615 may be moved in any manner, where the moving member 615 may be moved by driving a drive unit such as a separately provided motor or solenoid. Though the substantially L-shaped (in plan view) engagement/disengagement operative plate 621 is used in the above embodiment, the moving member 615 may be moved in any manner, where, for instance, the moving ember 615 is moved from the backside of the positioning portion 612. Further, the biasing unit 622 may not be provided but the moving member 615 may be moved to the mounting position or the release position by an external drive. The biasing unit 622 may not be a helical spring but may be any elastic member such as rubber, plate spring, sponge and the like that applies restoring force of elastic deformation as a biasing force. Further, the biasing unit 622 may apply pressing force as the biasing force instead of pull force. Further, though the biasing force is applied so that the components are at the mounting position in the regular condition, the biasing force may be applied so that the components are at the release position in the regular condition.

In addition, specific structures and procedures in embodying the present invention may be suitably changed to different structures and others as long as an object of the invention can be achieved.

[Effects of Embodiment]

As described above, in order to detachably hold (i.e. temporarily fix) the optical disk 1N, the support 611 is configured substantially cylindrically to have the same or less dimension as the diameter of the disk hole 1NA of the optical 1N so as to be fitted into the disk hole 1NA. The support 611 is provided with the positioning portion 612 that protrudes outward from the outer circumference adjacent to the axially first side at a position adjacent to the periphery of the disk hole 1NA of the optical disk 1N. The engagement/disengagement concave portion 613 of which both ends open to the circumference of the support 611 along the radial direction is provided on the support 611. Further, the first engaging portion 614 is provided around the circumference of the support 611 from which the axial end of the engagement/disengagement concave portion 613 is opened. The first engaging portion 614 is projected outward and is provided to oppose to the positioning portion 612 by a gap of the thickness of the optical disk 1N or more. The moving member 615 is provided on the engagement/disengagement concave portion 613 in a manner movable in diameter direction of the support 611. The second engaging portion 616 protrudes from the end of the moving member 615 corresponding to the axial second end of the engagement/disengagement concave portion 613 so that the tip end of the second engaging portion 616 can be protruded and retracted relative to the circumference of the support 611 from which the axial second end of the engagement/disengagement concave portion 613 is opened. Accordingly, when the second engaging portion 616 is projected from the circumference opposite to the first engaging portion 614 of the support 611 by moving the moving member 615, the optical disk 1N is held by the first engaging portion 614 and the second engaging portion 616. Thus, the optical disk 1N can be detachably held with a simple arrangement where the single moving member 615 provided with the second engaging portion 616 is movably provided in the engagement/disengagement concave portion 613 that radially penetrates the substantially cylindrical support unit 611, the second engaging portion 616 engaging the optical disk 1N together with the first engaging portion 614 of the support unit 611.

The invention claimed is:

1. A holding device that detachably holds a to-be-held object having a hole substantially at the center thereof, the device comprising:
   a substantially cylindrical support to be inserted into the hole;
   a positioning portion located on an outside of the hole in which the support is inserted, a portion around a periphery of the hole being adapted to be in contact with the positioning portion;
   a concave portion provided on the support, the concave portion extending in a radial direction of the support so that both ends are opened on the circumference of the support;
   a moving member provided on the concave portion in a manner movable along the radial direction of the support;
   a first engaging portion provided on the support at a position opposed to the positioning portion with the to-be-held object interposed therebetween when the support is inserted into the hole, the first engaging portion engaging the periphery of the hole in cooperation with the positioning portion; and
   a second engaging portion provided on the moving member at a position opposed to the positioning portion with the to-be-held object interposed therebetween when the support is inserted into the hole, the second engaging portion engaging with the periphery of the hole in cooperation with the positioning portion, wherein
   when the support and the moving member are inserted into the hole, the second engaging portion moves relative to the first engaging portion to be brought into contact with the periphery of the hole to engage the hole in cooperation with the positioning portion.

2. The holding device according to claim 1, wherein
   the first engaging portion protrudes outward from a circumference of the support at which a first axial end of the concave portion is opened so that the first engaging portion substantially opposes to the positioning portion by a gap equal to or more than a thickness of the object, and
   the second engaging portion protrudes from a first end of the moving member in a moving direction in a manner corresponding to the first engaging portion so that a tip end of the second engaging portion is adapted to protrude/retract from the circumference of the support at which a second axial end of the concave portion opens.

3. The holding device according to claim 2, wherein
   the first engaging portion protrudes in a flanged manner over a region of substantially half of the circumference around the position at which the first axial end of the concave portion is opened.

4. The disk device according to claim 2, wherein
   the support has a guide surface slanted toward a second axial end of the concave portion on a periphery of the second axial end of the concave portion at a position corresponding to the position at which the second axial end of the concave portion is opened.

5. The holding device according to claim 4, wherein the guide surface is provided over a region of substantially half of the circumference around the position at which the second axial end of the concave portion is opened.

6. The disk device according to claim 2, wherein the support has a truncated conic guide portion on the second axial end, the diameter of the support being reduced toward the second axial end, and
the concave portion is provided as a hole radially penetrating the support.

7. The holding device according to claim 2, wherein the support is configured so that the concave portion is opened at the first axial end as a concave groove and a guide portion is provided on at least one of sides of the support opposing widthwise along axial direction of the concave portion, and
the moving member is provided with an engaging portion, the engaging portion being slidably engaged with the guide portion.

8. The holding device according to claim 2, wherein the first end of the moving member in the moving direction is provided as an arc of which curvature is substantially the same as the curvature of the circumference of the support, and the first end in the moving direction is disposed so as to be advanceable and retractable from the circumference of the support at which the second axial end of the concave portion is opened.

9. The holding device according to claim 2, further comprising:
a moving unit that moves the moving member so that the second engaging portion retracts from the circumference of the support when the support is inserted into/detached from the hole of the object and the second engaging portion protrudes from the circumference of the support when the object is held.

10. The holding device according to claim 2, further comprising:
a transfer unit that detachably holds the object and transfers the object in a state that a thickness direction of the object extends along the direction in which the object is moved toward and away from the positioning portion of the support; and
a moving unit that moves the moving member so that the second engaging portion retracts from the circumference of the support when the transfer unit moves the object toward the positioning portion and the second engaging portion protrudes from the circumference of the support when the transfer unit moves the object away from the positioning portion.

11. The holding device according to claim 9, wherein the moving unit has a biasing unit that applies biasing force to move the moving member so that the second engaging portion protrudes from the circumference of the engaging portion, the moving unit moving the moving member so that the second engaging portion is retracted from the circumference of the support against the biasing force of the biasing unit.

12. The holding device according to claim 9, wherein the moving member has a release portion that is provided substantially in a wedge-shape in which a side corresponding to the first axial side of the support protrudes toward a second side in the moving direction relative to a side corresponding to the second axial side of the support to provide a guide surface slanted toward the second axial end of the support, and
the moving unit moves the moving member so that the release portion protrudes from the circumference of the support when the insertion of the support into the hole of the object is released to release the attachment of the object.

13. The holding device according to claim 12, wherein the moving member is configured so that the release portion retracts from the circumference of the support as the second engaging portion protrudes from the circumference of the support and the release portion protrudes from the circumference of the support as the second engaging portion retracts from the circumference of the support.

14. The holding device according to claim 1, wherein the object to be held is a disk recording medium.

15. The holding device according to claim 1, wherein the holding device is installed in a moving body.

16. A disk device, comprising:
a case having an opening through which the object can be planarly inserted;
a transfer unit that planarly transfers the object into and out of the case through the opening;
the holding device according to claim 1 that is disposed within the case and detachably holds the object transferred into the case by the transfer unit; and
a processor that is disposed within the case and processes the object held by the holding device.

17. A disk device, comprising:
a case having an opening through which the object can be planarly inserted;
the holding device according to claim 1 that is disposed within the case;
a transfer unit that planarly transfers the object into and out of the case through the opening and moves the holding device toward and away from the object at a position where the hole of the object to be transferred is aligned with the support of the holding device to detach/attach the object on the holding device; and
a processor that is disposed within the case and processes the object held by the holding device.

* * * * *